(12) United States Patent
Idehara

(10) Patent No.: US 8,386,617 B2
(45) Date of Patent: Feb. 26, 2013

(54) NETWORK DEVICE CONNECTING SYSTEM, DATA TRANSMISSION DEVICE, DATA RECEIVING DEVICE, AND PORTABLE TERMINAL

(75) Inventor: Takenori Idehara, Machida (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 41 days.

(21) Appl. No.: 12/832,122

(22) Filed: Jul. 8, 2010

(65) Prior Publication Data

US 2010/0271664 A1 Oct. 28, 2010

Related U.S. Application Data

(62) Division of application No. 09/961,363, filed on Sep. 25, 2001, now abandoned.

(30) Foreign Application Priority Data

Sep. 28, 2000 (JP) ................................ 2000-296861
Nov. 29, 2000 (JP) ................................ 2000-363581

(51) Int. Cl.
G06F 15/16 (2006.01)
(52) U.S. Cl. .................... 709/227; 709/223; 709/213
(58) Field of Classification Search .................. 709/227, 709/245, 213
See application file for complete search history.

(56) References Cited

U.S. PATENT DOCUMENTS

| | | | |
|---|---|---|---|
| 5,666,495 A | 9/1997 | Yeh | |
| 5,862,321 A | 1/1999 | Lamming et al. | |
| 5,905,486 A | 5/1999 | Brittenham et al. | |
| 5,953,507 A | 9/1999 | Cheung et al. | |
| 6,061,739 A | 5/2000 | Reed et al. | |
| 6,145,046 A | 11/2000 | Jones | |
| 6,173,334 B1 | 1/2001 | Matsuzaki et al. | |
| 6,194,712 B1 | 2/2001 | Suemoto et al. | |
| 6,282,569 B1 | 8/2001 | Wallis et al. | |
| 6,285,889 B1 | 9/2001 | Nykanen et al. | |
| 6,353,599 B1 | 3/2002 | Bi et al. | |
| 6,356,752 B1 | 3/2002 | Griffith | |
| 6,378,070 B1 | 4/2002 | Chan et al. | |
| 6,385,728 B1 | 5/2002 | DeBry | |
| 6,397,261 B1 | 5/2002 | Eldridge et al. | |
| 6,493,760 B1 | 12/2002 | Pendlebury et al. | |
| 6,515,988 B1 | 2/2003 | Eldridge et al. | |
| 6,535,918 B1 | 3/2003 | Bender et al. | |
| 6,574,664 B1 | 6/2003 | Liu et al. | |
| 6,606,161 B2 | 8/2003 | Murata | |
| 6,654,601 B2 | 11/2003 | Picoult et al. | |
| 6,690,887 B1 | 2/2004 | Sano | |
| 6,744,528 B2 | 6/2004 | Picoult et al. | |
| 6,751,732 B2 | 6/2004 | Strobel et al. | |
| 6,801,932 B1 | 10/2004 | Picoult et al. | |
| 6,819,917 B2 | 11/2004 | Yamauchi | |
| 6,922,725 B2 | 7/2005 | Lamming et al. | |
| 6,947,408 B1 | 9/2005 | Liberti et al. | |
| 6,978,299 B1 | 12/2005 | Lodwick | |
| 7,000,001 B2 * | 2/2006 | Lazaridis ..................... | 709/217 |
| 7,028,102 B1 * | 4/2006 | Larsson et al. ................ | 709/246 |
| 2001/0029531 A1 | 10/2001 | Ohta | |
| 2001/0040685 A1 | 11/2001 | Winter et al. | |

FOREIGN PATENT DOCUMENTS

JP 11-355498 A 12/1999

\* cited by examiner

*Primary Examiner* — Ramsey Refai
(74) *Attorney, Agent, or Firm* — Buchanan Ingersoll & Rooney PC

(57) ABSTRACT

A system including a first device connected to a network, a second device connected to the network, and at least one portable terminal is disclosed. Device information of the first device containing connection information for establishing a connection between the first device and the second device is transmitted from the first device to the portable terminal and later transmitted from the portable terminal to the second device. Therefore, the connection between the first device and the second device is established based on the device information.

10 Claims, 72 Drawing Sheets

| DEVICE NAME | SCANNER 10 |
|---|---|
| IP ADDRESS | 100.100.100.100 |
| LOGIN NAME | ABCDEF |
| PASSWORD | ******** |
| DIRECTORY | PRINTER |
| . . . | . . . |

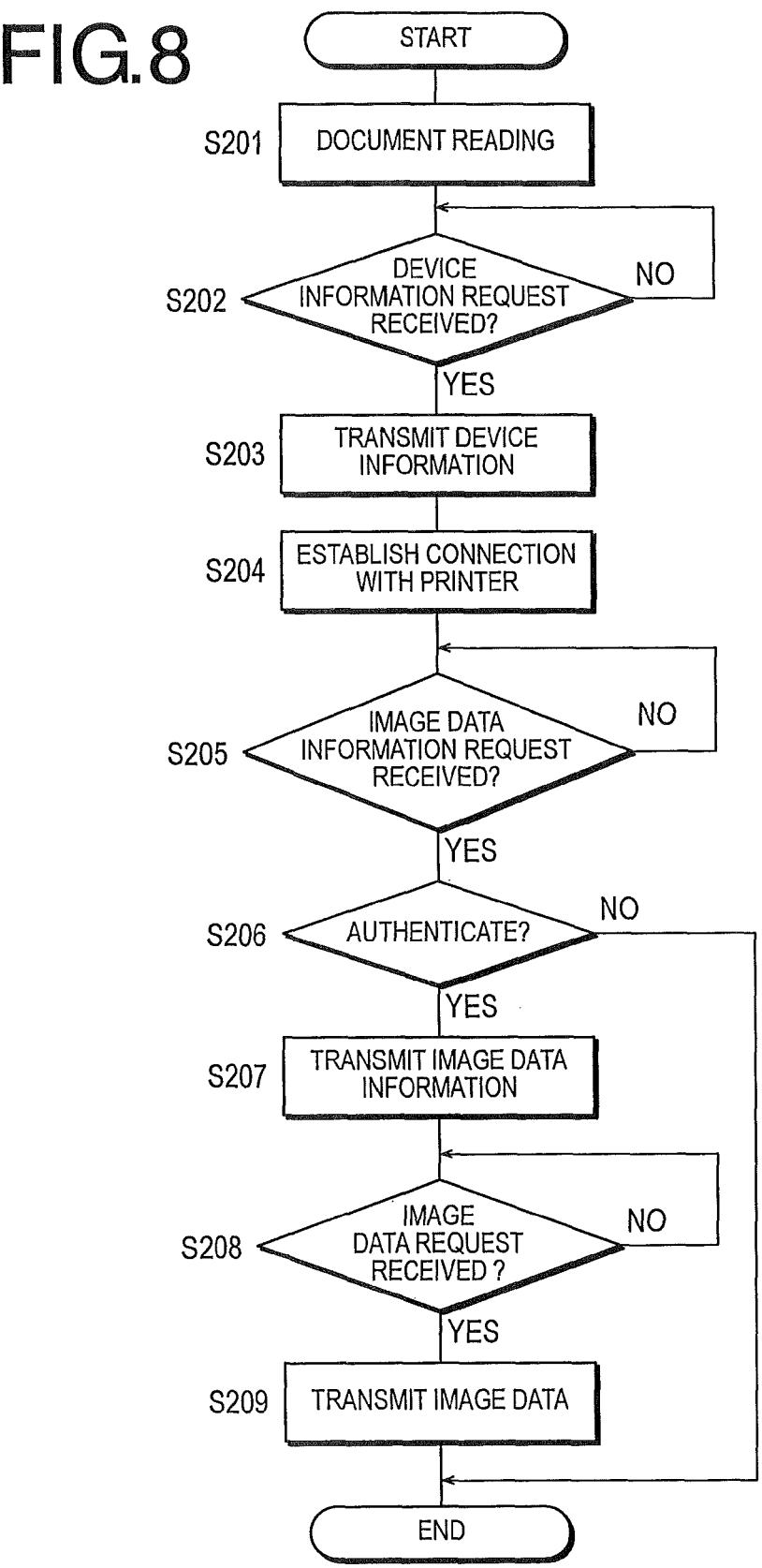

DATA TRANSMISSION DEVICE (DIGITAL COPYING MACHINE)

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | COLOR/MONOCHROMATIC |
| | CONTROL COMMAND (INCLUDING EMULATION MODE) | PAGE DESCRIPTION LANGUAGE A, B |
| | PAPER SIZE | A4, A3, LETTER, LEGAL |

FIG.26

| | PROTOCOL | IDENTIFICATION CODE | DATE FORMAT |
|---|---|---|---|
| CONNECTION INFORMATION | TCP/IP | IP ADDRESS | |
| | FTP | SERVER NAME<br>DIRECTORY<br>PASSWORD | PAGE DESCRIPTION LANGUAGE A<br>PAGE DESCRIPTION LANGUAGE B<br>BITMAP DATA |
| | IFAX | E-MAIL ADDRESS | TIFF-F COMPRESSION |
| | IPP | E-MAIL ADDRESS | TIFF-F COMPRESSION |
| | LPR | IP ADDRESS | PAGE DESCRIPTION LANGUAGE A<br>PAGE DESCRIPTION LANGUAGE B |
| | FAX | FACSIMILE NUMBER | CONFORM TO FAX |
| | HTTP | URL<br>(SERVER NAME/DIRECTORY)<br>PASSWORD | JPEG<br>TIFF |
| | ITEM | CONTENS | |
| SPECIFICATION INFORMATION | PRINTING RESOLUTION | 600 DPI | |
| | PRINTING MODE | COLOR/MONOCHROMATIC | |
| | CONTROL COMMAND<br>(INCLUDING EMULATION MODE) | PAGE DESCRIPTION LANGUAGE A, B | |
| | PAPER SIZE | A4, A3, LETTER, LEGAL | |

FIG.27

| TRANSMISSION METHOD | TRANSMISSION FORMAT |
|---|---|
| FTP TRANSMISSION | STORE IN THE BUILT-IN STORAGE UNIT |
| FTP TRANSMISSION | COLOR/MONOCHROMATIC PRINTING |
| LPR TRANSMISSION | PAGE DESCRIPTION LANGUAGE A COLOR/MONOCHROMATIC PRINTING |
| LPR TRANSMISSION | PAGE DESCRIPTION LANGUAGE B COLOR/MONOCHROMATIC PRINTING |
| IFAX TRANSMISSION | MONOCHROMATIC PRINTING |
| IPP TRANSMISSION | MONOCHROMATIC PRINTING |
| FAX TRANSMISSION | MONOCHROMATIC PRINTING |
| HTTP TRANSMISSION | BROWSER DISPLAY COLOR/MONOCHROMATIC |

FIG.29

| | PROTOCOL | HTTP | |
|---|---|---|---|
| CONNECTION INFORMATION | ITEM | IDENTIFICATION CODE | DATE FORMAT |
| | | URL (SERVER NAME/DIRECTORY) PASSWORD | JPEG TIFF |
| | | CONTENS | |
| SPECIFICATION INFORMATION | PRINTING RESOLUTION | 600 DPI | |
| | PRINTING MODE | COLOR/MONOCHROMATIC | |
| | CONTROL COMMAND (INCLUDING EMULATION MODE) | PAGE DESCRIPTION LANGUAGE A, B | |
| | PAPER SIZE | A4, A3, LETTER, LEGAL | |

| CONNECTION INFORMATION | PROTOCOL | LPR |
| --- | --- | --- |
| | IDENTIFICATION CODE | IP ADDRESS |
| SPECIFICATION INFORMATION | PRINTING RESOLUTION | 600 DPI |
| | PRINTING MODE | COLOR/MONOCHROMATIC |
| | CONTROL COMMAND (INCLUDING EMULATION MODE) | PAGE DESCRIPTION LANGUAGE A, B |
| | PAPER SIZE | A4, A3, LETTER, LEGAL |
| | SECURITY | PASSWORD |

FIG.42

TRANSMISSION REQUEST IS RECEIVED.
DO YOU WANT TO TRANSMIT THE DATA IMMEDIATELY?

YES    NO

FIG.43

DO YOU WANT TO START TRANSMITTING THE DATA BEING HELD?
SELECT ONE.

10:00  TRANSMISSION REQUEST 1 OF DATA TRANSMISSION DEVICE
10:20  TRANSMISSION REQUEST 2 OF DATA TRANSMISSION DEVICE
10:21  TRANSMISSION REQUEST 3 OF DATA TRANSMISSION DEVICE

FIG. 46A
DATA RECEIVING DEVICE 30B

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | COLOR/MONOCHROMATIC |
| | CONTROL COMMAND (INCLUDING EMULATION MODE) | PAGE DESCRIPTION LANGUAGE A, B |
| | PAPER SIZE | A4, A3, LETTER, LEGAL |

FIG. 46B
DATA RECEIVING DEVICE 30C

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | MONOCHROMATIC |
| | CONTROL COMMAND (INCLUDING EMULATION MODE) | PAGE DESCRIPTION LANGUAGE A |
| | PAPER SIZE | A4, LETTER |

FIG. 46C
DATA RECEIVING DEVICE 30D

| CONNECTION INFORMATION | PROTOCOL | IFAX |
|---|---|---|
| | IDENTIFICATION CODE | E-MAIL ADDRESS |
| | DATA FORMAT | TIFF-F COMPRESSION |
| SPECIFICATION INFORMATION | PRINTING RESOLUTION | 300 DPI |
| | PRINTING MODE | MONOCHROMATIC |
| | PAPER SIZE | A4, LETTER |

FIG.47

| | CONNECTION INFORMATION | PROTOCOL | LPR |
|---|---|---|---|
| DATA RECEIVING DEVICE 30B | | IDENTIFICATION CODE | IP ADDRESS |
| | SPECIFICATION INFORMATION | PRINTING RESOLUTION | 600 DPI |
| | | PRINTING MODE | COLOR/MONOCHROMATIC |
| | | CONTROL COMMAND (INCLUDING EMULATION MODE) | PAGE DESCRIPTION LANGUAGE A, B |
| | | PAPER SIZE | A4, A3, LETTER, LEGAL |
| DATA RECEIVING DEVICE 30C | CONNECTION INFORMATION | PROTOCOL | LPR |
| | | IDENTIFICATION CODE | IP ADDRESS |
| | SPECIFICATION INFORMATION | PRINTING RESOLUTION | 600 DPI |
| | | PRINTING MODE | MONOCHROMATIC |
| | | CONTROL COMMAND (INCLUDING EMULATION MODE) | PAGE DESCRIPTION LANGUAGE A |
| | | PAPER SIZE | A4, LETTER |
| DATA RECEIVING DEVICE 30D | CONNECTION INFORMATION | PROTOCOL | IFAX |
| | | IDENTIFICATION CODE | E-MAIL ADDRESS |
| | | DATA FORMAT | TIFF-F COMPRESSION |
| | SPECIFICATION INFORMATION | PRINTING RESOLUTION | 300 DPI |
| | | PRINTING MODE | MONOCHROMATIC |
| | | PAPER SIZE | A4, LETTER |

FIG.51

| DESTINATION DEVICE | TRANSMISSION FORMAT |
|---|---|
| DEVICE 30B | COLOR/MONOCHROMATIC PRINTING (600 DPI) |
| DEVICE 30C | MONOCHROMATIC PRINTING (600 DPI) |
| DEVICE 30D | MONOCHROMATIC PRINTING (300 DPI) |

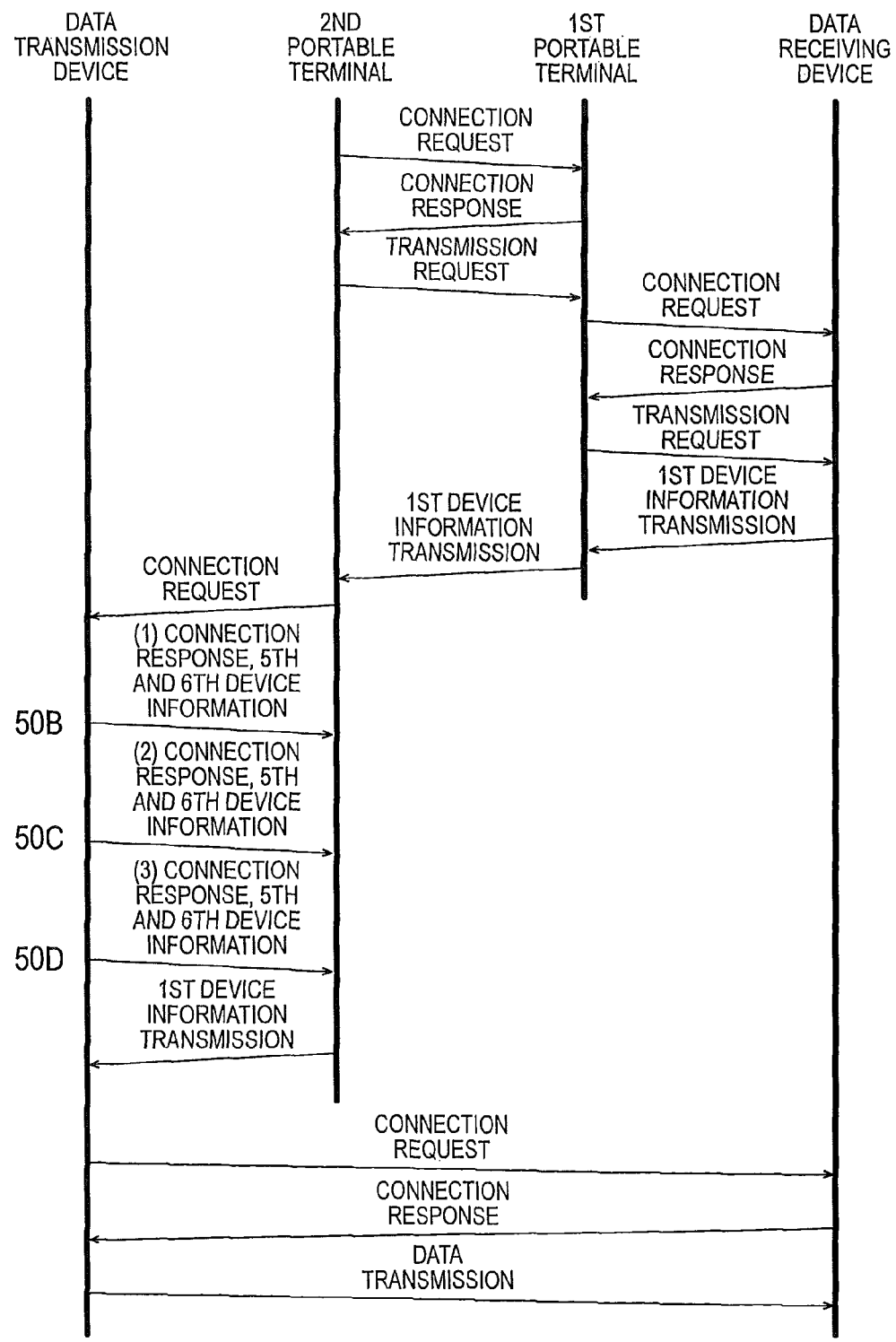

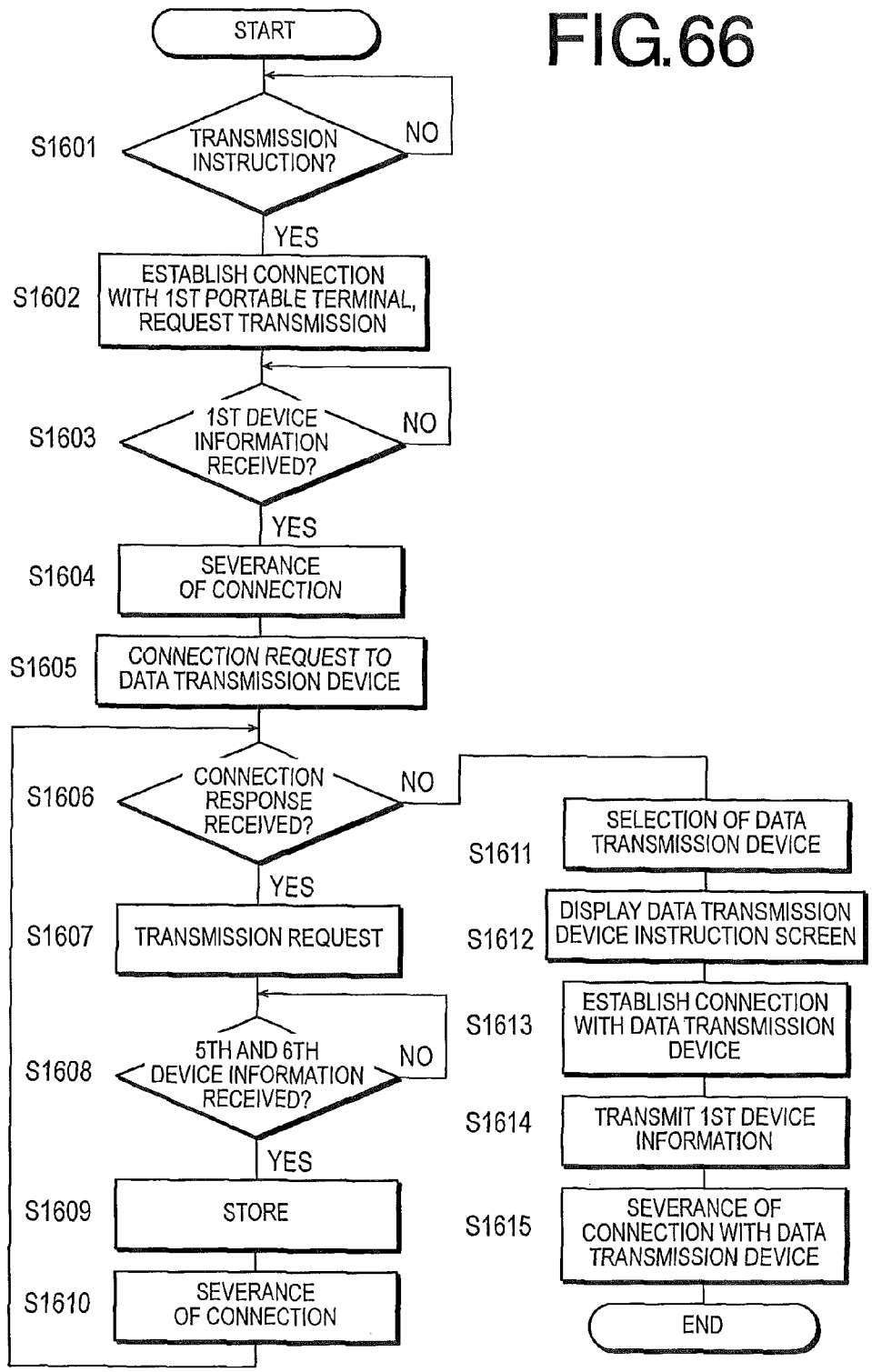

FIG.67A

DATA TRANSMISSION DEVICE 50B

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | COLOR/MONOCHROMATIC |
| | CONTROL COMMAND | PAGE DESCRIPTION LANGUAGE A, B |
| | PAPER SIZE | A4, A3, LETTER, LEGAL |

FIG.67B

DATA TRANSMISSION DEVICE 50C

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | MONOCHROMATIC |
| | CONTROL COMMAND | PAGE DESCRIPTION LANGUAGE A |
| | PAPER SIZE | A4, LETTER |

FIG.67C

DATA TRANSMISSION DEVICE 50D

| CONNECTION INFORMATION | PROTOCOL | IFAX |
|---|---|---|
| | IDENTIFICATION CODE | E-MAIL ADDRESS |
| | DATA FORMAT | TIFF-F COMPRESSION |
| SPECIFICATION INFORMATION | PRINTING RESOLUTION | 300 DPI |
| | PRINTING MODE | MONOCHROMATIC |
| | PAPER SIZE | A4, LETTER |

FIG.67D

DATA RECEIVING DEVICE 30

| CONNECTION INFORMATION | PROTOCOL | LPR |
|---|---|---|
| | IDENTIFICATION CODE | IP ADDRESS |
| SPECIFICATION INFORMATION | PRINTING RESOLUTION | 600 DPI |
| | PRINTING MODE | COLOR/MONOCHROMATIC |
| | CONTROL COMMAND | PAGE DESCRIPTION LANGUAGE A, B |
| | PAPER SIZE | A4, A3, LETTER, LEGAL |

FIG.68

PLEASE TRANSMIT DATA FROM DATA TRANSMISSION DEVICE 50B.

FIG.71

| SOURCE DEVICE | TRANSMISSION FORMAT |
|---|---|
| DEVICE 50B | COLOR/MONOCHROMATIC PRINTING (600 DPI) |
| DEVICE 50C | MONOCHROMATIC PRINTING (600 DPI) |
| DEVICE 50D | MONOCHROMATIC PRINTING (300 DPI) |

FIG.78

|  | PROTOCOL | IDENTIFICATION CODE |
|---|---|---|
| CONNECTION INFORMATION | TCP/IP | IP ADDRESS |
|  | FTP | SERVER NAME<br>DIRECTORY<br>PASSWORD |
|  | HTTP | URL :<br>SERVER NAME<br>DIRECTORY<br>PASSWORD |

NETWORK DEVICE CONNECTING SYSTEM, DATA TRANSMISSION DEVICE, DATA RECEIVING DEVICE, AND PORTABLE TERMINAL

This application is a divisional of application Ser. No. 09/961,363 filed Sep. 25, 2001 and claims priority to Japanese Patent Application No. 2000-296861 filed on Sep. 28, 2000 and Japanese Patent Application No. 2000-363581 filed on Nov. 29, 2000, the entire contents of each of which is hereby incorporated by reference.

BACKGROUND OF THE INVENTION

1. Field of the Invention

The invention relates to network device connecting system, data transmission device, data receiving device, and portable terminal using a network.

2. Description of Related Art

It has become popular in recent years to interconnect devices such as computers, scanners, copiers, and printers via a network in order to allow them to communicate with each other. The user can, for example, transmit data stored in a hard disk of one of the computers over the network to a printer located at a different place to be printed on paper.

However, if the printer is located far from the transmission side computer, there is a possibility that someone else can view the printed matter before the user arrives at the printer, which is undesirable in some cases from the standpoint of confidentiality. Furthermore, if the user is far from the computer where the data is stored due to reasons such as a business trip, the user may wish to print the data by a printer located nearby.

In order to solve these problems, a directive type printer, which requests a computer to send a specific data stored in a storage unit such as a hard disk thereof, and prints the data received on paper, has been proposed.

However, the directive type printer of the prior art requires setting of parameters such as IP address in order to be connected with the data storage unit of network device such as a computer where the data is stored, so that the process is complicated. When the data has to be printed using printers, in particular, the user has to perform the abovementioned setting at each printer each time so that it deteriorate the work efficiency considerably.

Meanwhile, the portability is an important issue for portable terminals, and size and weight reductions and power saving are emphasized in the development of new products. Thus, the portable terminals often have severe restrictions on functions other than communications. For that reason, it has been proposed to supplement the functions of a portable terminal by using another device located nearby to realize the functions that the portable terminal does not have.

For example, Japanese Unexamined Patent Publication No. H09-284847 (A) discloses a portable wireless communication system using cellular phones, PHS (Personal Handy phone System), land mobile radiotelephones, pagers, etc. This system allows the user to receive facsimile transmission at a portable terminal carried by the user and print received image data by any facsimile device where the user is located.

However, according to the above invention, the entire facsimile data has to be received and stored into the storage unit of the portable terminal. Therefore, the transmission and reception of the data is restricted by the capacity of the storage unit of the portable terminal. Moreover, the aforesaid invention cannot be applied to transmission and reception of data other than facsimile data so that its usage is limited.

SUMMARY OF THE INVENTION

A general object of the invention is to provide a technology for realizing the establishment of connection between various devices of a network with ease.

It is another general object of the invention to provide a technology for establishing the connection between a printer and a data storage device located away from the printer with ease and to print desired data stored in the data storage unit by the printer.

It is another general object of the invention to provide a technology for realizing a function that a portable terminal does not have using another device located nearby without being restricted by the functions of the portable terminal while having a general applicability concerning data transmission and reception.

It is still more specific object of the invention to provide a system including a first device connected to a network, a second device connected to the network, and at least one portable terminal. Device information of the first device containing connection information for establishing a connection between the first device and the second device is transmitted from the first device to the portable terminal and later transmitted from the portable terminal to the second device. Therefore, the connection between the first device and the second device is established based on the device information.

A further object of the invention is to provide a data transmission device to be used in a system including the data transmission device and a data receiving device which are connected to a network, and a portable terminal. The data transmission device includes a first transmission means for transmitting to said portable terminal device information containing connection information for establishing a connection between the data transmission device and the data receiving device, and a connection means for establishing the connection with the data receiving device according to a connection request transmitted from the data receiving device based on the device information.

Still a further object of the invention is to provide a data receiving device to be used in a system including a data transmission device and the data receiving device which are connected to a network, and a portable terminal. The data receiving device includes a receiving means for receiving from said portable terminal device information of the data transmission device containing connection information for establishing a connection between the data transmission device and the data receiving device, and a transmission means for transmitting a signal for requesting a connection to the data transmission device based on the device information.

Still a further object of the invention is to provide a portable terminal to be used in a system including a data transmission device and a data receiving device which are connected to a network, and the portable terminal. The portable terminal includes a receiving means for receiving device information containing connection information for establishing a connection between the data transmission device and the data receiving device from the data transmission device, a storage means for storing the device information, and a transmission means for transmitting the stored device information to the data receiving device.

Still a further object of the invention is to provide a data transmission device to be used in a system including the data transmission device and a data receiving device which are connected to a network, and at least one portable terminal.

The data transmission device includes a first transmission means for transmitting to said portable terminal a signal for obtaining device information containing connection information for establishing a connection between the data transmission device and the data receiving device from the data receiving device, a receiving means for receiving the device information from the portable terminal, and a second transmission means for transmitting a signal for requesting a connection to the data receiving device based on the device information.

Still a further object of the invention is to provide a data receiving device to be used in a system including a data transmission device and the data receiving device which are connected to a network, and at least one portable terminal. The data receiving device includes a transmission means for transmitting to the portable terminal device information containing connection information for establishing a connection between the data transmission device and the data receiving device according to a request signal from the portable terminal, and a connection means for establishing a connection with the data transmission device according to a signal for requesting the connection transmitted from the data transmission device based on the device information.

Still a further object of the invention is to provide a portable terminal to be used in a system including a data transmission device and a data receiving device which are connected to a network, and the portable terminal. The portable terminal includes a first transmission means for transmitting to the data receiving device a signal for requesting transmission of device information containing connection information for establishing a connection between the data transmission device and the data receiving device according to a request from the data transmission device, a receiving means for receiving the device information from the data receiving device, and a second transmission means for transmitting the device information received from the data receiving device to the data transmission device.

The objects, characteristics, and advantages of this invention other than those set forth above will become apparent from the following detailed description of the preferred embodiments, which refers to the annexed drawings.

BRIEF DESCRIPTION OF THE DRAWINGS

FIG. 8 is a flowchart of assistance in explaining the operating procedure of the scanner according to Embodiment I-1;

FIG. 26 is an example table of assistance in explaining device information of a data receiving device according to Embodiment II-3;

FIG. 27 shows a selection screen of a liquid crystal display of the data transmission device according to Embodiment II-3;

FIG. 29 is an example table of assistance in explaining device information edited by the portable terminal according to Embodiment II-4;

FIG. 42 shows a transmission hold selection screen of the portable terminal according to Embodiment II-8;

FIG. 43 shows a transmission start selection screen of the portable terminal according to Embodiment II-8;

FIG. 46 is an example table of assistance in explaining device information of a data receiving device according to Embodiment II-9;

FIG. 47 is an example table of assistance in explaining device information edited by a portable terminal according to Embodiment II-9;

FIG. 51 shows a data receiving device selection screen of a crystal display unit of the data transmission device according to Embodiment II-10;

FIG. 65 is a sequence chart of assistance in explaining the communication procedure of the data transmit-receive system according to Embodiment IV-2;

FIG. 66 is a flowchart of assistance in explaining the operating procedure of a second portable terminal according to Embodiment IV-2;

FIG. 67 is an example table of assistance in explaining device information according to Embodiment IV-2;

FIG. 68 shows a data transmission device instruction screen of a crystal display unit of the second portable terminal according to Embodiment IV-2;

FIG. 71 shows a data transmission device selection screen of a crystal display unit of the second portable terminal according to Embodiment IV-3;

FIG. 78 is an example table of assistance in explaining device information according to Embodiment V-1;

DETAILED DESCRIPTION OF THE PREFERRED EMBODIMENTS

The embodiments of this invention will be described below with reference to the accompanying drawings.

The overall structure of a printing system concerning Embodiment I-1 will be described referring to FIG. 1.

The printing system includes a scanner 10 having a function as a data storage device, a printer 20 and a portable terminal 40. The scanner 10 and the printer 20 are constituted to be able to communicate with each other via a network 30.

Figure 1:
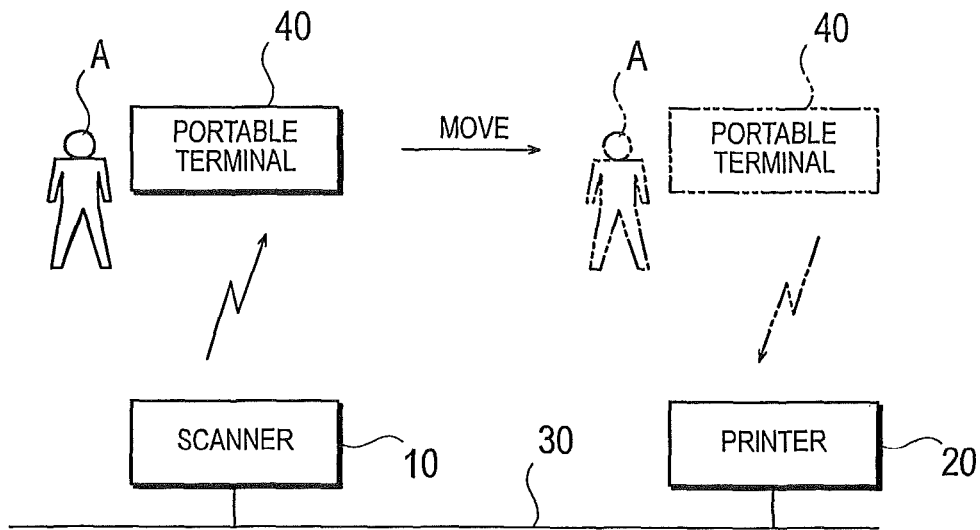
FIG. 1 is a block diagram illustrating the overall constitution of a printing system according to Embodiment I-1.

The kinds and the number of devices on the network 30 are not limited to those shown in FIG. 1. The network 30 can be, for example, a LAN (Local Area Network) or a WAN (Wide Area Network), which consists of LANs connected together, using Ethernet®, Token Ring, FDDI (Fiber Distributed Data Interface), etc.

Let us assume that a user-A carries a portable terminal 40 such as a cellular phone or a PHS. The portable terminal according to Embodiment I-1 is not limited to them, but can be a PDA (Personal Digital Assistant), notebook type computer, electronic notepads, etc., in other words, any terminal that can be transported by hand.

The portable terminal 40 is capable of performing short distance communications with the scanner 10 and the printer 20. The short distance communications include short distance wireless communications and short distance wired communications without recourse to the network 30.

For example, in case of short distance wireless communications, the communication distance is preferably less than 100 m, or more preferably less than 10 m. More specifically, such standards as Bluetooth®, IEEE 802.11, HomeRF® (Home Radio Frequency), and IrDA® (Infrared Data Association) are applicable to short distance wireless communications.

The constitutions of each device will be described below in details. In order to avoid duplications, the same function, which exists in various devices, will be described in the first device only and the description for the same will not be repeated for others.

Figure 2:
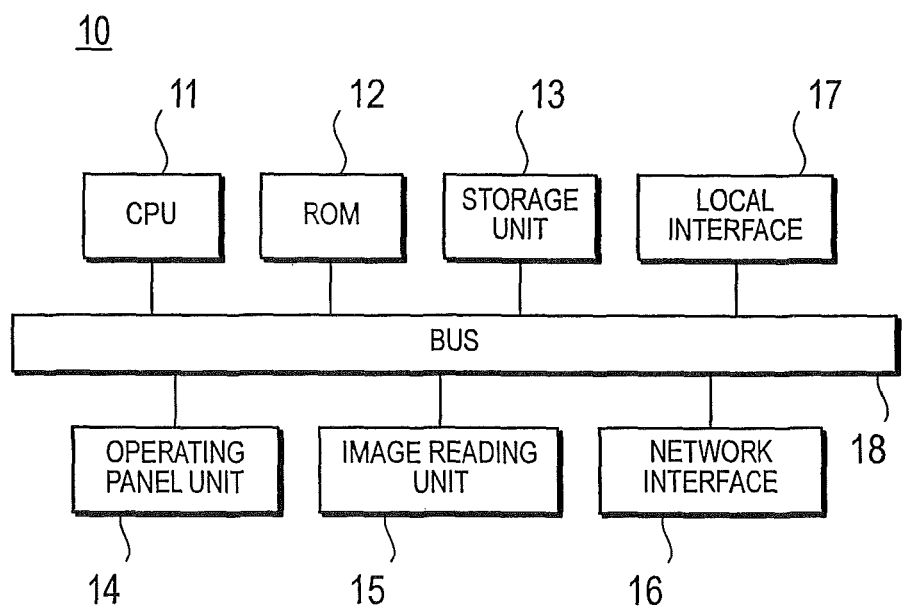
FIG. 2 is a block diagram illustrating an example of the constitution of a scanner according to Embodiment I-1.

The canner 10 has a CPU 11, a ROM 12, a storage unit 13, an operating panel unit 14, an image reading unit 15, a network interface 16, a local interface 17 and a bus 18 for exchanging signals between the above parts as shown in FIG. 2.

The CPU 11 performs various control and arithmetic processes. The ROM 12 stores various programs. The storage unit 13 stores various data such as image data, and is used as a working area by temporarily storing data as well. The storage unit 13 consists of, e.g., a memory and a hard disk.

The operating panel unit 14, for example, consists of an operating unit for the user to conduct various operating instructions and a display unit for various displays. The image reading unit 15 generates image data by reading an image of a document.

The network interface 16 is an interface for the scanner 10 to communicate with other network device such as printer 20 via the network 30.

The local interface 17 is an interface for the portable terminal 40 to communicate locally, i.e., within short distances, directly with other device. Specifically, the local interface 17 is preferably a wireless communication type interface in conformance with such standards as Bluetooth® and IrDA®.

Figure 3:
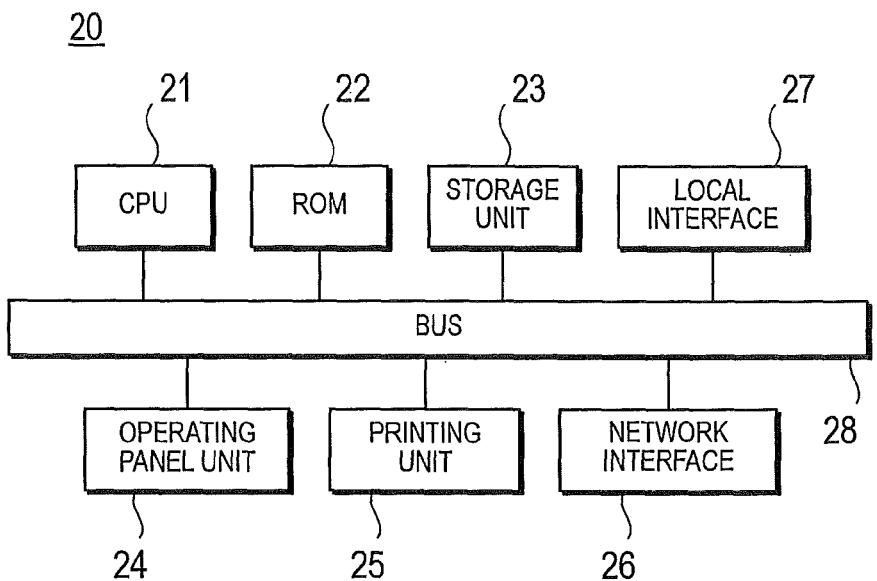
FIG. 3 is a block diagram illustrating an example of the constitution of a printer according to Embodiment I-1.

The printer 20 includes a CPU 21, a ROM 22, a storage unit 23, an operating panel unit 24, a printing unit 25, a network interface 26, a local interface 27 and a bus 28 as shown in FIG. 3.

The printer 20 receives various data transmitted by other network device such as the scanner 10 via the network 30 and prints the data on paper by the printing unit 25.

Figure 4:
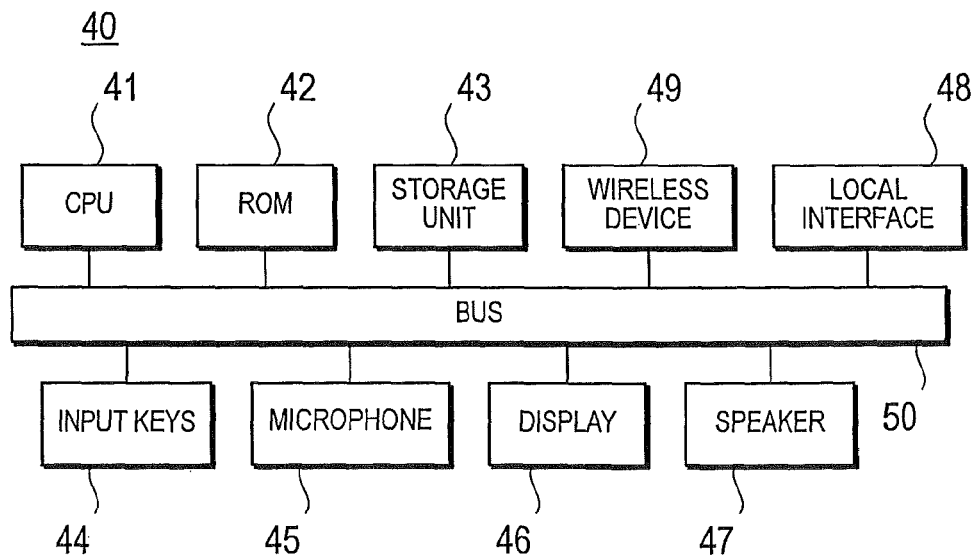
FIG. 4 is a block diagram illustrating an example of the constitution of a portable terminal according to Embodiment I-1.

The portable terminal 40 includes a CPU 41, a ROM 42, a storage unit 43, input keys 44, a microphone 45, a display 46, a speaker 47, a local interface 48, a wireless device 49, and a bus 50 as shown in FIG. 4.

The storage unit 43 stores various data such as device information concerning the scanner 10. The input keys 44 are used for making various inputs and the microphone 45 is used for making voice input. The display 46 is for various displays and the speaker 47 is for generating various voice outputs.

The local interface 48 corresponds with the local interfaces 17 and 27. Specifically, the local interface 48 is an interface for communicating with the scanner 10 and the printer 20 locally, i.e., for communicating directly with other device within short distances.

The wireless device 49 is a device for exchanging signals with external device via a mobile telecommunication network using electromagnetic waves of a prescribed frequency band.

Figures 5, 7:
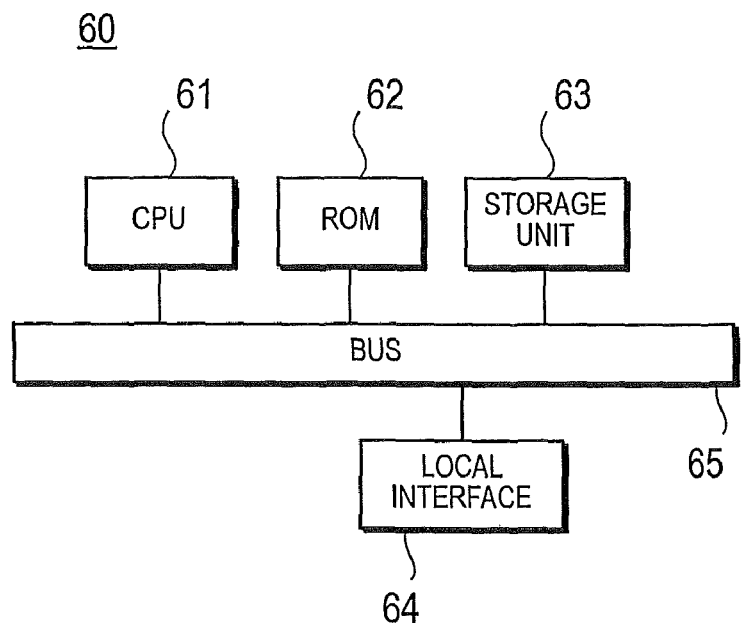
FIG. 5 is a block diagram illustrating another example of the constitution of the portable terminal according to Embodiment I-1.
FIG. 7 is an example table of assistance in explaining device information according to Embodiment I-1.

If a portable terminal that does not have the wireless communication function via the mobile telecommunication network, it does not need the above wireless device. FIG. 5 shows the necessary composing elements of a portable terminal regardless of whether it has the wireless communication function or not. Thus, a portable terminal 60 has to have at least a CPU 61, a ROM 62, a storage unit 63, a local interface 64, and a bus 65.

The operating procedure of the printing system will be described referring to the sequence chart shown in FIG. 6.

First, at the step S101, the scanner 10 reads an image of the document and stores the image data.

At the step S102, the portable terminal 40 transmits to the scanner 10 via the network 30 a signal requesting the device information of the scanner 10 including the connection information required for establishing connection with the scanner 10.

At the step S103, the scanner 10 transmits the device information to the portable terminal 40 and the device information is stored by the portable terminal 40.

At the step S104, after the user-A, who is carrying the portable terminal 40, moves to the vicinity of the printer 20 as shown by alternate long and two short dashes line in FIG. 1, the user-A operates the portable terminal 40 to transmit the device information to the printer 20, and the device information is stored in the printer 20.

At the step S105, the printer 20 transmits a connection request to the scanner 10 via the network 30 based on the connection information of the device information.

At the step S106, the scanner 10 transmits the connection response to the printer 20 via the network 30. Thus, the connection between the scanner 10 and the printer 20 is established.

At the step S107, the printer 20 transmits the device information to the scanner 10 and an image data information request for specifying the image data stored at the scanner 10. The scanner 10 authenticates the image data information request from the printer 20.

At the step S108, the scanner 10 transmits the image data information to the printer 20 and the image data information is stored into the printer 20.

At the step S109, the printer 20 transmits to the scanner 10 the request of an image data selected by the user-A from the image data information.

At the step S110, the scanner 10 transmits the requested image data to the printer 20.

The printer 20 prints the requested image data on paper (S111). When the user-A, who is carrying the portable terminal 40, later goes out of a predetermined range of the printer 20, the device information in the printer 20 is deleted (S112).

The device information will be described below referring to FIG. 7.

FIG. 7 shows an example of the device information of the scanner 10 when FTP (File Transfer Protocol) is applied to the transmission of the image data transfer.

The device information contains information about the scanner 10 such as an IP address, a login name, a password, and a directory name.

The connection information includes at least an identification code for identifying the scanner 10 on the network 30. The identification code is the IP address in Embodiment I-1. The login name and the password correspond to the user-A who uses the scanner 10. The directory name indicates the location of the data stored at the storage unit 13 of the scanner 10. FIG. 7 shows that the image data is stored at a directory called PRINTER in the storage unit 13 of the scanner 10.

The protocol for transmission of the data in the network 30 is not limited to the FTP but rather protocols such as LPR (Line Printer Remote) and IFAX (Internet FAX) can be used. When the IFAX is applied to the data transmission, the identification code is e-mail address.

The operating procedure of the scanner 10 will be described below referring to FIG. 8. The flow chart of FIG. 8 is stored as a control program in the ROM 12 and is executed by the CPU 11.

At the step S201, the document image is read by the image reading unit 15 and the image data obtained is stored at the storage unit 13.

At the step S202, the scanner 10 waits for the receipt of device information request. The device information of the scanner 10 contains the connection information required for establishing the connection between the portable terminal 40 and the scanner 10 via the local interface 17 and the network 30.

At the step 203, the scanner 10 transmits the device information to the portable terminal 40, when receiving the device information request (step S202: YES).

Incidentally, a number unique to the portable terminal 40 (e.g., telephone number) and the login name are stored correlated to each other at the storage unit 13 of the scanner 10 in advance. Furthermore, in response to the device information request from the portable terminal 40, the device information including the number unique to the portable terminal 40 is transmitted to the scanner 10.

Therefore, the scanner 10 is capable of transmitting the device information corresponding to the login name related to the number unique to the portable terminal 40 to the portable terminal 40.

It is also possible to transmit the device information from the scanner 10 to the portable terminal 40 by instruction using the operating panel unit 14 of the scanner 10 instead of making a device information request to the scanner 10 from the portable terminal 40. In this case, it is easy to add the login name to the device information using the operating panel unit 14 of the scanner 10.

At the step S204, the scanner 10 transmits the connection response to the printer 20 in response to the connection request from the printer 20 via the network 30 based on the connection information contained in the device information. Thus, the connection between the scanner 10 and the printer 20 is established via the network 30.

At the step S205, the scanner 10 waits for the image data information request from the printer 20. The image data information request is conducted by the transmission of the device information from the printer 20 to the scanner 10 via the network 30. The image data information is information such as a list of file names of the image data stored in the scanner 10.

At the step S206, authentication is performed by collating the device information received from the printer 20 and the device information stored in the scanner 10, when the image data information request is received (step S205: YES). When it succeeds to authenticate (step S206: YES), the step S207 is executed. If it fails to authenticate (step S206: No), the operation is terminated.

However, if it fails to authenticate, it is possible to transmit a predetermined warning, etc., to the printer 20 or the portable terminal 40. Moreover, it may be possible to skip the authentication.

The steps S204 through S206 can be executed as an integral process by transmitting the device information containing the connection information from the printer 20 to the scanner 10 via the network 30.

At the step S207, the image data information is transmitted to the printer 20 via the network 30.

At the step S208, the scanner 10 waits for the receipt of the request of image data selected by the user-A from the image data information to be transmitted by the printer 20. The image data as selected can be consisted of a plurality of files.

At the step S209, the image data is transmitted to the printer 20 via the network 30 when the request of the image data is received (step S208: YES). It is also possible to obtain the specification information (printing resolution, etc.) of the printer 20 from the printer 20 via the network 30, prepare a printing job for printing the image data based on the specification information, and transmit the printing job to the printer 20.

Figure 9:
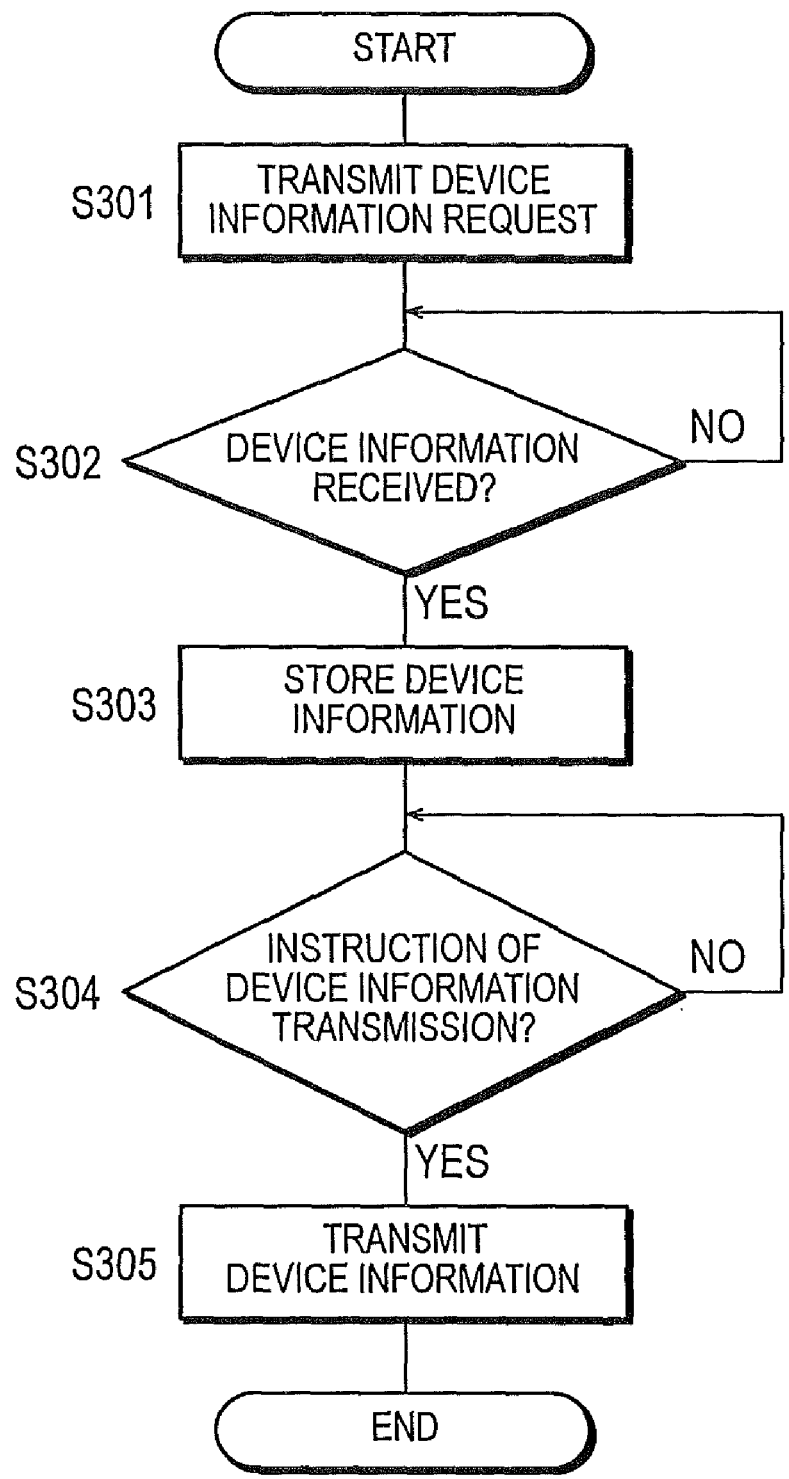
FIG. 9 is a flowchart of assistance in explaining the operating procedure of the portable terminal according to Embodiment I-1.

Referring to FIG. 9, the operating procedure of the portable terminal 40 will be described. The flowchart of FIG. 9 is stored in the ROM 42 as a control program, and is executed by the CPU 41.

First, at the step S301, based on the user-A's operation on the input keys 44, the portable terminal 40 transmits the device information request of the scanner 10 to the scanner 10 via the local interface 48.

At the step S302, the portable terminal 40 waits for the reception of the device information form the scanner 10 via the local interface 48.

At the step S303, the received device information is stored into the storage unit 43.

At the step S304, after the user-A, who is carrying the portable terminal 40, moves to the vicinity of the printer 20 as shown by alternate long and two short dashes line in FIG. 1, the portable terminal 40 waits for the user-A to enter an instruction by operating the input keys 44 for transmitting the device information to the printer 20.

At the step S305, when it is instructed to transmit the device information (step S304: YES), the portable terminal 40 transmits the device information to the printer 20 via the local interface 48.

The transmission of the device information to the printer 20 is not limited to the constitution where it is performed by the user-A operating the input keys 44 of the portable terminal 40. For example, it is possible to constitute the system in such a way that the device information is automatically transmitted to the printer 20 when the portable terminal 40 enters into the range communicable with the printer 20. The method of judging whether the portable terminal 40 is within the range communicable with the printer 20 will be described later.

Figure 10:
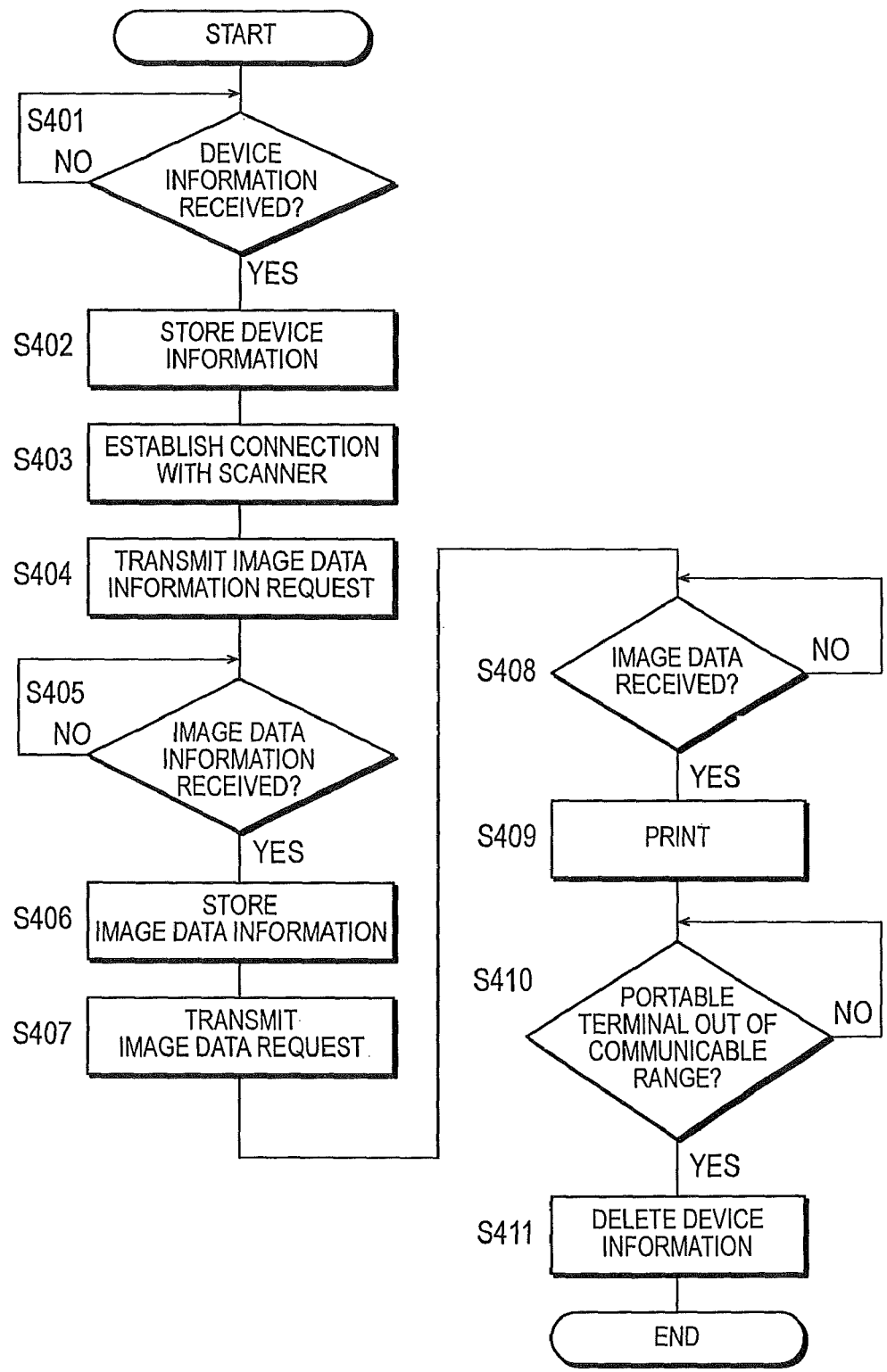
FIG. 10 is a flowchart of assistance in explaining the operating procedure of the printer according to Embodiment I-1.

The operating procedure of the printer 20 will be described referring to FIG. 10. The flowchart of FIG. 10 is stored, for example, as a control program in the ROM 22, and is executed by the CPU 21.

First, at the step S401, the printer 20 waits for the reception of the device information from the portable terminal 40 via local interface 27.

At the step S402, when the device information is received (step S401: YES), the received device information is stored in the storage unit 23.

At the step S403, the printer 20 receives the connection response from the scanner 10 in response to the connection request from the printer 20 via the network 30 based on the connection information contained in the device information. As a result, the connection between the scanner 10 and the printer 20 via the network 30 is established.

At the step S404, the image data information request is transmitted to the scanner 10 via the network 30. The image data information is information such as a name list of image data files as mentioned before. The image data information is information at the directory named PRINTER as shown in FIG. 7 in case of Embodiment I-1.

The steps S403 and S404 can be executed as an integral process by transmitting the device information containing the connection information from the printer 20 to the scanner 10 via the network 30.

At the step S405, the printer 20 waits for the reception of the image data information from the scanner 10 via the network 30.

At the step 406, when the image data information is received (step S405: YES), the received image data information is stored into the storage unit 23.

At the step S407, the request for image data selected from the image data information by the user-A operating the operating panel unit 24 is transmitted to the scanner 10 via the network 30.

At the step S408, the printer 20 waits for the reception of the selected image data from the scanner 10 via network 30.

At the step S409, the printing unit 25 prints the image data on paper when the image data is received (step S408: YES).

At the step S410, after the printing, the printer 20 waits for the portable terminal 40 to go out of the range communicable with the printer 20.

The judgment on whether the portable terminal 40 is within the range communicable with the printer 20 is based on the connection check wherein the printer 20 tries connection with the portable terminal 40 at a constant time interval and severs the connection as soon as it establishes the connection.

In other words, when the printer 20 is no longer capable of connecting with the portable terminal 40 using the local interface 27, the portable terminal 40 is judged to be out of the range communicable with the printer 20.

It is also possible to make the judgment of whether the portable terminal 40 is within the range communicable with the printer 20 based on the connection check by the portable terminal 40 rather than the printer 20.

At the step S411, when the portable terminal 40 is out of the range communicable with the printer 20 (step S410: YES), the printer 20 deletes the device information of the scanner 10 stored in the storage unit 23.

According to Embodiment I-1, the connection between the scanner 10 and the printer 20 can be realized via the network 30 using the portable terminal 40 that stores the device information.

Therefore, it is possible to make the printer 20 print any desired image data stored in the scanner 10 by establishing the connection between the printer 20 located close to the user and the scanner 10 located at a distant place. It is less likely for the printed result being exposed to a third party, so that it is more desirable from the security standpoint.

Furthermore, if the user is far from the scanner 10 due to reasons such as a business trip, it is convenient to be able to print the data on the spot by a printer located close to the user. Moreover, the data volume of the device information is less than the image data that is being transmitted over the network 30 so that the burden on the portable terminal 40 is substantially limited.

In addition, since the device information of the scanner 10 stored in the printer 20 is deleted when the portable 40 moves away from the printer 20 a prescribed distance, it is possible to prevent the device information from being abused so that it is more desirable from the security standpoint.

On the other hand, if the portable terminal 40 stays within a certain distance from the printer 20, the device information is not deleted so that a desired number of copies of image data can be printed. Moreover, it is convenient as the deletion of the device information is automatically done.

The printing system according to Embodiment I-2 will be described referring to FIG. 11.

Embodiment I-2 is different from Embodiment I-1 using the portable terminal 40 on the point that a memory card 70 is used to establish the connection between a scanner 10a and a printer 20a via the network 30. However, the two are generally identical on all other points, so that the description will focus on the differences and the descriptions on commonalities will be omitted.

This printing system includes the scanner 10a that has a capability as a data storage device, the printer 20a, and the memory card 70. The scanner 10a and the printer 20a are constituted to be communicable with each other via the network 30.

The user-A carries the memory card 70, which is a storage medium using a flash memory. However, other portable memory media, e.g., a magnetic memory medium such as a flexible disk or ZIP®, or an opto-magnetic memory medium such as MO (magneto-optical disc) can be used instead of the memory card 70.

Various data in the memory card 70 can be read or various data can be written on the memory card 70 as the memory card 70 is attached to the scanner 10a or the printer 20a.

Figure 12:
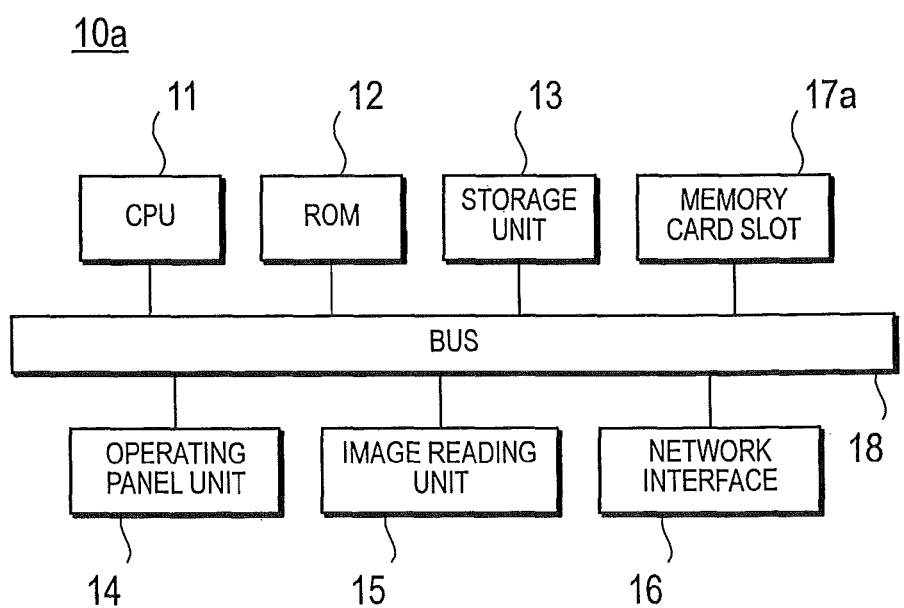
FIG. 12 is a block diagram illustrating an example of the constitution of a scanner according to Embodiment I-2.
Figure 13:
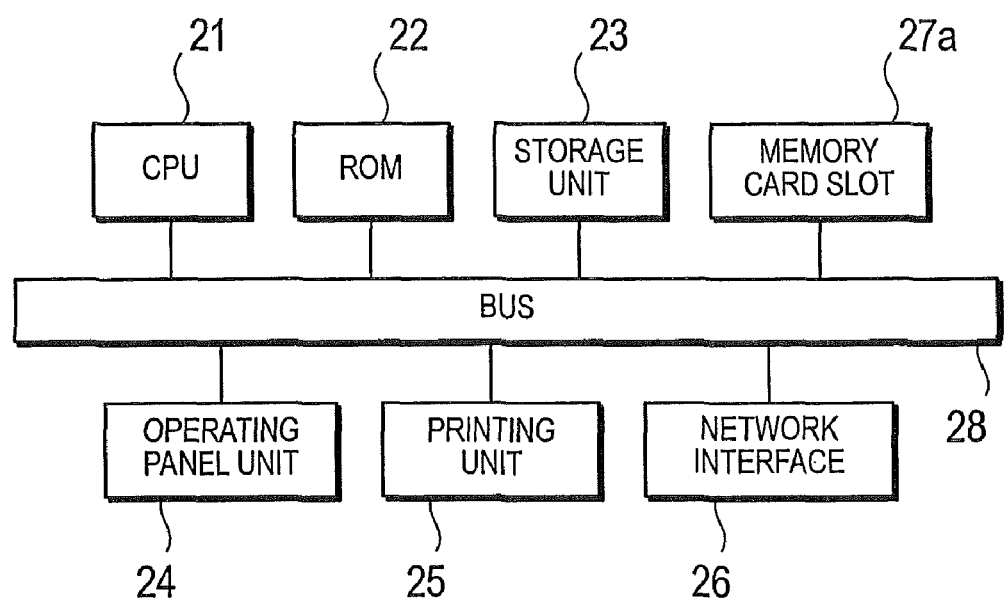
FIG. 13 is a block diagram illustrating an example of the constitution of a printer according to Embodiment I-2.

FIG. 12 is a block diagram illustrating an example of the constitution of the scanner 10a and FIG. 13 is a block diagram illustrating an example of the constitution of the printer 20a.

The scanner 10a is different from the scanner 10 of Embodiment I-1 in that it has a slot 17a for the memory card 70 instead of the local interface 17. The slot 17a is constituted to accept the insertion of the memory card 70 for writing the device information of the scanner 10a on the memory card 70.

The printer 20a is different from the printer 20 of Embodiment I-1 in that it has a slot 27a for the memory card 70 instead of the local interface 27. The slot 27a is constituted to accept the insertion of the memory card 70 for reading the device information of the scanner 10a from the memory card 70. The device information is stored into the storage unit 23 of the printer 20a.

Figure 14:
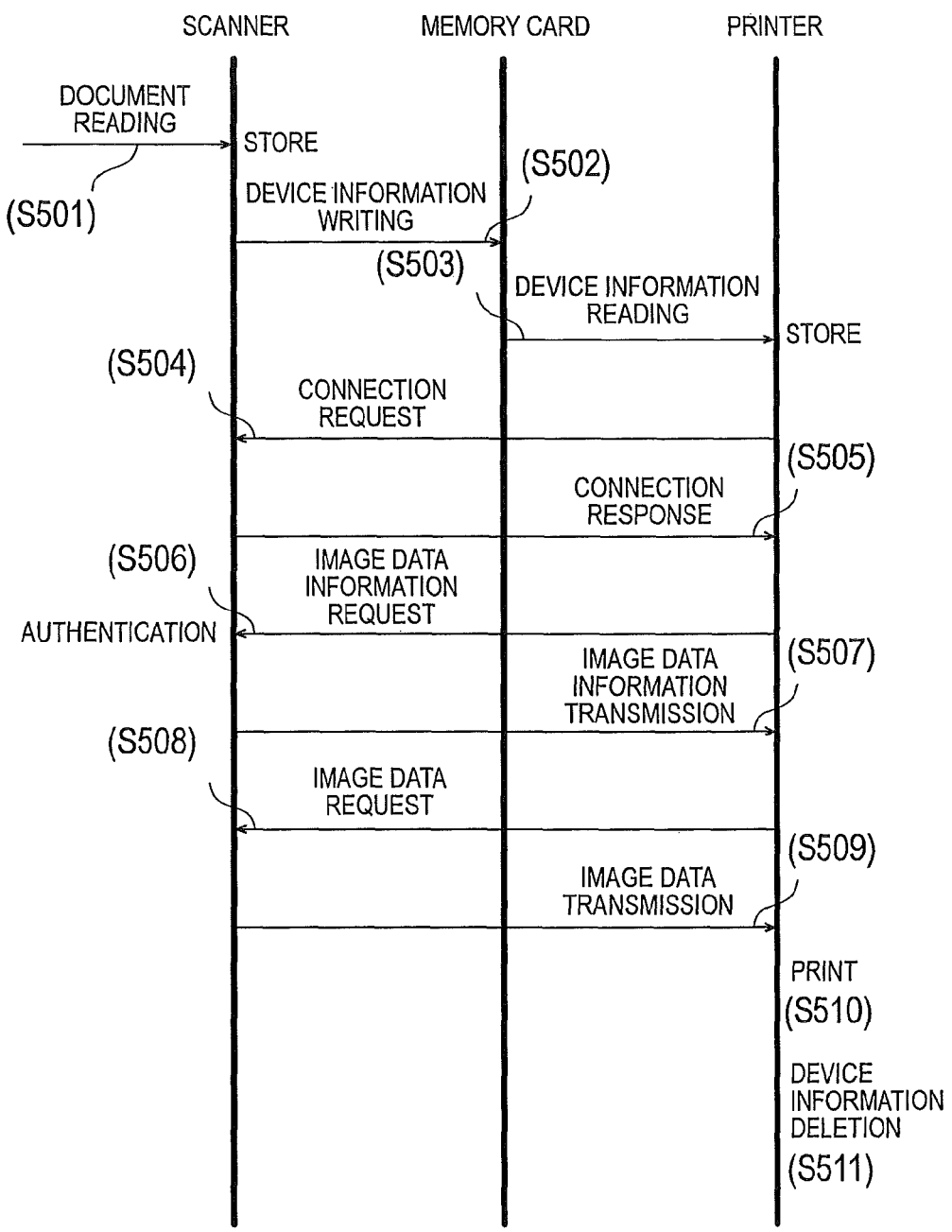
FIG. 14 is a sequence chart of assistance in explaining the operating procedure of the printing system according to Embodiment I-2.

The operating procedure of the printing system is described referring to the sequence chart shown in FIG. 14.

At the step S501, the scanner 10a reads an image of the document, and stores the image data.

At the step S502, the scanner 10a writes on the memory card 70 inserted into the slot 17a the device information of the scanner 10a containing the connection information required for establishing a connection with the scanner 10a via the network 30 based on the instruction provided by the user-A using the operating panel unit 14.

Figure 11:
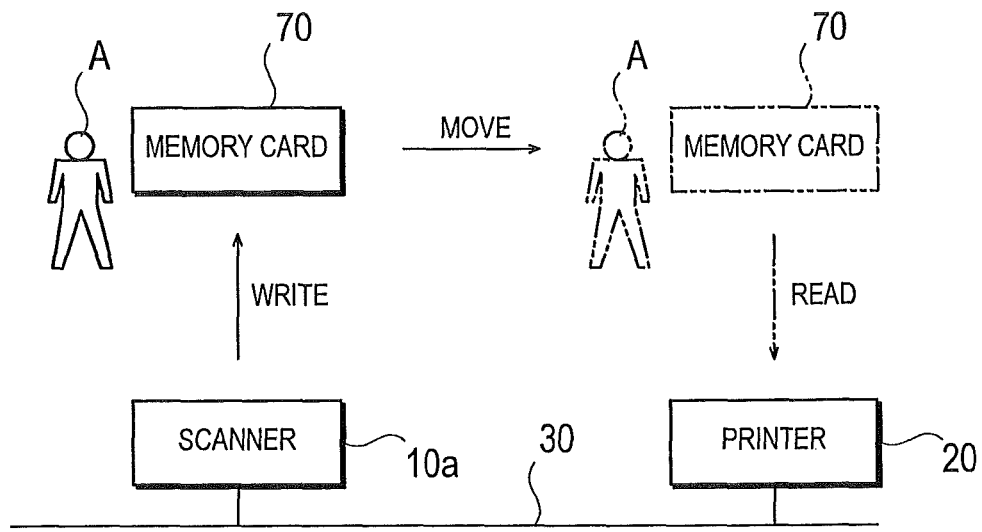
FIG. 11 is a block diagram illustrating the overall constitution of a printing system according to Embodiment I-2.

At the step S503, after the user-A, who is carrying the memory card 70, moves to the vicinity of the printer 20a as shown by alternate long and two short dashes line in FIG. 11, the printer 20a reads the device information from the memory card 70 inserted into the slot 27a based on the instruction provided by the user-A using the operating panel unit 24. The device information is stored into the printer 20a.

Figure 6:
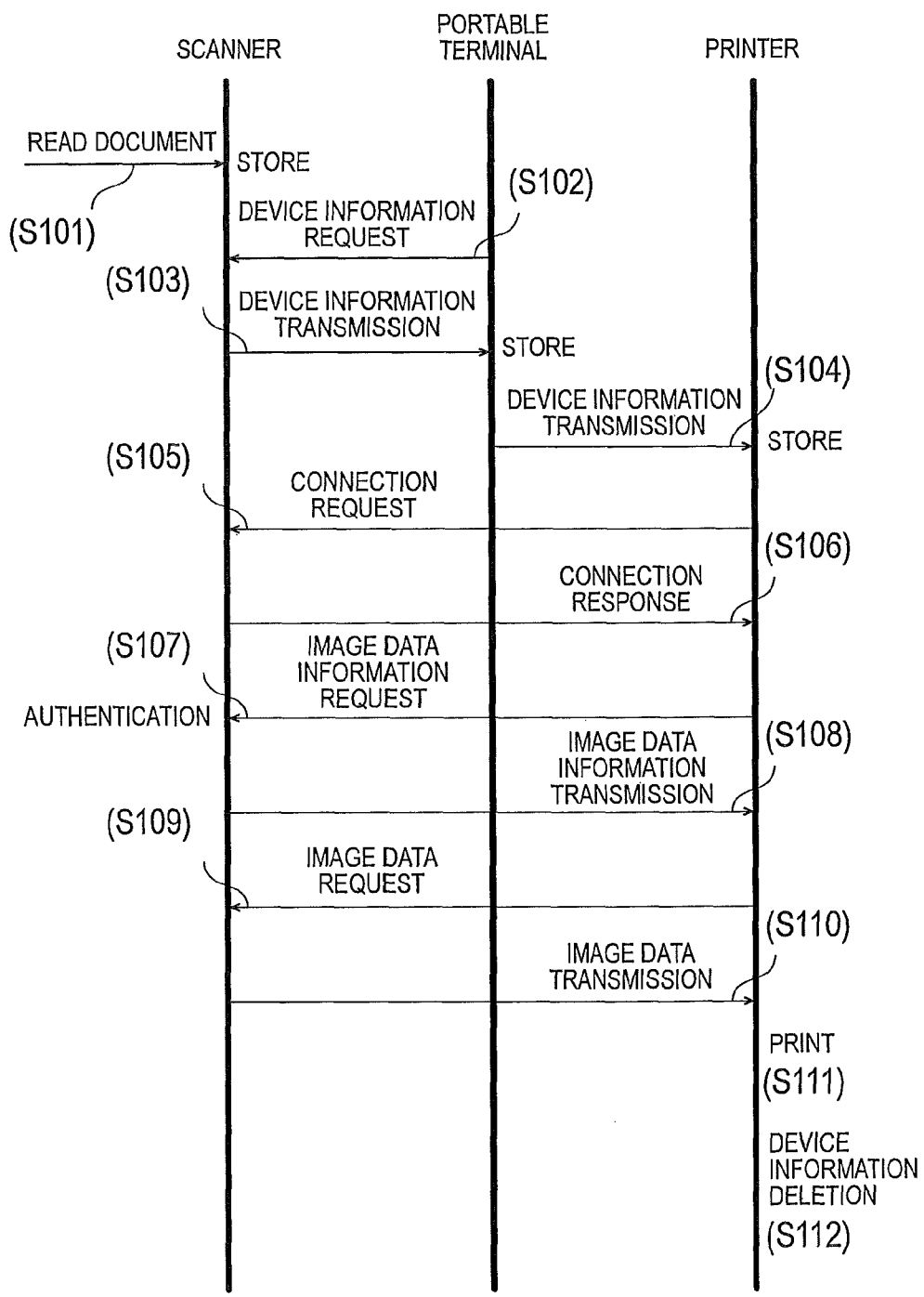
FIG. 6 is a sequence chart of assistance in explaining the operating procedure of the printing system according to Embodiment I-1.

Since the steps S504 through S510 are identical to the steps S105 through S111 of Embodiment I-1 shown in FIG. 6, their descriptions will not be repeated here.

In Embodiment I-2, after printing the selected image data, the printer 20a deletes the stored device information (S511).

Embodiment I-2 describes that the device information stored in the printer 20a is deleted at the end of one job of printing an image data. However, the device information may be deleted at the end of a plurality of printing jobs. In such a case, it is preferable that the printer 20a should ask the user whether the next print job exists by means of the operating panel unit 24.

Thus, in Embodiment I-2, it is possible to realize the connection between the scanner 10a and the printer 20a via the network 30 by means of the memory card 70 that stores the device information. This means that Embodiment I-2 can provide an approximately equal effect as Embodiment I-1.

Embodiment II-1 will be described below.

Figure 15:
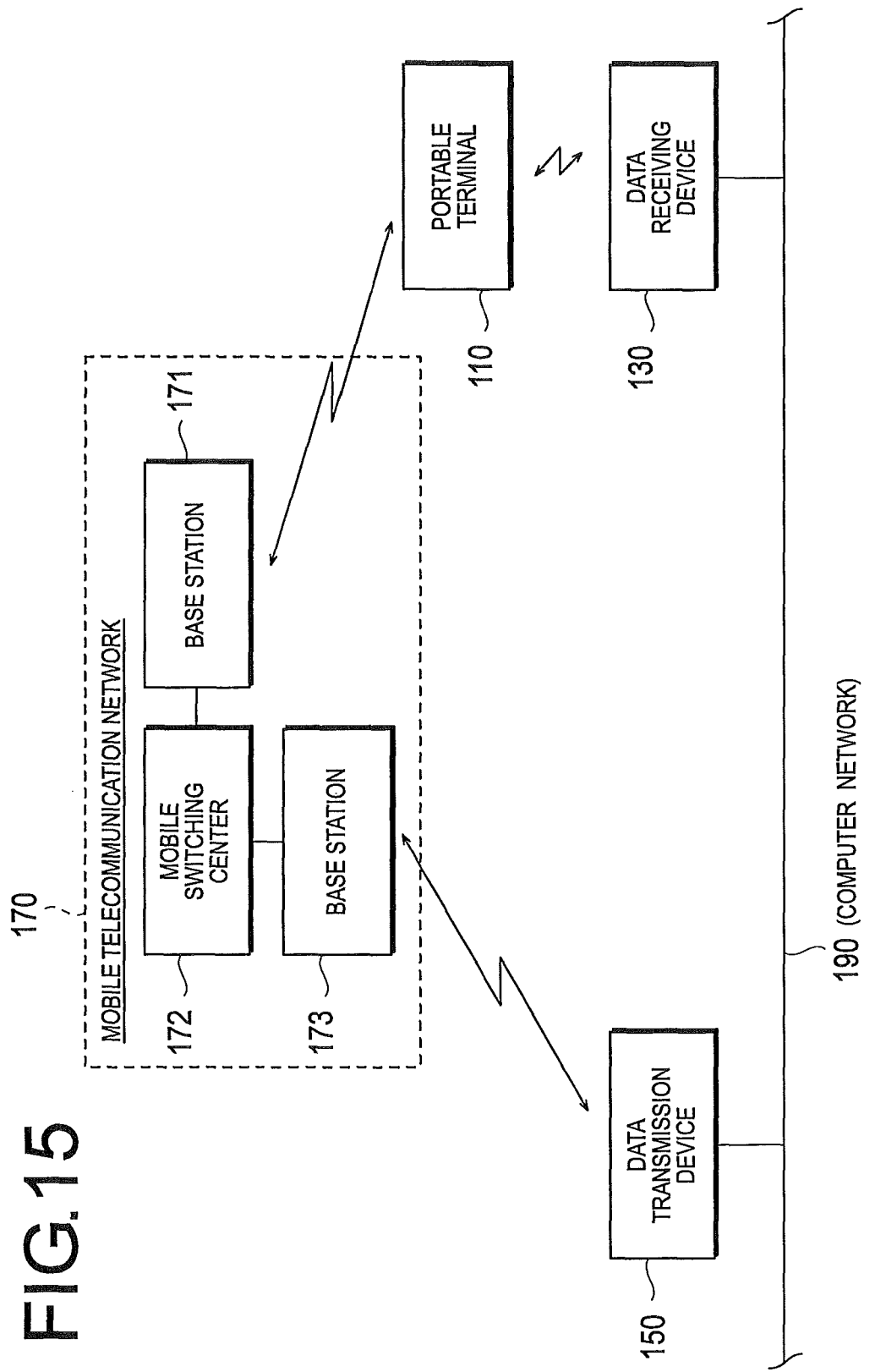
FIG. 15 is a schematic diagram of a data transmit-receive system according to Embodiment II-1.

The data transmit-receive system according to Embodiment II-1 is, as shown in FIG. 15, includes a portable terminal 110, a data receiving device (first device) 130, and a data transmission device (second device) 150.

The portable terminal 110 is communicable with the data receiving device 130 by means of wireless connection with external devices for short distance communications, and also with the data transmission device 150 via the mobile telecommunication network 170. Specifically, the portable terminal 110 has a means of communicating through the mobile telecommunication network 170 as well as a local communication means for communicating in short distances.

In more detail, the mobile telecommunication network 170 includes a base station 171 that communicates wirelessly with the portable terminal 110, a base station 173 that communicates wirelessly with the data transmission device 150, and a mobile switching center 172 that connects the base station 171 and the base station 173. When both the portable terminal 110 and the data transmission device 150 are located within the same cell, they share the common base station.

The data receiving device 130 includes a communication means of communicating through the computer network 190 and a local communication means for short distance communications. The data transmission device 150 has a communication means of communicating with the portable terminal 110 via the mobile telecommunication network 170 and a means of communicating with the data receiving device 130 via the computer network 190.

Therefore, the data receiving device 130 and the data transmission device 150 are communicable via the computer network 190. The computer network 190 is, e.g., LAN, WAN, or the Internet.

Figure 16:
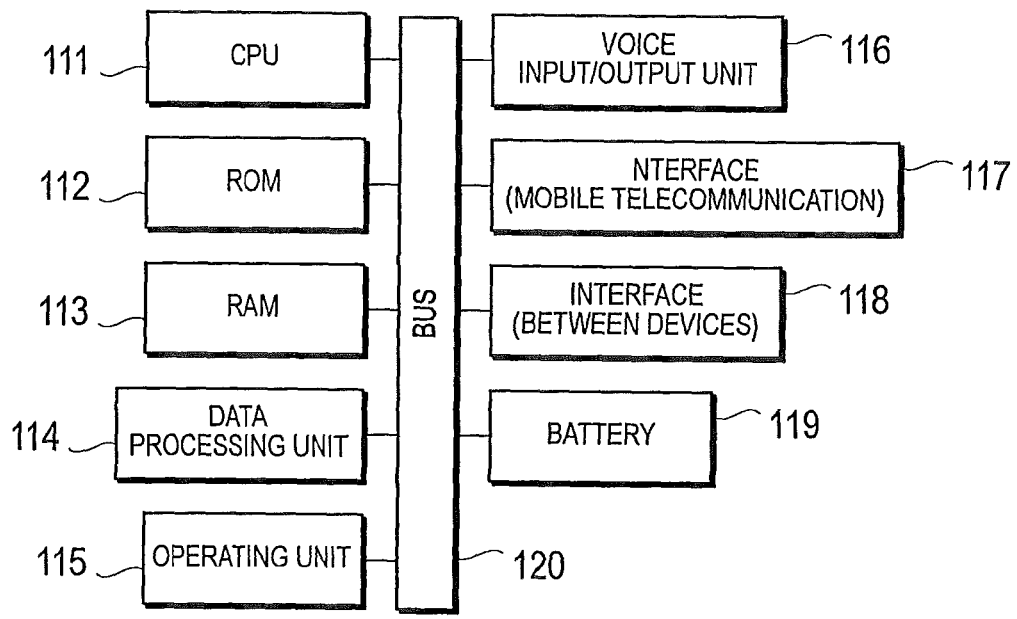
FIG. 16 is a block diagram of a portable terminal belonging to the data transmit-receive system according to Embodiment II-1.
Figure 17:
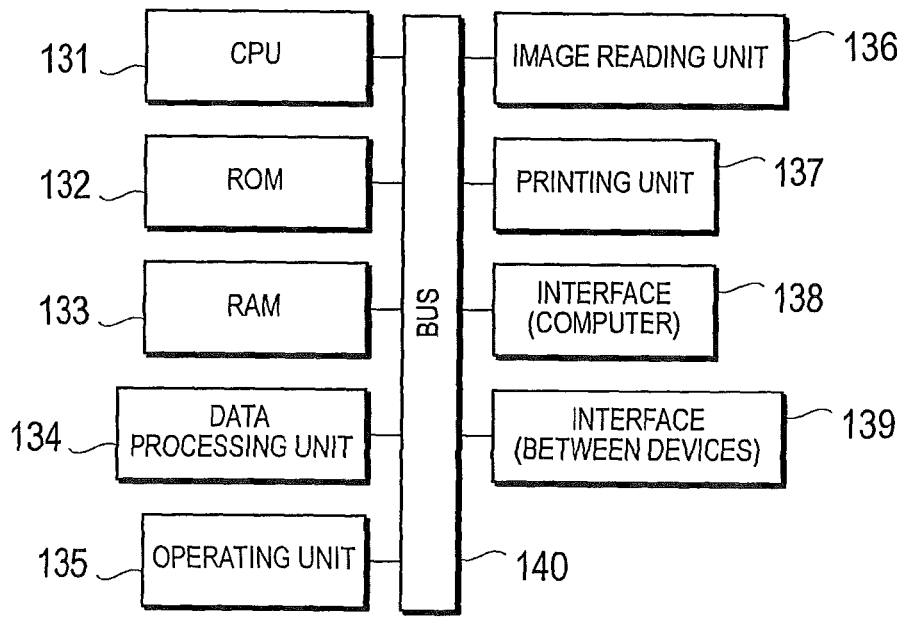
FIG. 17 is a block diagram of a data receiving device belonging to the data transmit-receive system according to Embodiment II-1.
Figures 18, 20:
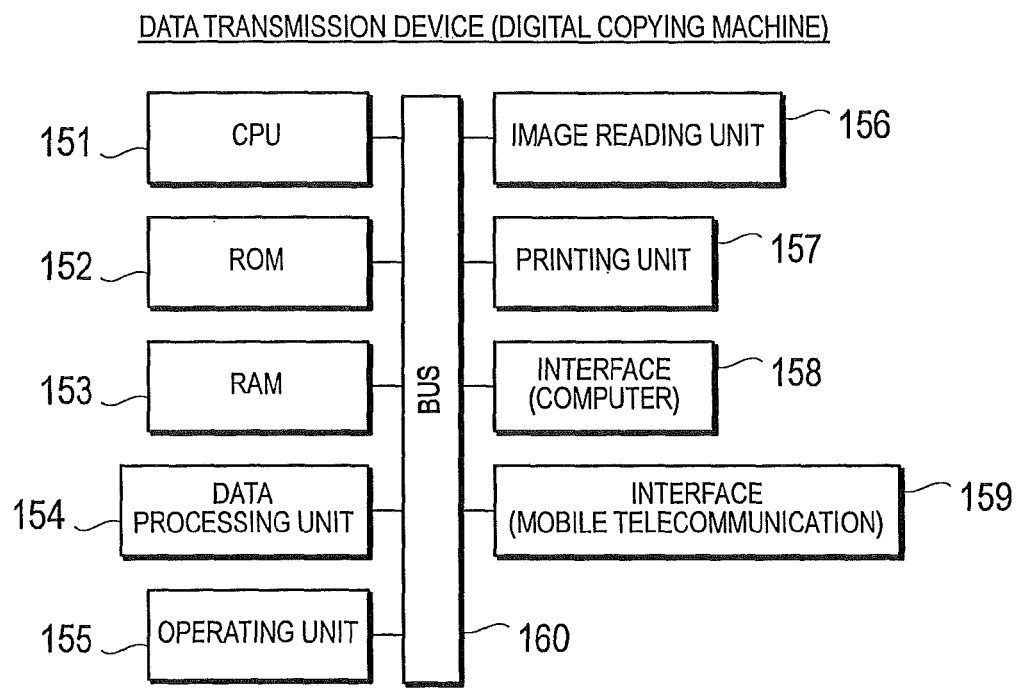
FIG. 18 is a block diagram of a data transmission device belonging to the data transmit-receive system according to Embodiment II-1.
FIG. 20 is an example table of assistance in explaining device information of the data receiving device according to Embodiment II-1.

The constitutions of the portable terminal 110, the data receiving device 130, and the data transmission device 150 referring to FIG. 16 through FIG. 18.

The portable terminal 110 is, as shown in FIG. 16, includes a control unit (CPU) 111, a read only storage unit (ROM) 112, a random access storage unit (RAM) 113, a data processing unit 114, an operating unit 115, a voice input/output unit 116, an interface 117 for the mobile telecommunication network 170, an interface 118 for the wireless connection with external devices, and a battery 119, all of which are interconnected via the bus 120.

The operating unit 115 includes keyboard for entering data and a liquid display for displaying data. The voice input/output unit 116 includes a microphone for inputting voices and a speaker for reproducing voices.

The wireless LAN standard (IEEE 802.11) using 2.4 GHz band electromagnetic waves or infrared rays with wavelengths of 850 nm to 950 nm, the Bluetooth® standard using 2.4 GHz band electromagnetic waves, or the IrDA® standard for infrared ray data communications are applicable to the wireless connection between devices. If PHS is used as a portable terminal 110, the transceiver function of PHS is applicable to the wireless connection between devices.

The data receiving device 130 is a digital color copying machine and, as shown in FIG. 17, includes a control unit (CPU) 131, a read only storage unit (ROM) 132, a random access storage unit (RAM) 133, a data processing unit 134, an operating unit 135, an image reading unit 136, a printing unit 137, an interface 138 for the computer network 190, and an interface 139 for the wireless communications between devices, all of which are interconnected by the bus 140. The interface 138 consists of a network interface card (NIC). The interface 139 corresponds to the interface 118 of the portable terminal 110.

The printing unit 137 can handle two kinds of page description languages A and B including the emulation mode, has the printing resolution of 600 dpi (dots per inch), has the color and monochromatic printing modes, and accommodates the A4, A3, letter and legal paper sizes. The operating unit 135 includes a LCD (Liquid Crystal Display) integrated with a touch screen panel for entering data.

The data transmission device 150 is a digital color copying machine and, as shown in FIG. 18, includes a control unit (CPU) 151, a read only storage unit (ROM) 152, a random access storage unit (RAM) 153, a data processing unit 154, an operating unit 155, an image reading unit 156, a printing unit 157, an interface 158 for the computer network 190, and an interface 159 for the mobile telecommunication network 170, all of which are interconnected by the bus 160. The interface 158 consists of, for example, a NIC.

Figure 19:
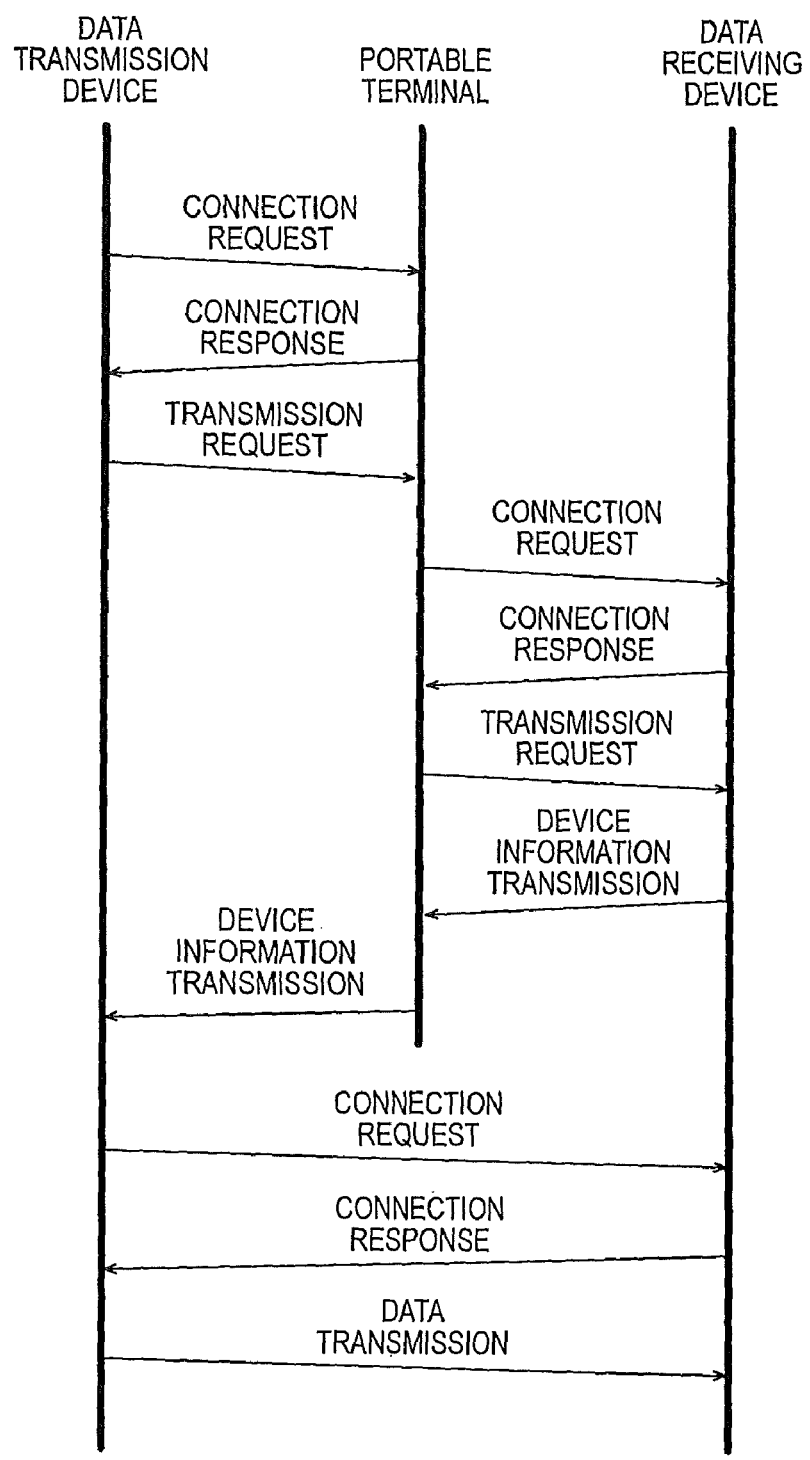
FIG. 19 is a sequence chart of assistance in explaining the communication procedure of the data transmit-receive system according to Embodiment II-1.

The communication procedure of the data transmit-receive system will be described referring to the sequence chart shown in FIG. 19.

First, the data transmission device 150 transmits the connection request to the portable terminal 110 via the mobile telecommunication network 170. As it receives a connection request, the portable terminal 110 transmits a connection response to the data transmission device 150 via the mobile telecommunication network 170.

Thus, the connection between the data transmission device 150 and the portable terminal 110 is established. The data transmission device 150 transmits a device information transmission request to the portable terminal 110 via the mobile telecommunication network 170.

As it receives the device information transmission request, the portable terminal 110 transmits a connection request to the data receiving device 130 located nearby by means of the wireless connection between devices.

As it receives the connection request, the data receiving device 130 transmits a connection response to the portable terminal 110 by means of the wireless connection between devices.

Thus, the connection between the portable terminal 110 and the data receiving device 130 is established. Then, the portable terminal 110 transmits the device information transmission request to the data receiving device 130.

Next, the data receiving device 130 transmits the device information to the portable terminal 110, and then severs the connection with the portable terminal 110. On the other hand, the portable terminal 110 transmits the received device information to the data transmission device 150 via the mobile telecommunication network 170, and severs the connection with the data transmission device 150.

The data transmission device 150 transmits the connection request to the data receiving device 130 via the computer network 190 based on the device information. As it receives the connection request, the data receiving device 130 transmits the connection response to the data transmission device 150 via the computer network 190.

Thus, the connection between the data transmission device 150 and the data receiving device 130 is established. The data transmission device 150 transmits the data to the data receiving device 130, and then severs the connection with the data receiving device 130.

The device information will be described below referring to FIG. 20.

The device information includes the connection information for the computer network 190 required for transmitting the data from the data transmission device 150 to the data receiving device 130 and the specification information of the output means of the data receiving device 130.

The connection information includes the communication protocol for the computer network 190 and the identification code of the data receiving device 130, and they are the LPR protocol and the IP address in case of Embodiment II-1.

As the output means of the data receiving device 130 is the printing unit 137 in case of Embodiment II-1, the specification information includes the printing resolution, the printing mode, the control command, and the paper size. The control commands, for example, are the page description languages A and B that are usable in the data receiving device 130 and include the emulation mode.

Figure 21:
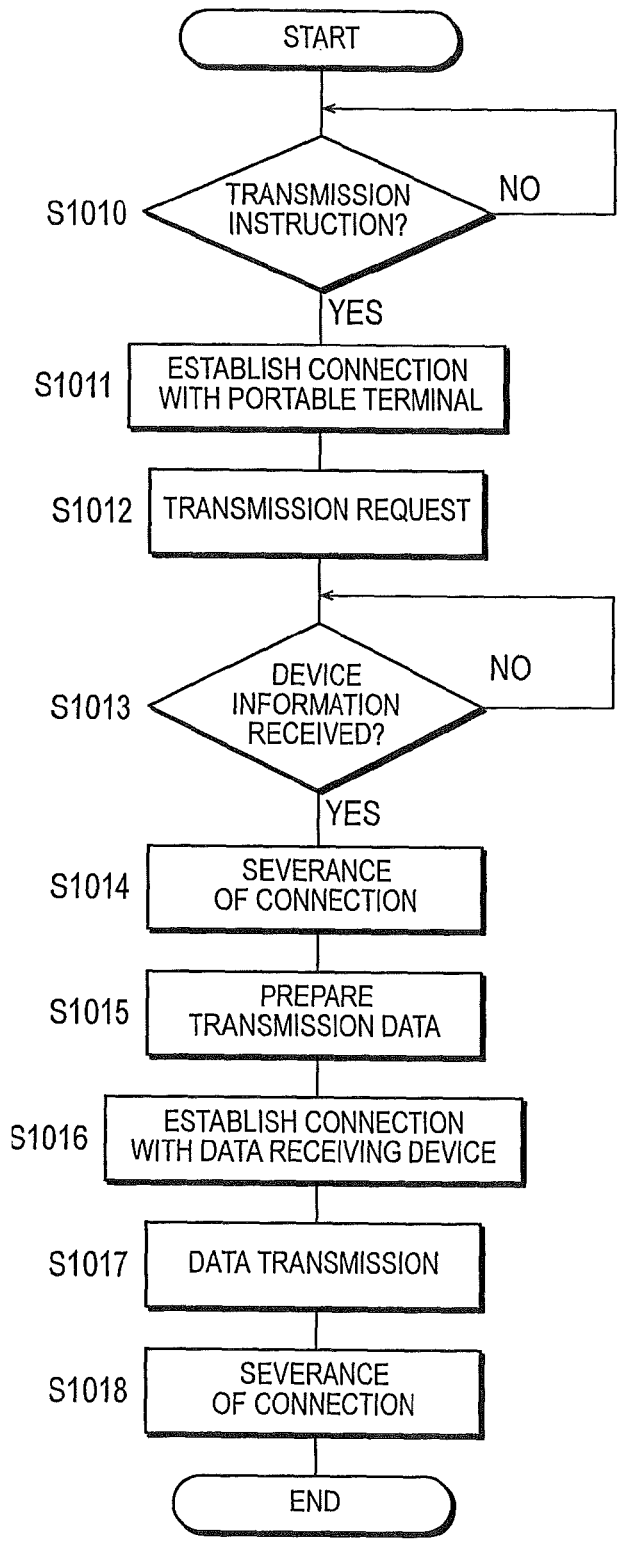
FIG. 21 is a flowchart of assistance in explaining the operating procedure of the data transmission device according to Embodiment II-1.

The operating procedure of the data transmission device 150 will be described in detail referring to FIG. 21. The flow chart shown in FIG. 21 is, for example, stored as the control program in the ROM 152 and is executed by the CPU 151.

First, a judgment is made as to whether a transmission instruction is inputted by the user, who is using the operating unit 155 (step S1010). If it is judged that the transmission instruction is inputted, a connection with the portable terminal 110 via the mobile telecommunication network 170 is established (step S1011), and a device information transmission request is transmitted to the portable terminal 110 (step S1012).

On the other hand, if it is judged that no transmission request exists, a judgment at the step S1010 will be repeated until a transmission instruction is inputted.

Then, a judgment is made whether the device information is received from the portable terminal 110 via the mobile telecommunication network 170 (step S1013). If it is judged that the device information is received, the connection with the portable terminal 110 is severed (step S1014).

On the other hand, if it is judged that the device information has not been received, a judgment at the step S1013 will be repeated until the device information is received. The device information is to be stored in the RAM 153.

Next, the specification information contained in the device information read from the RAM 153 is used at the data processing unit 154 for preparing the data for transmission (step S1015). The data for transmission can be document image data obtained by the image reading unit 156 and be stored temporarily in the RAM 153.

After that, a connection with the data receiving device 130 via the computer network 190 is established (step S1016) based on the connection information contained in the device information, i.e., the LPR protocol and the IP address. The prepared data is transmitted to the data receiving device 130 (step S1017). When the transmission of the prepared data is completed, the connection with the data receiving device 130 will be severed (step S1018).

Figure 22:
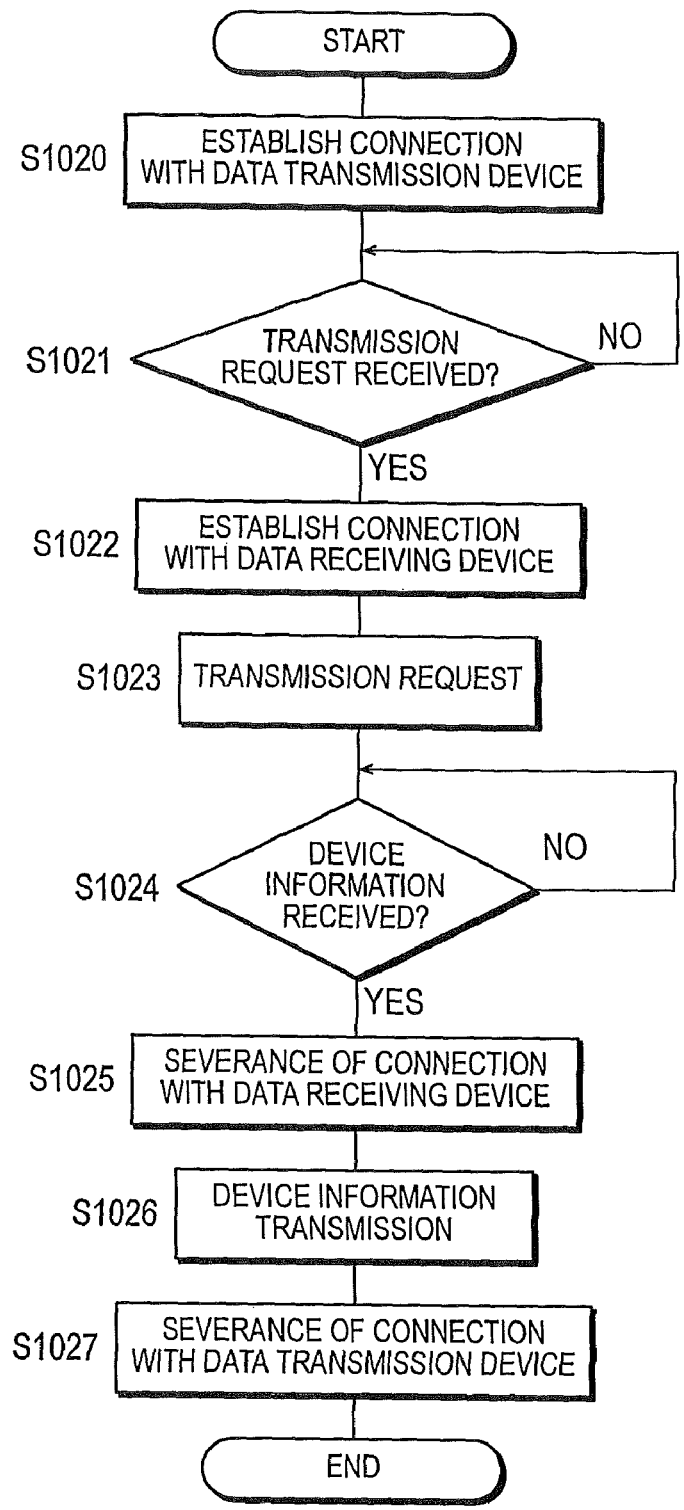
FIG. 22 is a flowchart of assistance in explaining the operating procedure of the portable terminal according to Embodiment II-1.

The operating procedure of the portable terminal 110 will be described in detail referring to FIG. 22. The flowchart shown in FIG. 22 is, for example, stored in the ROM 112 as the control program and is executed by the CPU 111.

First, a connection with the data transmission device 150 is established via the mobile telecommunication network 170 (step S1020).

Then, a judgment is made as to whether a device information transmission request is received (step S1021). If it is judged that the transmission request has not been received, a judgment at the step S1021 will be repeated until a transmission request is received.

If it is judged that the transmission request is received, a connection with the data receiving device 130 located nearby is established (step S1022), and the transmission request is transmitted to the data receiving device 130 (step S1023).

Next, a judgment is made whether the device information is received from the data receiving device 130 by means of the wireless connection between devices (step S1024). If it is judged that the device information has not been received, a judgment at the step S1024 will be repeated until the device information is received.

On the other hand, if it is judged that the device information is received, the connection with the data receiving device 130 will be severed (step S1025).

The device information is transmitted to the data transmission device 150 via the mobile telecommunication network 170 (step S1026), and the connection with the data transmission device 150 will be severed (step S1027).

Figure 23:
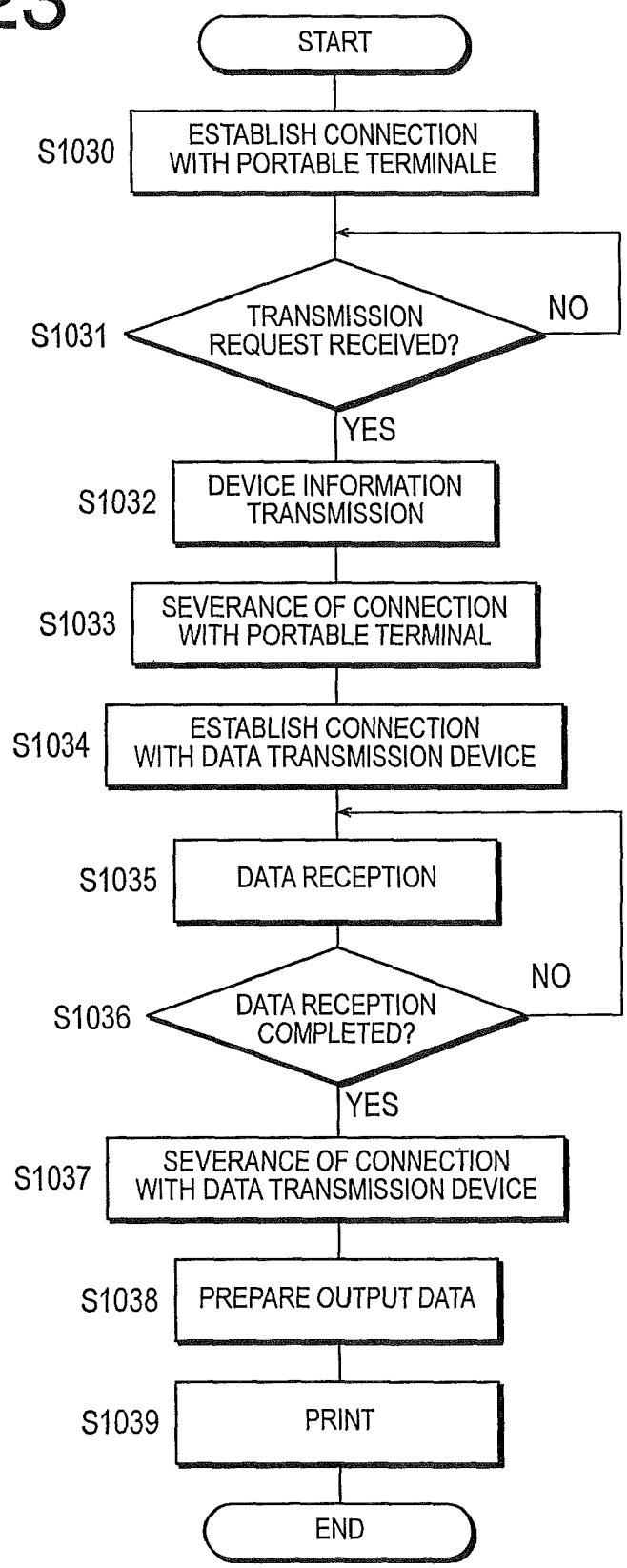
FIG. 23 is a flowchart of assistance in explaining the operating procedure of the data receiving device according to Embodiment II-1.

The operating procedure of the data receiving device 130 will be described in detail referring to FIG. 23. The flowchart shown in FIG. 23 is, for example, stored in the ROM 132 as the control program and is executed by the CPU 131.

First, the connection with the portable terminal 110 located nearby is established by means of the wireless connection between devices (step S1030).

Then, a judgment is made as to whether a device information transmission request is received (step S1031). If it is judged that the transmission request has not been received, a judgment at the step S1031 will be repeated until a transmission request is received.

On the other hand, if it is judged that the transmission request is received, the transmission request is transmitted to the portable terminal 110 by means of the wireless connection between devices (step S1032), and the connection with the portable terminal 110 is then severed (step S1033).

After that, a connection with the data transmission device 150 is established via the computer network 190 (step S1034) and data is received from the data transmission device 150 (step S1035).

Next, a judgment is made whether the data transmission is completed (step S1036). If it is judged that the data transmission has not been completed, the processes at the step S1035 and the step S1036 will be repeated.

On the other hand, if it is judged that the data transmission has been completed, the connection with the data transmission device 150 will be severed (step S1037). The received data is stored into the RAM 133.

Then, output data is prepared at the data processing unit 134 using the received data, which is read from the RAM 133 (step S1038). Next, the printing is executed at the printing unit 137 based on the output data (steps S1039).

Thus, the data volume of the device information is small compared to the transmitted data in case of Embodiment II-1, so that it causes little burden on the portable terminal 110 for the transmission/reception of the device information.

On the other hand, data transmission from the data transmission device 150 to the data receiving device 130 is executed via the computer network 190, so that it is not restricted in any way by the function of the portable terminal 110.

While the abovementioned system provides a general applicability to data transmission and reception, it is not affected by any functional restrictions of the portable terminal and but rather realizes functions that the portable terminal cannot offer using other devices located nearby.

Moreover, although the data transmission through the computer network 190 in Embodiment II-1 is a connection-mode transmission, it is possible to make it a connectionless-mode transmission by means of using, for example, the IP (Internet Protocol) as the protocol.

Furthermore, it is possible not to print out the output data prepared by the data processing unit 134 of the data receiving device 130 and store it temporarily in the RAM 133. In such a case, a criterion of whether the output data is storable is to be included as an item of the specification information of the data receiving device 130.

Embodiment II-2 will be described.

Figure 24:
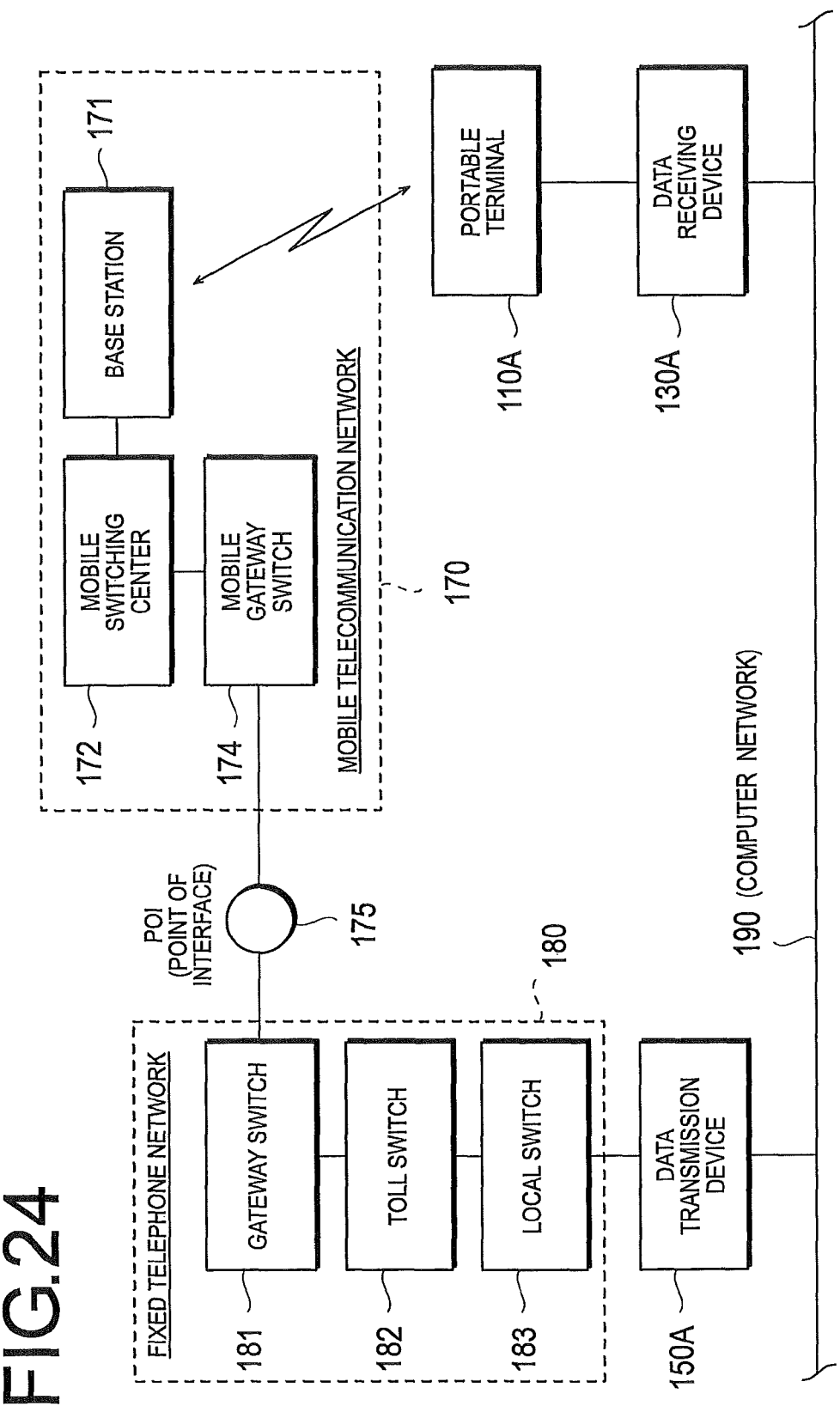
FIG. 24 is a schematic diagram of a data transmit-receive system according to Embodiment II-2.

The data transmit-receive system shown in FIG. 24 is different from Embodiment II-1 concerning the constitution for communicating in short distance between the portable terminal 110A and the data receiving device 130A as well as the constitution for the network between the portable terminal 110A and the data transmission device 150A.

More specifically, the portable terminal 110A and the data receiving device 130A have an interface for wired connections between devices such as the serial connection.

Moreover, the data transmission device 150A has an interface 159 for a fixed telephone network 180 (LS (Local Switch) 183), and is connected to the portable terminal 110A via the fixed telephone network 180 and the mobile telecommunication network 170.

In further details, the mobile telecommunication network 170 includes the base station 171 that communicates with the portable terminal 110, the mobile switching center 172 connected with the base station 171, and a mobile GS (Gateway Switch) 174 connected with the fixed telephone network 180 via a POI (Point Of Interface) 175.

The fixed telephone network 180 includes a GS 181 connected to the mobile telecommunication network 170 via the POI 175, a TS (Toll Switch) 182, and the LS 183 connected to the data transmission device 150.

In the above transmit-receive system, the connection between the portable terminal 110A and the data receiving device 130A is a wired connection, and the fixed telephone network 180 exists between the portable terminal 110A and the data transmission device 150A, but the communication procedure and the operating procedure between the devices 110A, 130A and 150A are identical to those of Embodiment II-1, and an effect similar to that of Embodiment II-1 can be achieved.

Embodiment II-3 will be described.

Embodiment II-3 is different from Embodiment II-1 in that the data receiving device supports a plurality of protocols, and the protocols can be designated at the data transmission device.

Specifically, the data transmission device has a means of alternatively designating a protocol. Since the operating procedures of the data receiving device and the portable terminal are identical to those in Embodiment II-1, the descriptions are omitted.

The protocols supported by the data receiving device are TCP/IP (Transmission Control Protocol/Internet Protocol), FTP, IFAX, IPP (Internet Printing Protocol), LPR, Fax, and HTTP (Hyper Text Transfer Protocol).

The identification code of the TCP/IP is defined by the IP address. The identification code of the FTP is defined by the server name, directory name and password, and the data format is either the page description language A, the page description language B, or the bitmap data.

The identification code of the IFAX is defined by the e-mail address, and the data format the TIFF-F (Tagged Image File Format-F Profile for Facsimile) compression, which is the file format for the storing and exchanging facsimile image.

The identification code of the IPP is defined by the e-mail address and the data format is the TIFF-F compression. The identification code of the LPR is defined by the IP address, and the data format is either the page description language A or the page description language B.

The identification code of the FAX is defined by the facsimile number and the data format is based on that of the facsimile. The identification code of the HTTP is defined by the server name and the directory name defined by the URL (Uniform Resource Locator) and the password, while the data format is either the JPEG (Joint Photographic Experts Group) or the TIFF (Tagged Image File Format).

Figure 25:
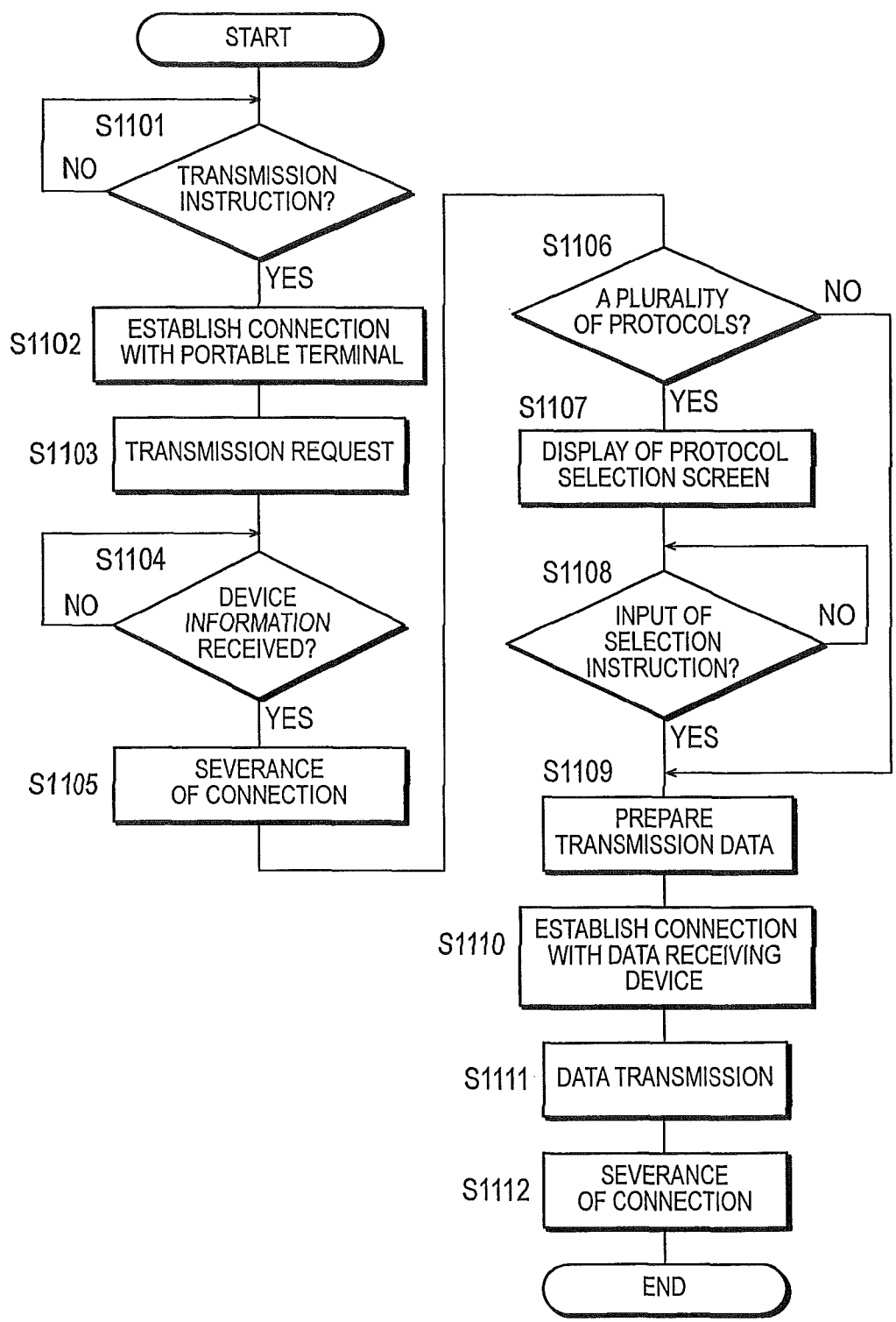
FIG. 25 is a flowchart of assistance in explaining the operating procedure of a data transmission device according to Embodiment II-3.

The operating procedure of the data transmission device is described in detail referring to FIG. 25. The flow chart shown in FIG. 25 is stored in the ROM of the data transmission device as the control program, and is executed by the CPU of the data transmission device.

First, the device information (FIG. 26) of the data receiving device transmitted from the portable terminal is received by executing the steps S1101 through S1105.

Then, a judgment is made whether the data receiving device supports a plurality of protocols based on the contents of the device information (step S1106). When it is judged that the data receiving device does not support a plurality of protocols, the process advances to the step S1109.

On the other hand, if it is judged that the data receiving device supports a plurality of protocols, a protocol selection screen as shown in FIG. 27 is displayed on the LCD of the operating unit of the data transmission device (step S1107).

Next, a judgment is made whether the input of the protocol selection instruction exists (step S1108). When it is judged that the protocol selection instruction is inputted, the process advances to the step S1109.

In the steps S1109 through S1112, transmission data is prepared and transmitted to the data receiving device.

Thus, a plurality of protocols can be supported and the protocol can be selected at the data transmission device in Embodiment II-3.

Embodiment II-4 will be described.

Embodiment II-4 is different from Embodiment II-3 in that the protocol can be designated at the portable terminal. In other words, the portable terminal, not the data transmission device, has a means of selectively designating the protocol. Since the operating procedures of the data receiving device and the data transmission device are identical to Embodiment II-1, the descriptions will be omitted.

Figure 28:
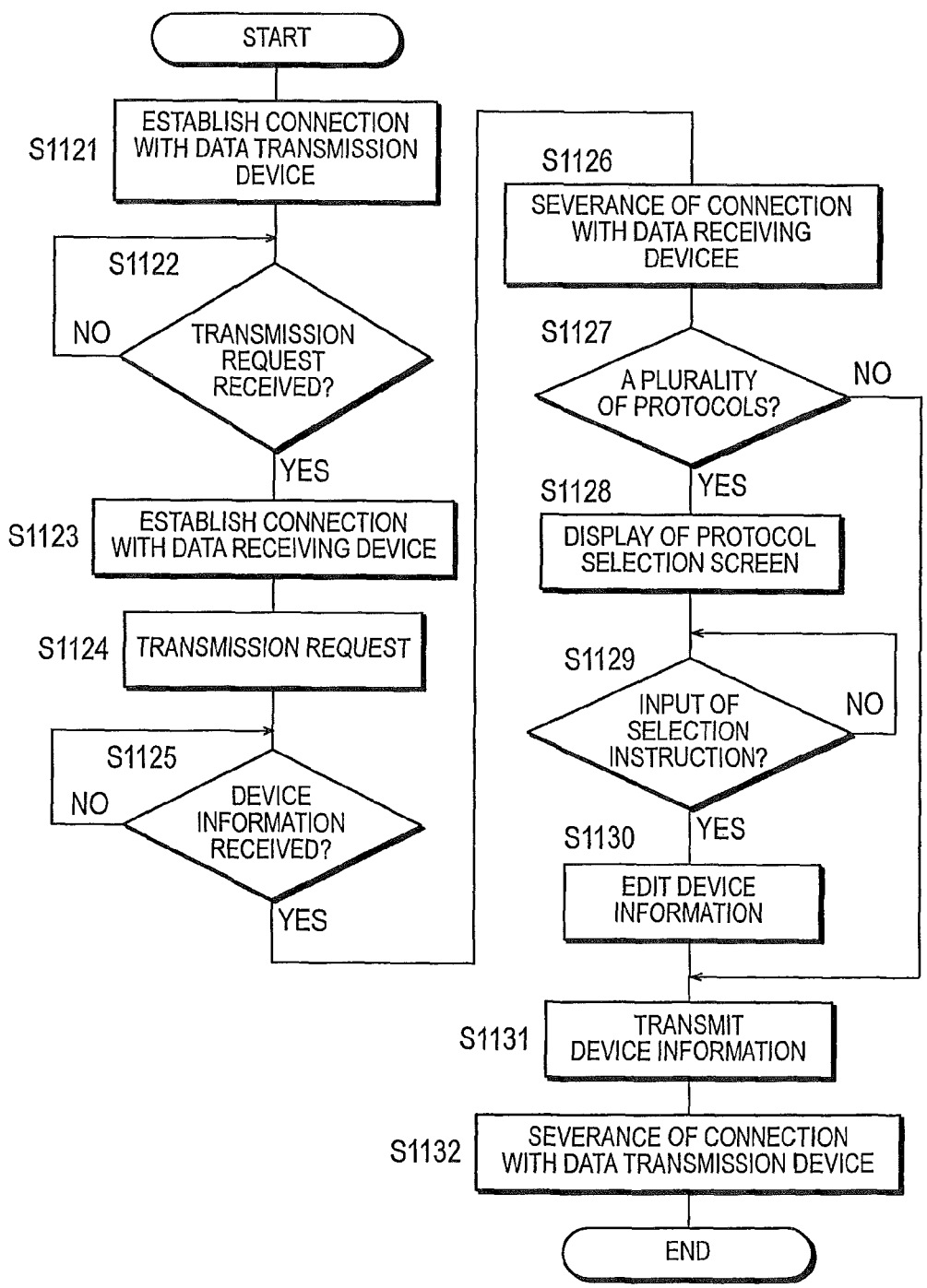
FIG. 28 is a flowchart of assistance in explaining the operating procedure of a portable terminal according to Embodiment II-4.

Referring to FIG. 28, the operating procedures of the portable terminal will be described in detail. The flowchart shown in FIG. 28 is stored in the ROM of the portable terminal as the control program and is executed by the CPU of the portable terminal, for example.

First, the device information (FIG. 26) is received from the data receiving device by executing the steps S1121 through S1126.

Next, a judgment is made whether the data receiving device supports a plurality of protocols based on the contents of the device information (step S1127). If it is judged that the data receiving device does not support a plurality of protocols, the process advances to the step S1131.

On the other hand, if it is judged that the data receiving device supports a plurality of protocols, the LCD of the operating unit of the portable terminal displays, for example, a protocol selection screen (see FIG. 27) (step S1128).

After that, a judgment is made whether the input of the protocol selection instruction exists (step S1129). If it is judged that the protocol selection instruction is inputted, the device information will be edited (step S1130), and the process advances to the step S1131. FIG. 29 shows the device information after the edition when the HTTP is selected as the protocol.

The device information is transmitted to the data transmission device 150 by executing the steps S1131 and S1132.

Thus, the protocol can be designated at the portable terminal in case of Embodiment II-4.

Embodiment II-5 will be described.

Embodiment II-5 is different from Embodiment II-1 in that the data receiving device supports the security function and the data transmission device has a means of inputting the password for releasing the security function.

The operating procedure of the portable terminal is identical to that of Embodiment II-1, the description is omitted. Moreover, the password format is included as a security item of the specification information, and is a character type, which, for example, consists of eight characters.

Figure 30:
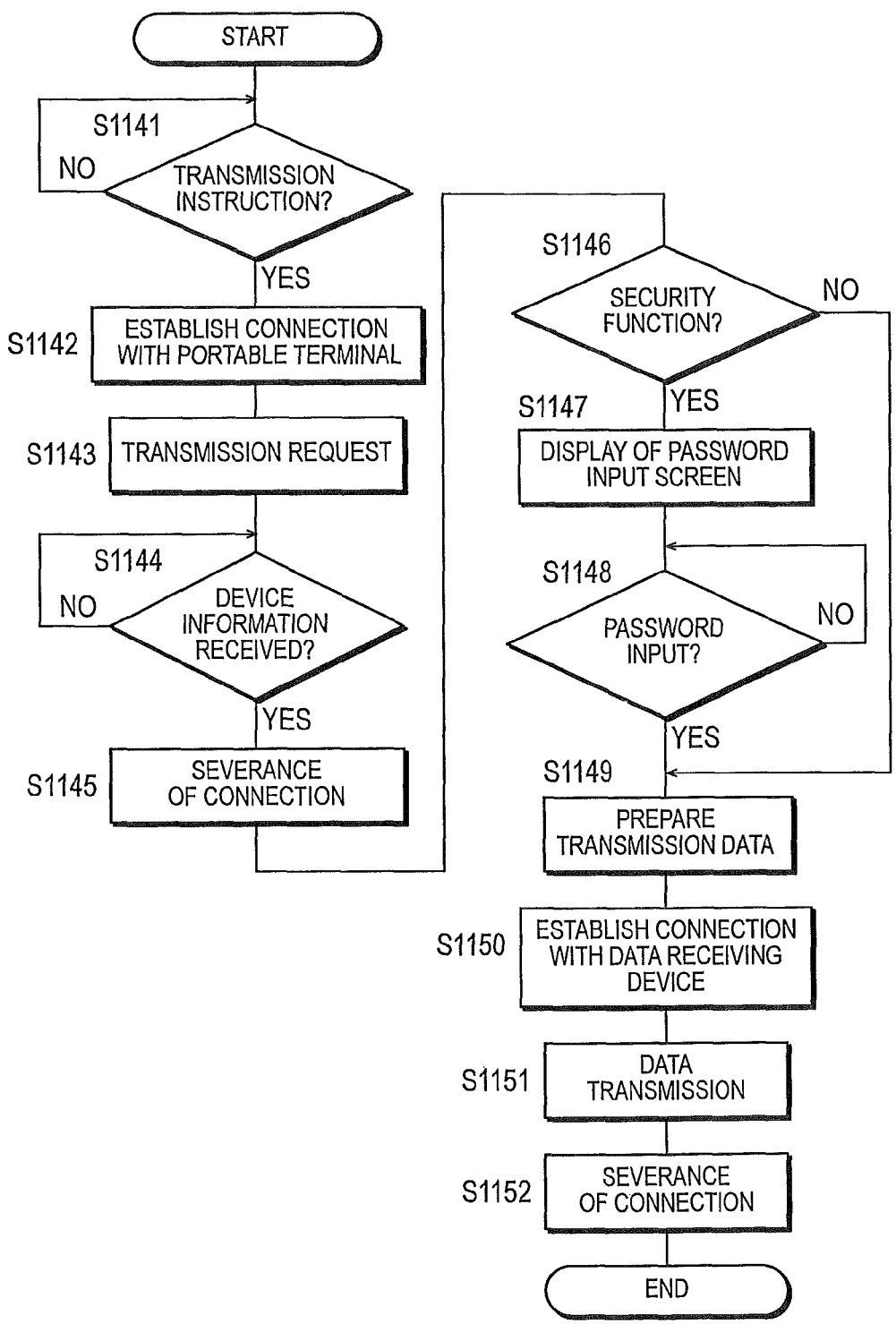
FIG. 30 is a flowchart of assistance in explaining the operating procedure of a data transmission device according to Embodiment II-5.

The operating procedure of the data transmission device is described in detail referring to FIG. 30. The flow chart shown in FIG. 30 is stored in the ROM of the data transmission device as the control program and is executed by the CPU of the data transmission device.

The device information (FIG. 31) of the data receiving device is received from the portable terminal by executing the steps S1141 through S1145.

Next, a judgment is made based on the contents of the device information whether the data receiving device supports the security function (step S1146). If it is judged that the security function is not supported, the process advances to the step S1149.

Figures 31, 32:
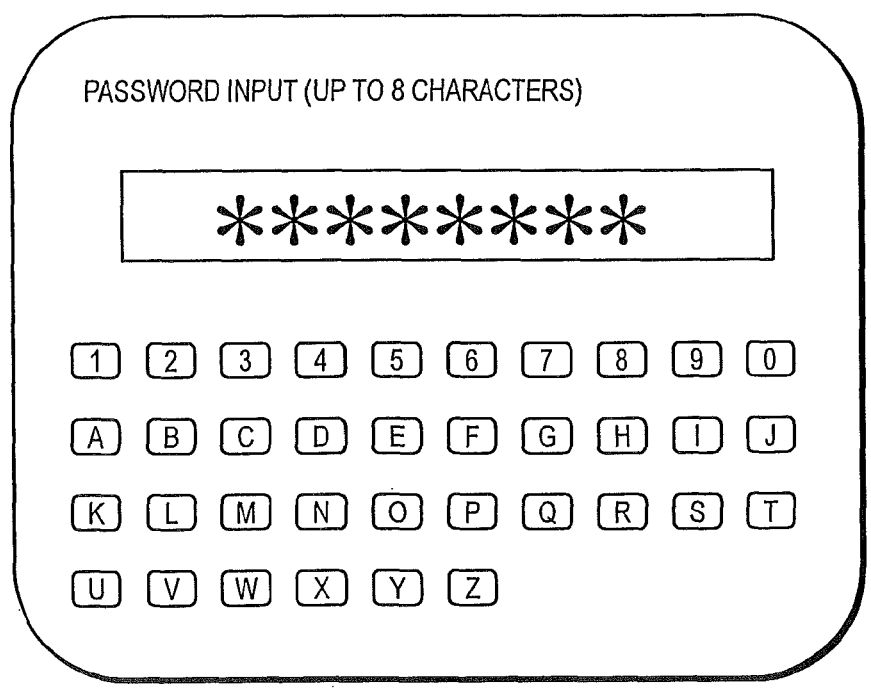
FIG. 31 is an example table of assistance in explaining device information according to Embodiment II-5.
FIG. 32 shows a password input screen of a liquid crystal display of the data transmission device according to Embodiment II-5.

On the other hand, if it is judged that the security function is supported, a password input screen, such as shown in FIG. 32, will be displayed on the LCD of the operating unit of the data transmission device (step S1147).

Then, a judgment is made whether the password input exists (step S1148). If it is judged that the password is inputted, the process advances to the step S1149.

At the step S1149, the transmission data is prepared. When the security function is supported, the input value for the password is added to the transmission data. The prepared data is transmitted to the data receiving device as the steps S1150 through S1152 are executed.

Figure 33:
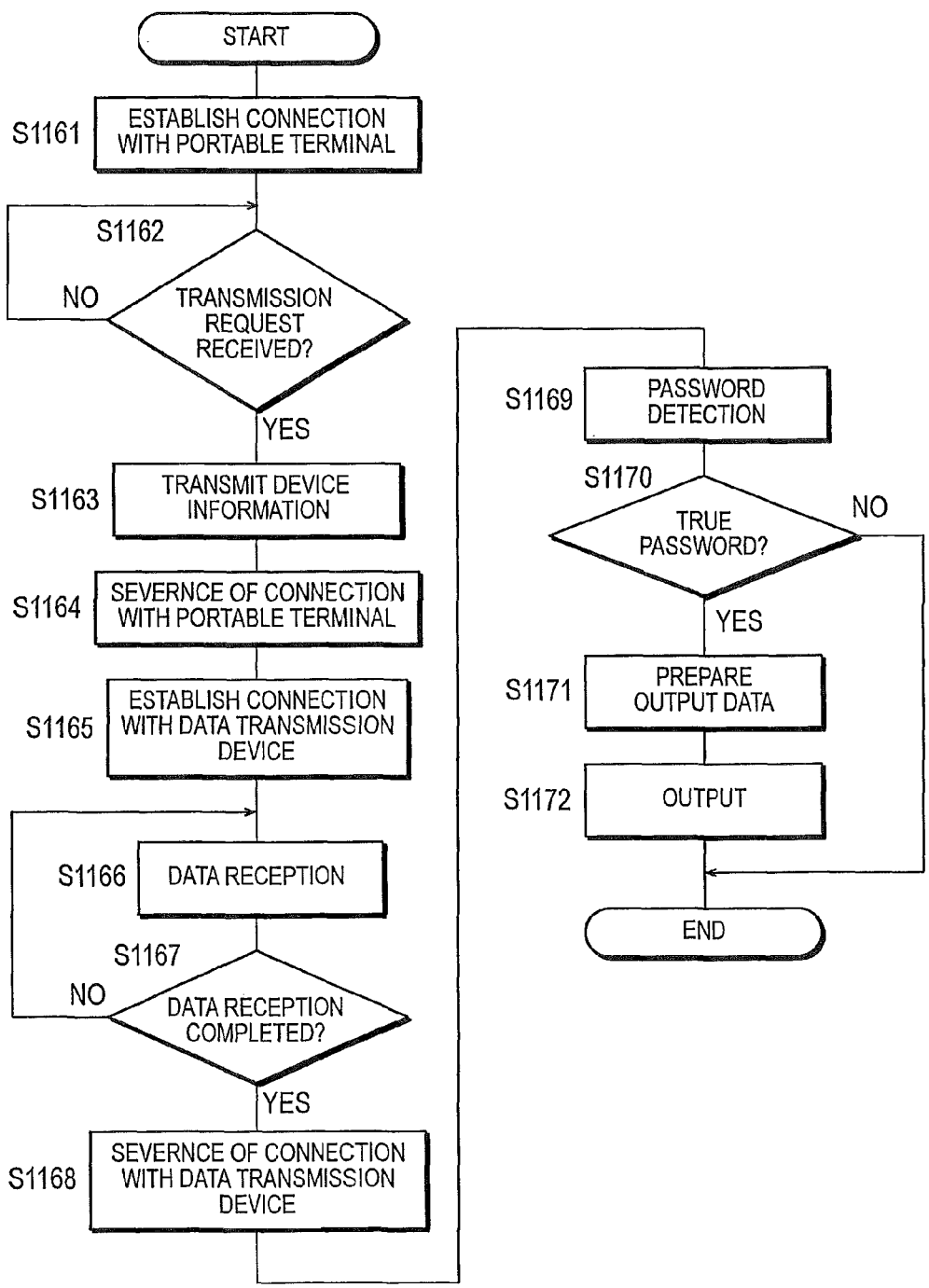
FIG. 33 is a flowchart of assistance in explaining the operating procedure of a data receiving device according to Embodiment II-5.

The operating procedure of the data receiving device will be described in detail referring to FIG. 33. The flowchart shown in FIG. 33 is stored in the ROM of the data receiving device as the control program and is executed by the CPU of the data receiving device.

First, by executing the steps S1161 through S1168, the transmission of the device information to the portable terminal and reception of data from the data transmission device are completed.

Next, the password is detected from the data (step S1169). Then, a judgment is made whether the detected password is true (step S1170). If it is judged that the password is true, the output data is prepared and outputted (steps S1171 and S1172). On the other hand, if the password is judged to be false, the process terminates.

Thus, in Embodiment II-5, the data transmission device can accommodate for a case wherein the data receiving device supports the security function.

Embodiment II-6 will be described.

Embodiment II-6 is different from Embodiment II-5 in that the portable terminal has a means for inputting the password that releases the security function.

The operating procedure of the data receiving device is the same as that of Embodiment II-5, and the operating procedure of its data transmission device is the same as that of Embodiment II-1, so that their descriptions are omitted here.

Figure 34:
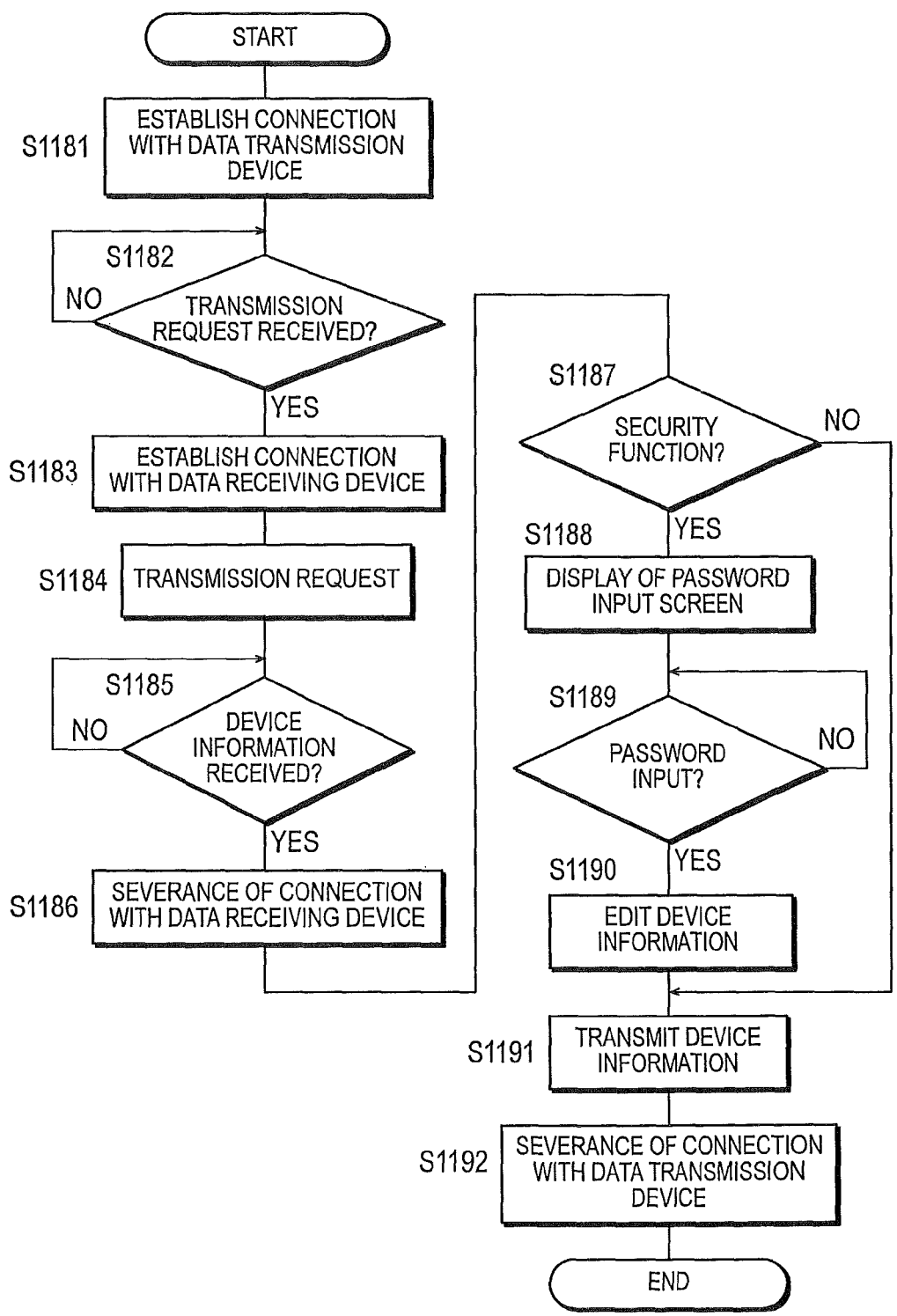
FIG. 34 is a flowchart of assistance in explaining the operating procedure of a portable terminal according to Embodiment II-6.

The operating procedure of the portable terminal will be described in detail referring to FIG. 34. The flowchart shown in FIG. 34 is, for example, stored in the ROM of the portable terminal as the control program and is executed by the CPU of the portable terminal.

First, by executing the steps S1181 through S1186, the device information (FIG. 31) is received from the data transmission device.

Next, a judgment is made based on the contents of the device information whether the data receiving device supports the security function (step S1187). If it is judged that the security function is not supported, the process advances to the step S1191.

Figure 35:
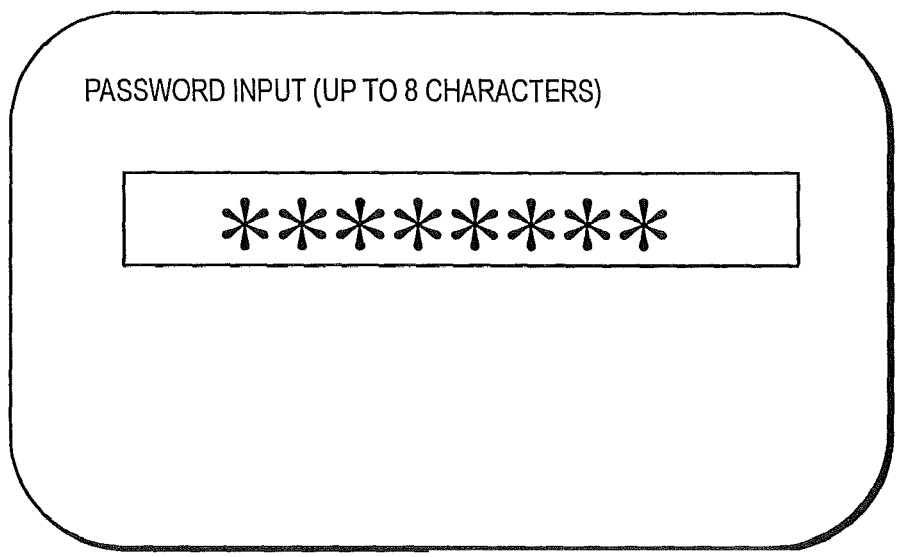
FIG. 35 shows a password input screen of a liquid crystal display of the portable terminal according to Embodiment II-6.

On the other hand, if it is judged that the security function is supported, the password input screen, such as shown in FIG. 35, will be displayed on the LCD of the operating unit of the portable terminal (step S1188).

Next, a judgment is made whether the password input exists (step S1189). If it is judged that the password is inputted using the keyboard of the operating unit, the device information is edited, the password input value is added (step S1190), and the process advances to the step S1191.

After that, the device information is transmitted to the data transmission device as the steps S1191 and S1192 are executed.

Thus, in Embodiment II-6, the portable terminal can accommodate for a case wherein the data receiving device supports the security function.

Embodiment II-7 will be described.

Embodiment II-7 is different from the Embodiment II-1 through Embodiment II-6 in that it has a means for canceling the data transmission.

More specifically, in canceling the data transmission, the portable terminal transmits a second device information to the data transmission device, while the data transmission device stops the data transmission based on the second device information. The second device information contains the transmission disapproval instruction, which is a data for canceling the transmission.

The device information of the data receiving device is referred to as the first device information. The operating procedure of the data receiving device is similar to that of Embodiment II-1, so that its description is omitted here.

Figure 36:
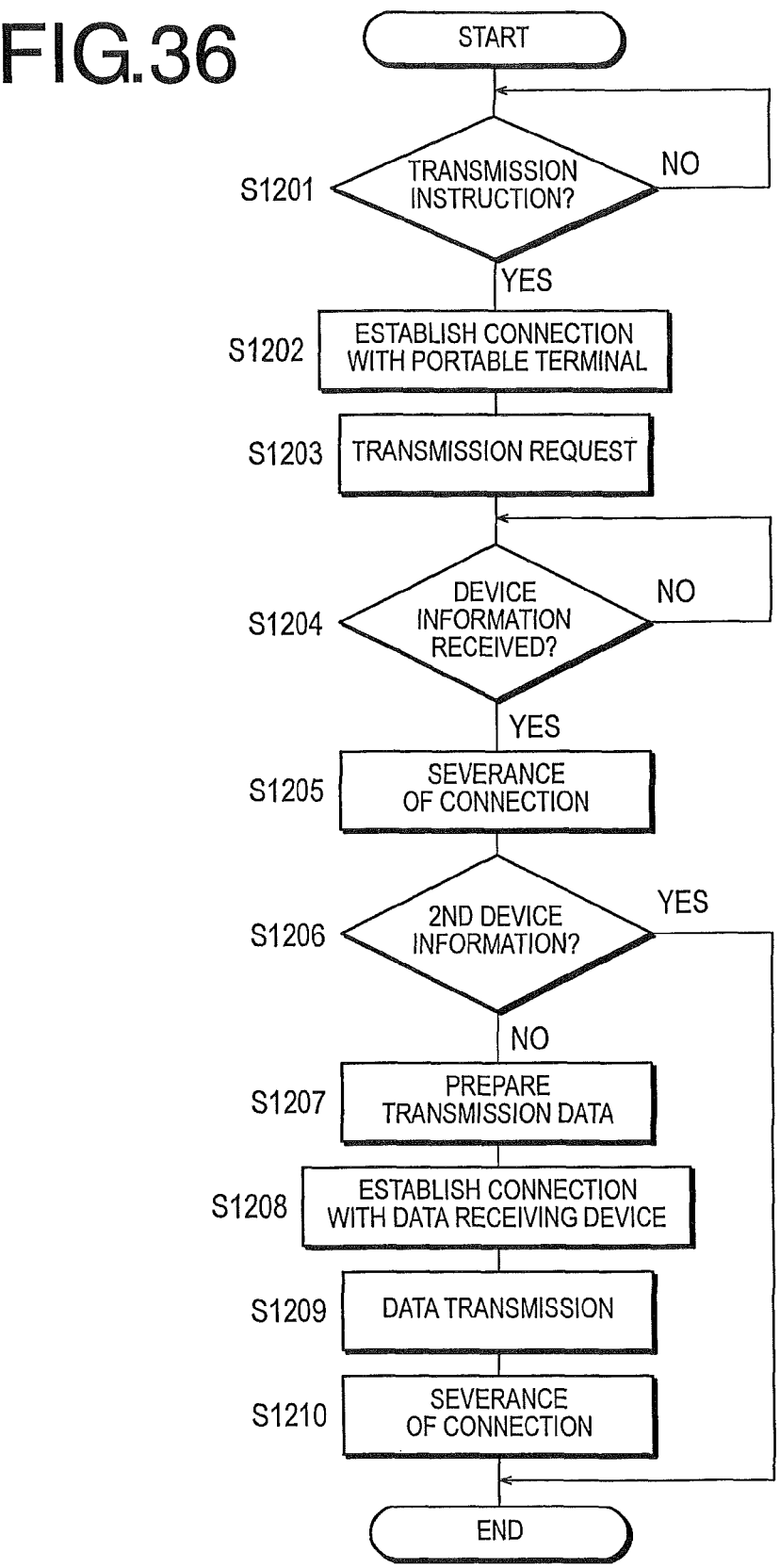
FIG. 36 is a flowchart of assistance in explaining the operating procedure of a data transmission device according to Embodiment II-7.

The operating procedure of the data transmission device will be described in detail referring to FIG. 36. The flowchart shown in FIG. 36 is, for example, stored in the ROM of the data transmission device as the control program and is executed by the CPU of the data transmission device.

First, by executing the steps S1201 through S1205, the device information is received from the portable terminal.

Next, a judgment is made whether a transmission disapproval instruction is included in the device information (step S1206).

If it is judged that the transmission disapproval instruction exists, i.e., it is judged that the second device information is received, the transmission instruction is cancelled and the process is terminated.

On the other hand, if it is judged that the transmission disapproval instruction does not exist, i.e., it is judged that the first device information is received, the data for transmission is prepared by executing the steps S1207 through S1210 and the data is transmitted to the data receiving device.

Figure 37:
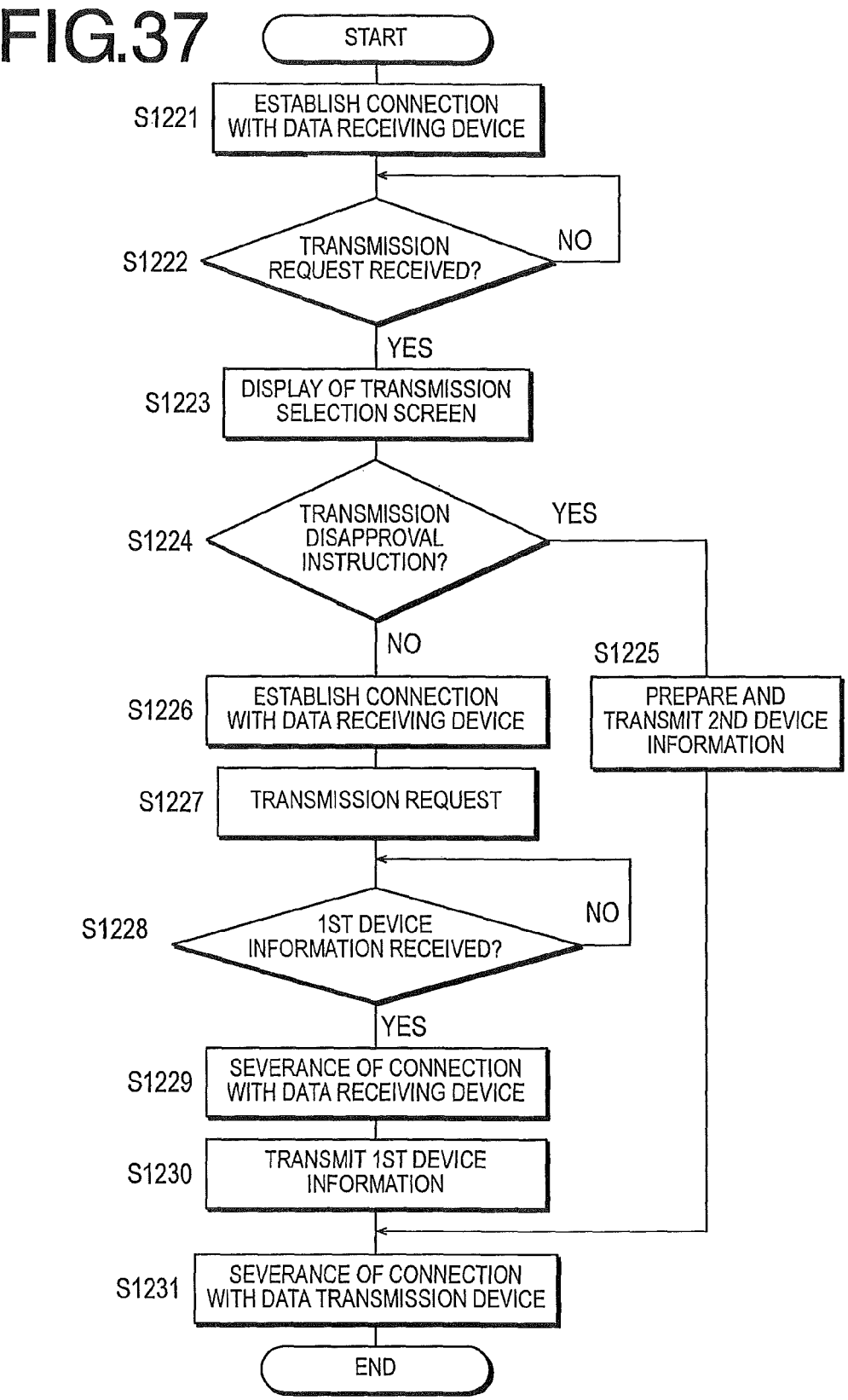
FIG. 37 is a flowchart of assistance in explaining the operating procedure of a portable terminal according to Embodiment II-7.

The operating procedure of the portable terminal will be described in detail referring to FIG. 37. The flowchart shown in FIG. 37 is, for example, stored in the ROM of the portable terminal as the control program and is executed by the CPU of the portable terminal.

First, a connection with the data transmission device is established (step S1221). Next, a judgment is made whether a transmission request for the first device information is received (step S1222).

Figure 38:
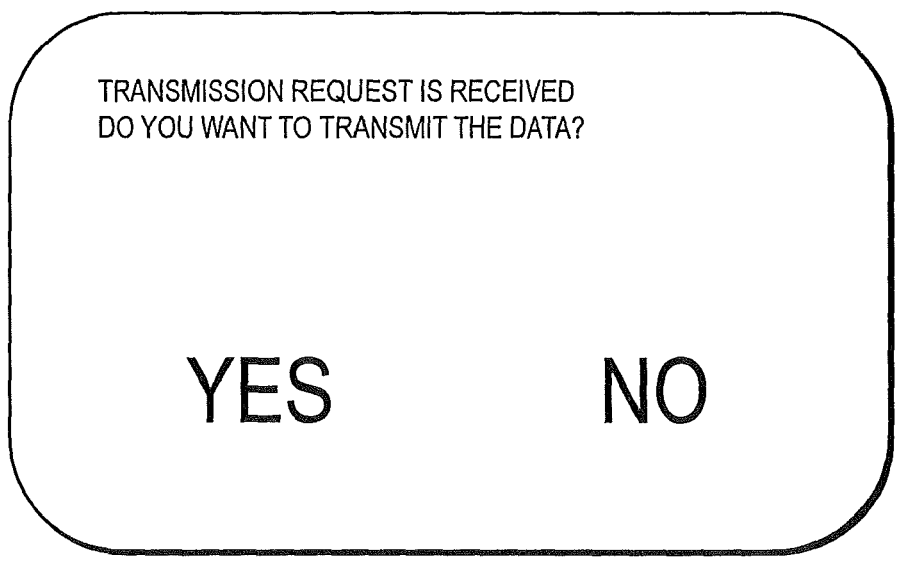
FIG. 38 shows a transmission selection screen of a crystal display unit of the portable terminal according to Embodiment II-7.

When it is judged that the transmission request is received, a transmission selection screen such as shown in FIG. 38 is displayed on the LCD of the operating unit of the portable terminal prompting an input of decision whether to transmit the data or not (step S1223). After that, a judgment is made whether there is a transmission disapproval instruction (step S1224).

When the transmission disapproval instruction is inputted, the second device information containing the transmission disapproval instruction is prepared to be transmitted without connecting with the data receiving device (step S1225), and the connection with the data transmission device is severed (step S1231).

On the other hand, when the transmission approval instruction is inputted, the first device information is obtained from the data receiving device, the first device information is transmitted to the data transmission device, and the connection is severed as the steps S1226 through S1231 are executed.

Thus, the data volume of the second device information is small, and it causes little burden on the portable terminal for transmission/reception of the device information. Therefore, it is possible to cancel the data transmission without being restricted by the function of the portable terminal.

Embodiment II-8 will be described.

Embodiment II-8 is different from the Embodiment II-1 through Embodiment II-7 in that it has a means of holding the data transmission using a third device information.

The third device information is device information of the data transmission device required for the portable terminal to establish a connection with the data transmission device via the mobile telecommunication network and contains, for example, connection information consisting of telephone number and storage information consisting of identification number of a file to be transmitted.

The operating procedure of the data receiving device is identical to that of Embodiment II-1 so that the description is omitted.

Figure 39:
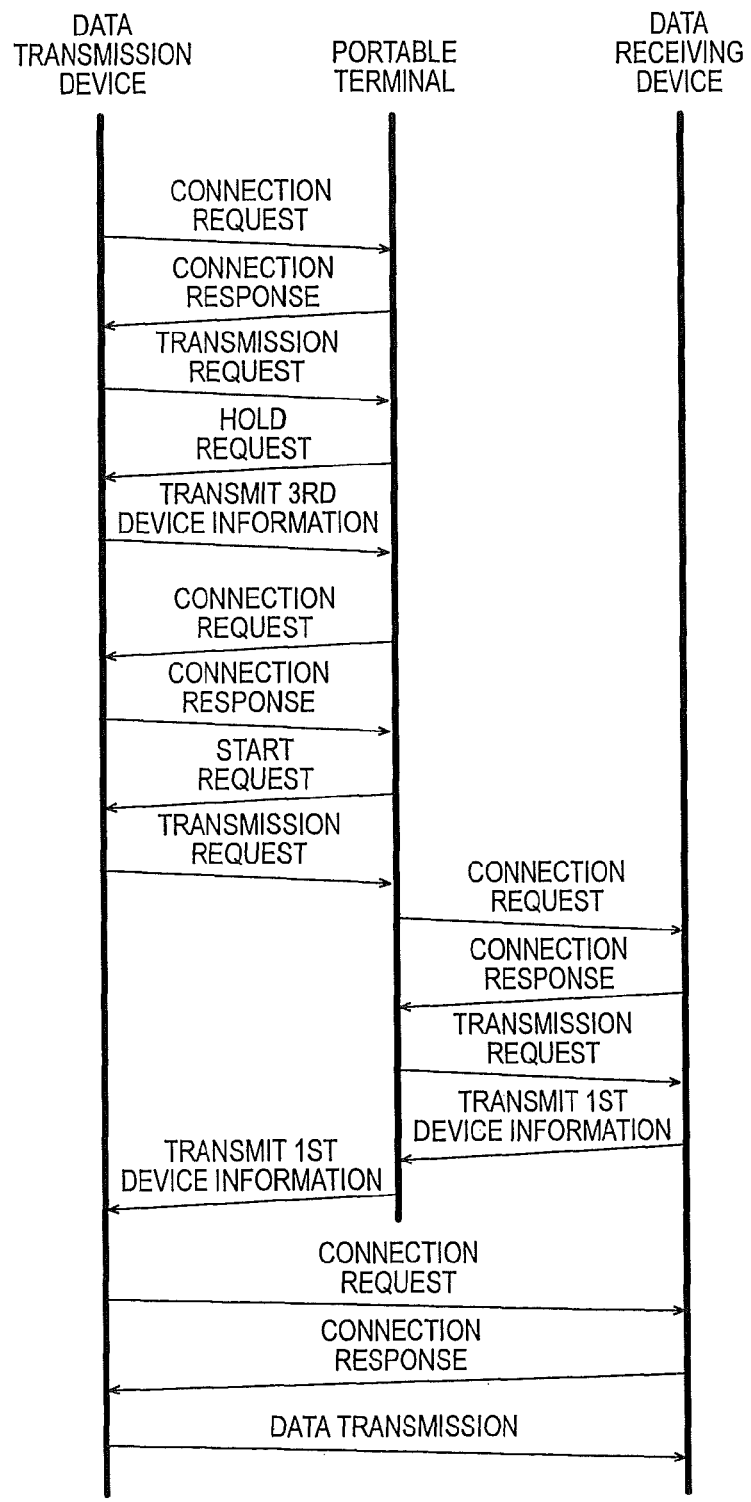
FIG. 39 is a sequence chart of assistance in explaining the communication procedure of a data transmit-receive system according to Embodiment II-8.

The communication procedure of the data transmit-receive system will be described referring to the sequence chart of FIG. 39.

First, the data transmission device transmits a connection request to the portable terminal. As it receives the connection request, the portable terminal transmits a connection response to the data transmission device. This establishes the connection between the data transmission device and the portable terminal.

Next, the data transmission device transmits the transmission request for the first device information to the portable terminal.

Upon receiving the transmission request for the first device information, the portable terminal transmits a hold request to the data transmission device. Then, the data transmission device transmits the third device information to the portable terminal and severs the connection.

The portable terminal transmits the connection request to the data transmission device based on the third device information before the data transmission. Upon receiving the connection request, the data transmission device transmits a connection response to the portable terminal.

Thus, the connection between the portable terminal and the data transmission device is established.

The portable terminal transmits the data transmission start request to the data transmission device. The data transmission device then transmits the transmission request for the first device information to the portable terminal.

Upon receiving the transmission request for the first device information, the portable terminal executes the process similar as in Embodiment II-1, and the data transmission device finally transmits the data to the data receiving device.

Figure 40:
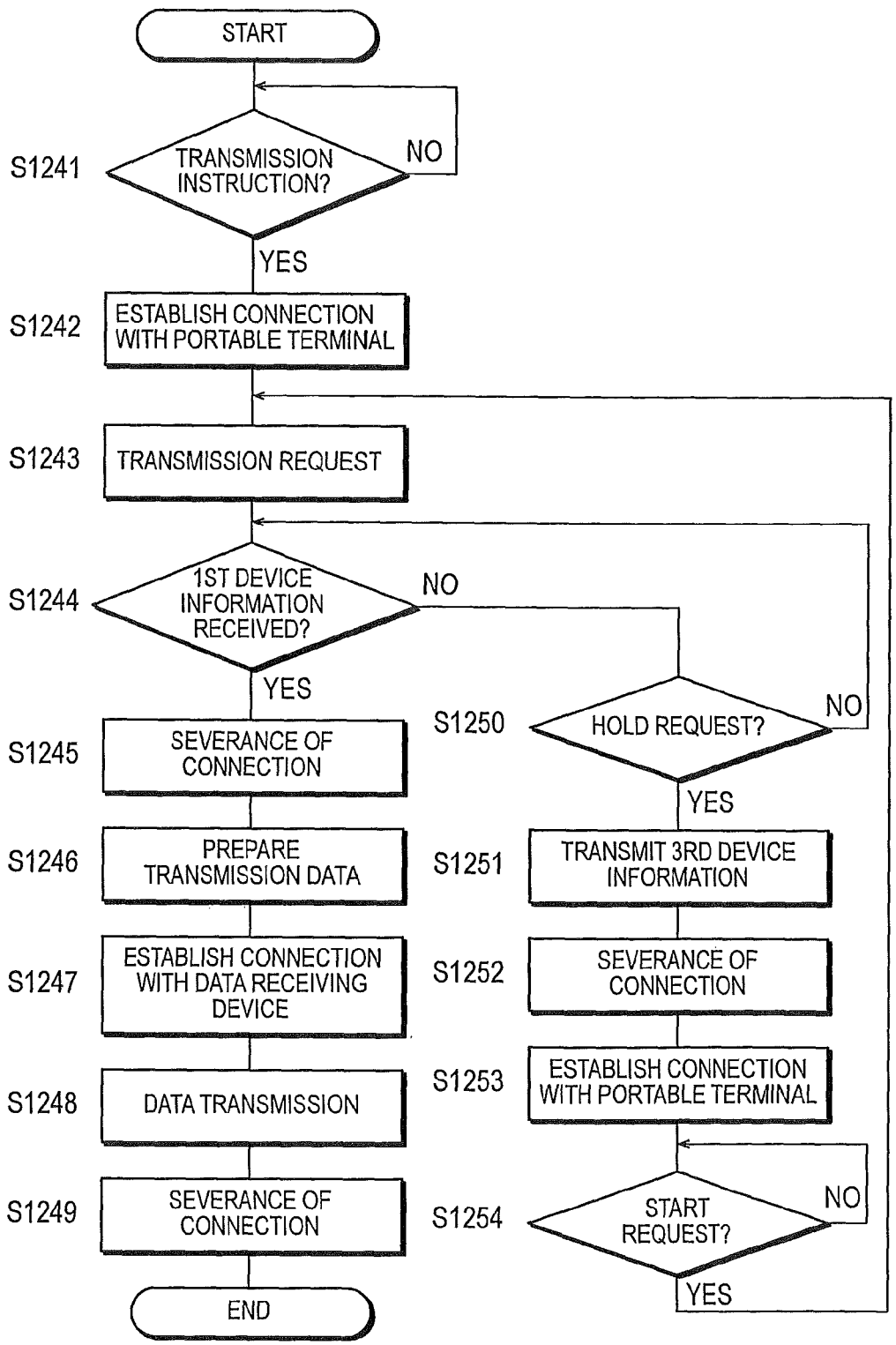
FIG. 40 is a flowchart of assistance in explaining the operating procedure of a data transmission device according to Embodiment II-8.

Next, the operating procedure of the data transmission device will be described in detail referring to FIG. 40. The flowchart shown in FIG. 40 is, for example, stored in the ROM of the data transmission device as the control program and is executed by the CPU of the data transmission device.

First, a judgment is made as to whether a transmission instruction is inputted (step S1241). If it is judged that the transmission instruction is inputted, a connection with the portable terminal is established (step S1242), and a transmission request for the first device information is transmitted to the portable terminal (step S1243).

Next, a judgment is made as to whether the first device information is received from the portable terminal (step S1244). If it is judged that the first device information is received, the steps S1244 through S1249 are executed for transmitting data to the data receiving device.

On the other hand, if it is judged that the first device information has not been received, a judgment is further made as to whether the hold request is received (step S1250). If it is judged that the hold request has not been received, the process returns to the step S1244.

If it is judged that the hold request has been received, the third device information is transmitted to the portable terminal (step S1251), and the connection with the portable terminal is severed (step S1252).

After that, a connection with the portable terminal is established based on the third device information (step S1253).

Next, a judgment is made as to whether the start request is received (step S1254). When the start request is received, the process returns to the step S1243, and data is transmitted from the data transmission device to the data receiving device as the steps S1243 through S1249 are executed.

Figure 41:
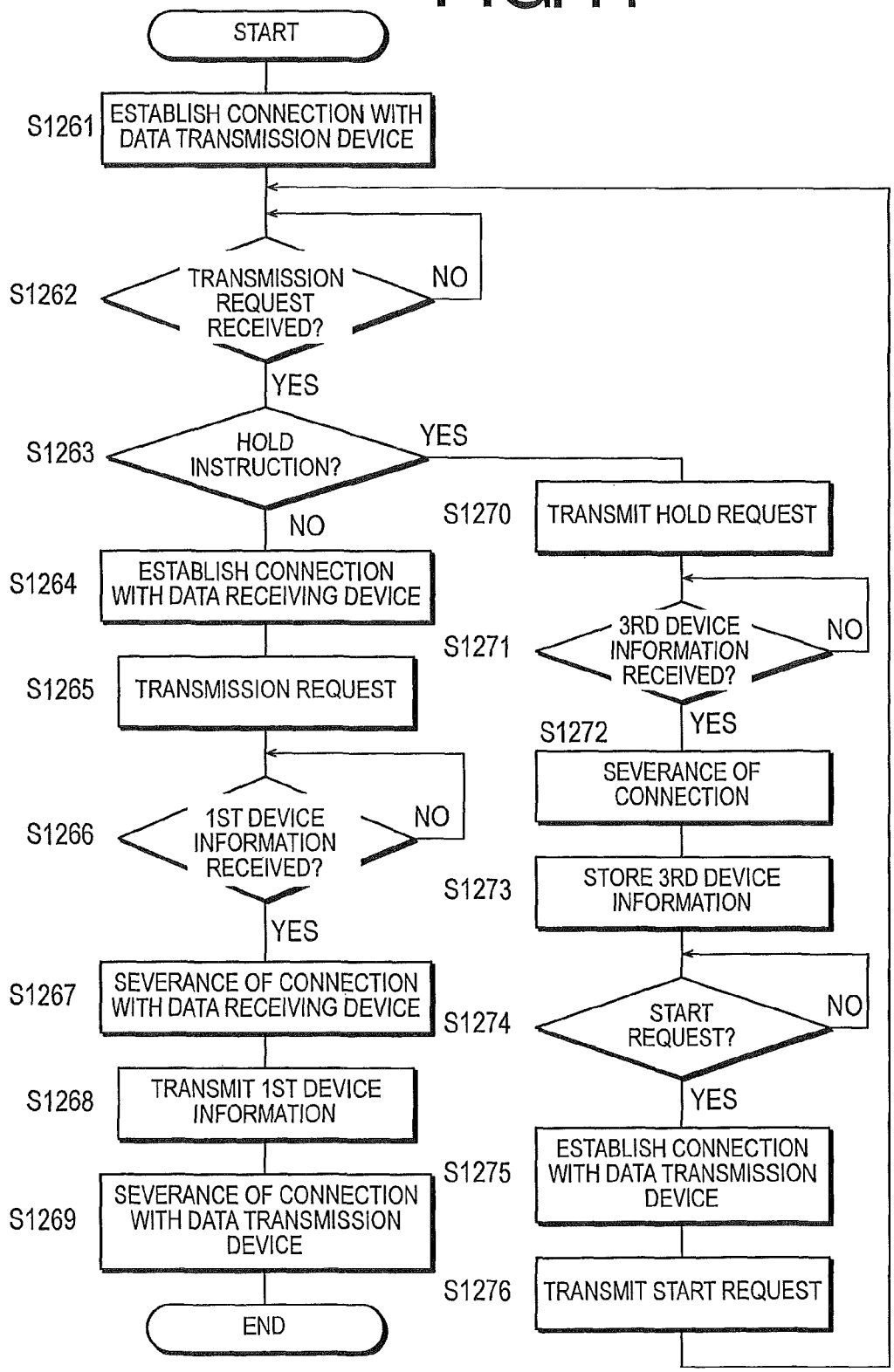
FIG. 41 is a flowchart of assistance in explaining the operating procedure of a portable terminal according to Embodiment II-8.

The operating procedure of the portable terminal will be described in detail referring to FIG. 41. The flowchart shown in FIG. 41 is, for example, stored in the ROM of the portable terminal as the control program and is executed by the CPU of the portable terminal.

First, a connection with the data transmission device is established (step S1261), and a judgment is made whether a transmission request for the first device information is received (step S1262).

When it is judged that the transmission request is received, a transmission hold selection screen such as shown in FIG. 42 is displayed on the LCD of the operating unit of the portable terminal and then a judgment is made whether a hold instruction is inputted (step S1263).

If it is judged that the hold instruction is not requested, the steps S1264 through S1269 are executed for transmitting the first device information to the data transmission device.

On the other hand, if it is judged that the hold instruction has been inputted, the hold request is transmitted to the data transmission device (step S1270).

Next, a judgment is made as to whether the third device information is received (step S1271). If it is judged that the third device information is received, the connection with the data transmission device will be severed (step S1272), and the received third device information will be stored into the RAM (step S1273).

After that, a transmission start selection screen as shown in FIG. 43 is displayed on the crystal liquid display of the operating unit of the portable terminal, and a judgment is made as to whether the start instruction is inputted (step S1274). In an actual case, a copying machine, image scanner, facsimile, etc., will be displayed as the data transmission device on the transmission start selection screen.

If it is judged that a start instruction is inputted, a connection with the data transmission device is established using the third device information stored in the RAM (step S1275), and a start request is transmitted to the data transmission device (step S1276).

Next, the process returns to the step S1262, and the steps S1262 through S1269 are executed for transmitting the first device information to the data transmission device.

Thus, the data volume of the third device information is small, and it causes little burden on the portable terminal for transmission/reception of the device information. Therefore, it is possible to hold the data transmission without being restricted by the function of the portable terminal.

Embodiment II-9 will be described.

Figure 44:
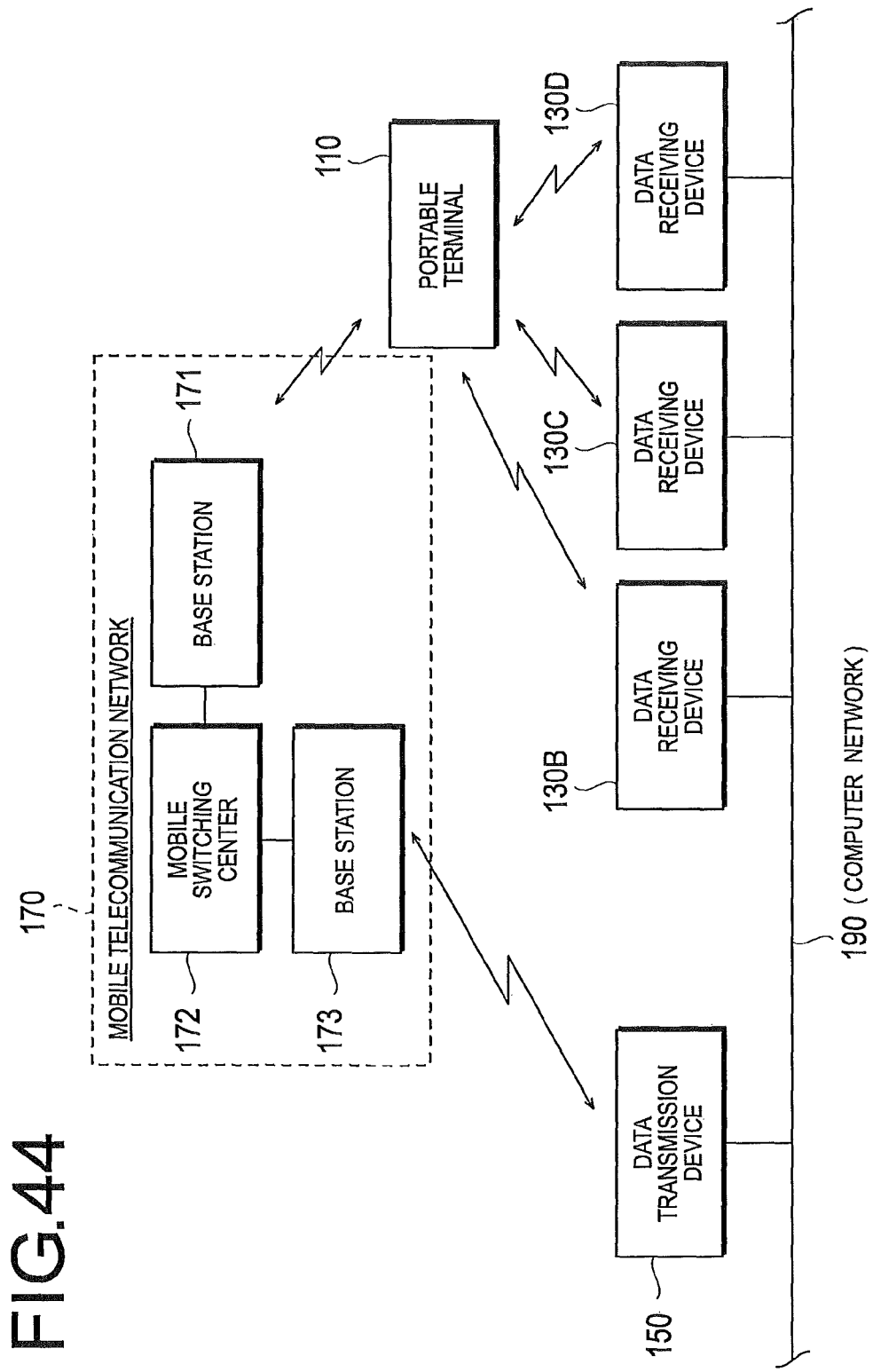
FIG. 44 is a schematic diagram of a data transmit-receive system according to Embodiment II-9.

The data transmit-receive system according to Embodiment II-9 is different from Embodiment II-1 in that it includes a plurality of data receiving devices 130B, 130C and 130D, wherein the data transmission device 150 has a means of automatically selecting one of the data receiving devices 130B, 130C and 130D as a destination device, as shown in FIG. 44.

The operating procedure of the data receiving device is identical to that of Embodiment II-1, so that its description is omitted.

Figure 45:
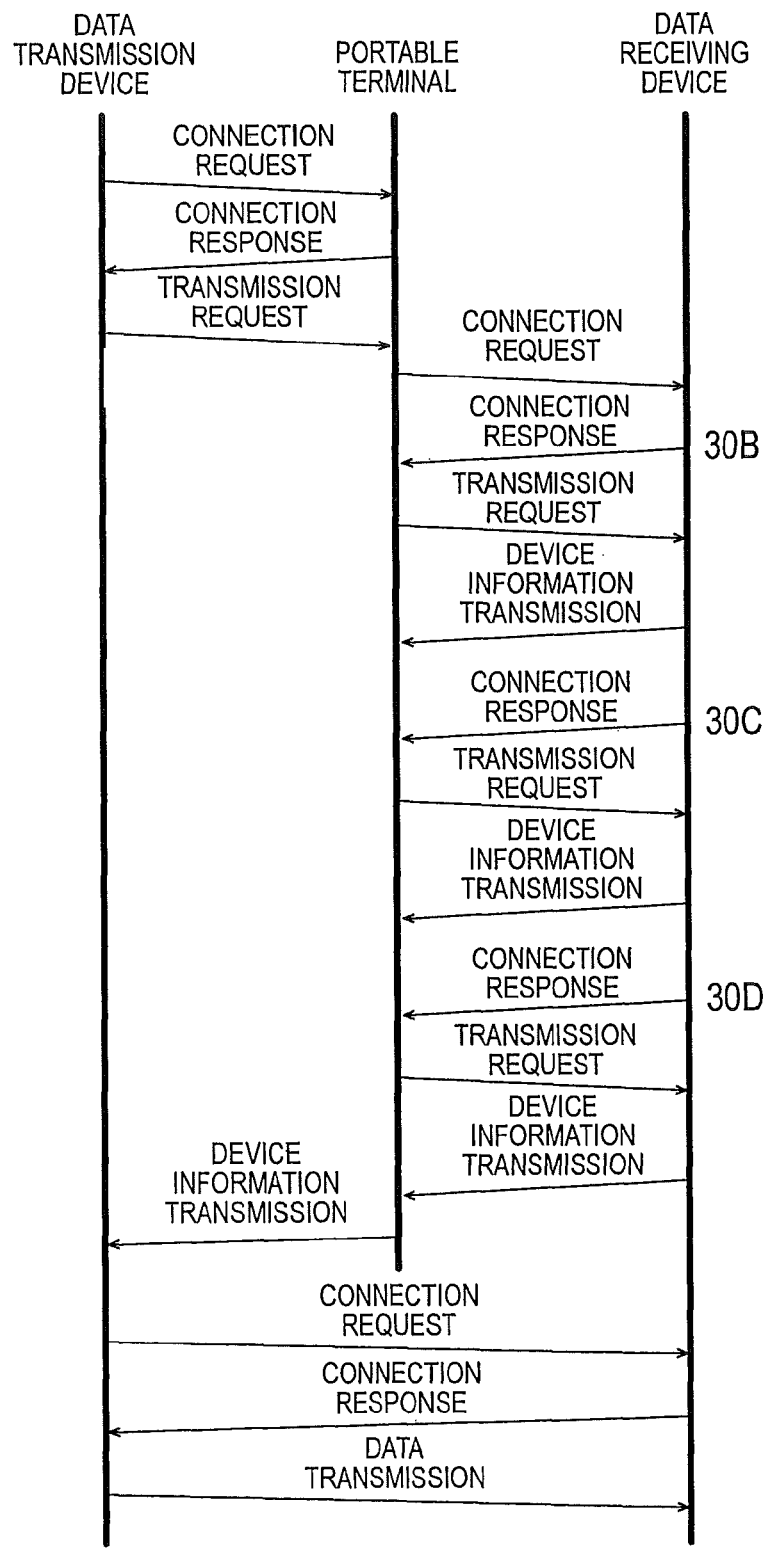
FIG. 45 is a sequence chart of assistance in explaining the communication procedure of the data transmit-receive system according to Embodiment II-9.

The communication procedure of the data transmit-receive system is described referring to the sequence chart shown in FIG. 45.

First, the data transmission device 150 transmits a connection request to the portable terminal 110. Upon receiving the connection request, the portable terminal 110 transmits a connection response to the data transmission device 150.

Thus, the connection between the data transmission device 150 and the portable terminal 110 is established. The data transmission device 150 transmits a device information transmission request to the portable terminal 110.

Upon receiving the device information transmission request, the portable terminal 110 transmits a connection request to the data receiving devices 130B, 130C and 130D located nearby. Upon receiving the connection request, the data receiving devices 130B, 130C and 130D transmit connection responses, respectively.

Next, the portable terminal 110 transmits the device information transmission request to the data receiving devices 130B, 130C and 130D, and obtains, for example, three kinds of device information as shown in FIG. 46.

On the other hand, the data receiving devices 130B, 130C and 130D sever their connections with the portable terminal 110 after transmitting the device information.

The portable terminal 110 edits the plurality of device information as received, prepares combined device information as shown in FIG. 47, transmits the device information to the data transmission device 150, and severs the connection with the data transmission device 150.

The data transmission device 150 compares the data contained in the device information, automatically selects one of the data receiving devices 130B, 130C and 130D as the destination device, and transmits a connection request to the selected destination device.

Upon receiving the connection request, the destination device transmits a connection response to the data transmission device 150. This establishes a connection between the data transmission device 150 and the destination device. The data transmission device 150 transmits data to the destination device and then severs the connection with the destination device.

Figure 48:
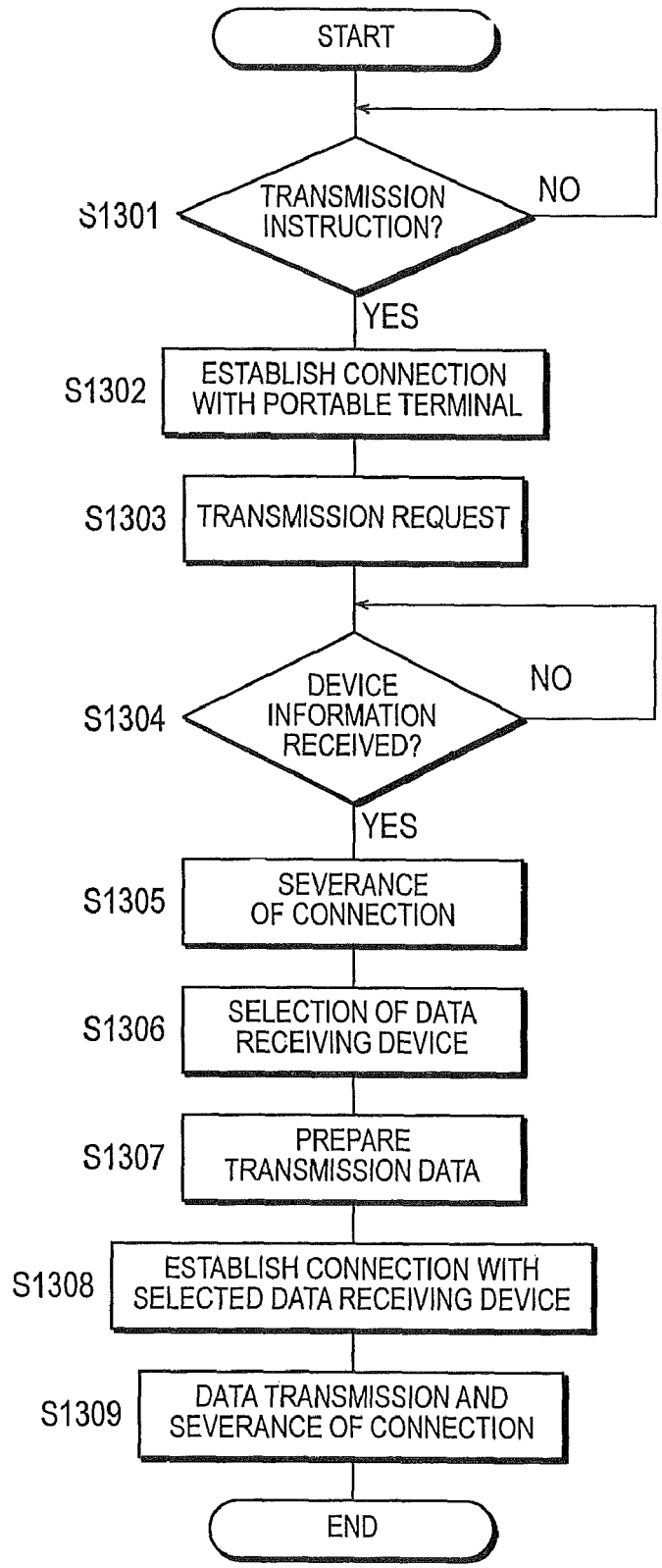
FIG. 48 is a flowchart of assistance in explaining the operating procedure of a data transmission device according to Embodiment II-9.

The operating procedure of the data transmission device 150 will be described in detail referring to FIG. 48. The flowchart shown in FIG. 48 is, for example, stored in the ROM 152 as the control program and is executed by the CPU 151.

First, by executing the steps S1301 through S1305, the device information (see FIG. 47) is received from the portable terminal 110.

Next, the data of the data receiving devices 130B, 130C and 130D contained in the device information are compared and a proper destination device is selected (step S1306).

Then, transmission data is prepared using the specification information of the destination device (step S1307), and a connection is established based on the connection information of the destination device (step S1308).

Next, the prepared data is transmitted and the connection with the destination device will be severed (step S1309).

Figure 49:
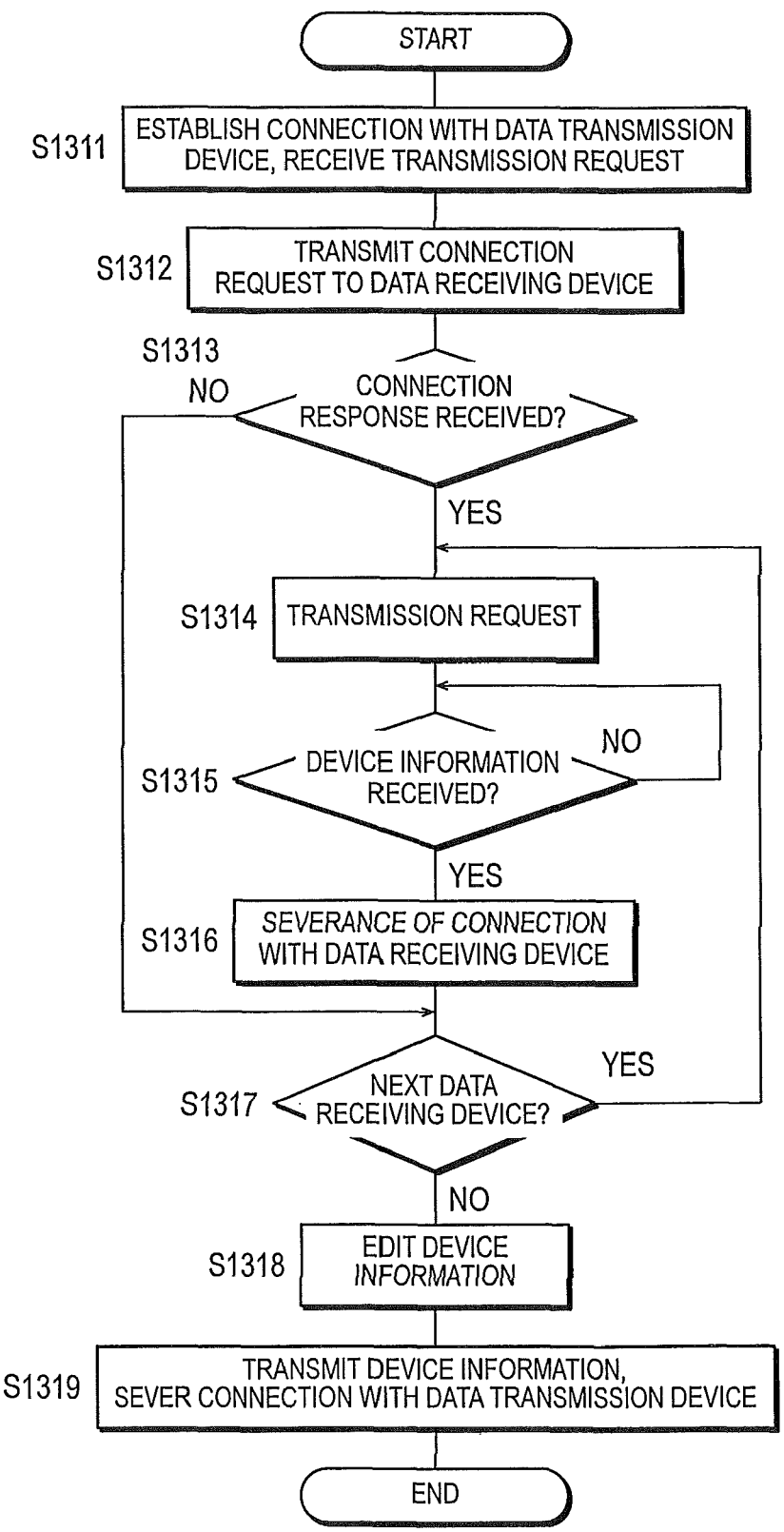
FIG. 49 is a flowchart of assistance in explaining the operating procedure of the portable terminal according to Embodiment II-9.

The operating procedure of the portable terminal 110 will be described in detail referring to FIG. 49. The flowchart shown in FIG. 49 is, for example, stored in the ROM 112 as the control program and is executed by the CPU 111.

First, a connection with the data transmission device 150 is established and the transmission request is received (step S1311).

Next, a connection request is transmitted to the data receiving devices 130B, 130C and 130D (step S1312), and a judgment is made whether a connection response is received (step S1313). If it is judged that no connection response exists, the process proceeds to the step S1317.

On the other hand, if it is judged that there is a connection response, a transmission request is transmitted (step S1314).

After that, a judgment is made as to whether any device information is received (step S1315). If it is judged that device information is received, the connection with the data receiving device, which transmitted the device information, is severed (step S1316), and the process advances to the step S1317.

At the step S1317, a judgment is made whether the next data receiving device exists, or whether there is any data receiving device of the device information which has not been received.

By repeating the steps S1313 through S1317, the device information (FIG. 46) of the data receiving devices 130B, 130C and 130D can be obtained.

Next, the device information of the data receiving devices 130B, 130C and 130D is edited and combined to form single device information (step S1318). The combined device information (see FIG. 47) is transmitted to the data transmission device 150, and the connection with the data transmission device 150 is severed (step S1322).

Thus, in Embodiment II-9, the data transmission device 150 automatically selects one of the data receiving devices 130B, 130C and 130D as the destination device without being restricted by the function of the portable terminal.

Moreover, the portable terminal 110 is not notified about the destination device selected at the data transmission device 150. However, it is possible to notify the portable terminal 110 about the destination device by the data transmission device 150 via the mobile telecommunication network, or cause the destination device to notify the portable terminal 110.

Embodiment II-10 will be described.

Embodiment II-10 is different from Embodiment II-9 in that the data transmission device provides a means for the user to select the destination device manually. The operating procedures of the portable terminal and the data receiving device are identical to those of Embodiment II-9, so that their descriptions are omitted.

Figure 50:
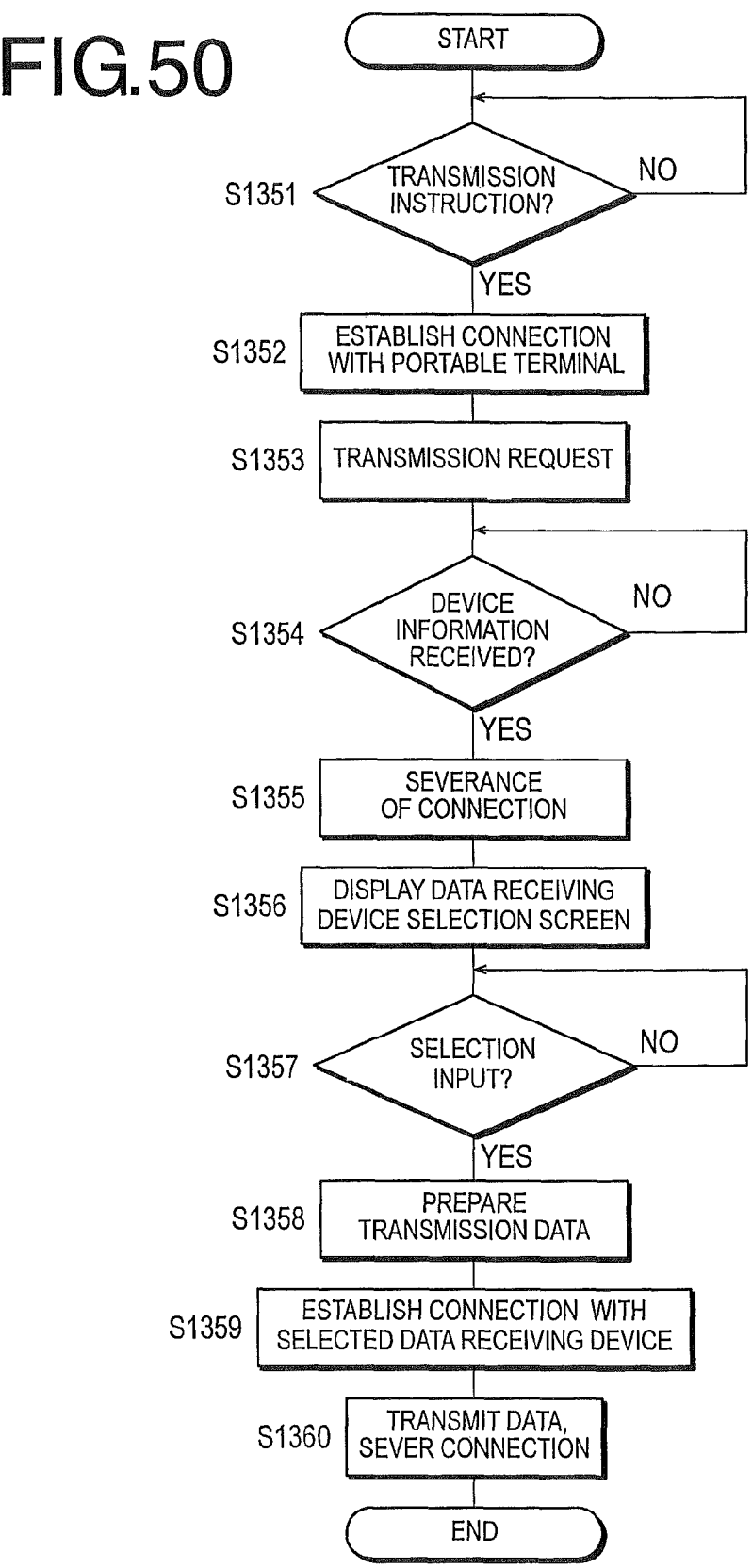
FIG. 50 is a flowchart of assistance in explaining the operating procedure of a data transmission device according to Embodiment II-10.

The operating procedure of the data transmission device will be described in detail referring to FIG. 50. The flowchart shown in FIG. 50 is, for example, stored in the ROM of the data transmission device as the control program and is executed by the CPU of the data transmission device.

First, by executing the steps S1351 through S1355, the device information (see FIG. 47) is received from the portable terminal.

Next, the data receiving device selection screen as shown in FIG. 51, for example, is generated based on data of the each data receiving device contained in the device information, and is displayed (step S1356). If a data receiving device that has device information inappropriate for the data transmission device, the data receiving device will not be displayed on the data receiving device selection screen.

Then, a judgment is made whether there is any selection input (instruction for the destination device) made by the user (step S1357). If it is judged that the selection is completed, the transmission data is prepared using the specification information of the selected destination device (step S1358).

After that, the connection with the destination device is established based on the connection information of the selected destination device (step S1359), the prepared data is transmitted, and then the connection with the destination device is severed (step S1360).

Thus, the user can select manually at the data transmission device one of the data receiving devices as the destination device.

Embodiment II-11 will be described.

Embodiment II-11 is different from Embodiment II-9 in that the portable terminal provides a means for the user to select the destination device manually. The operating procedures of the data transmission device is identical to that of Embodiment II-1 and the operating procedure of the data receiving device is identical to that of Embodiment II-9, so that their descriptions are omitted.

Figure 52:
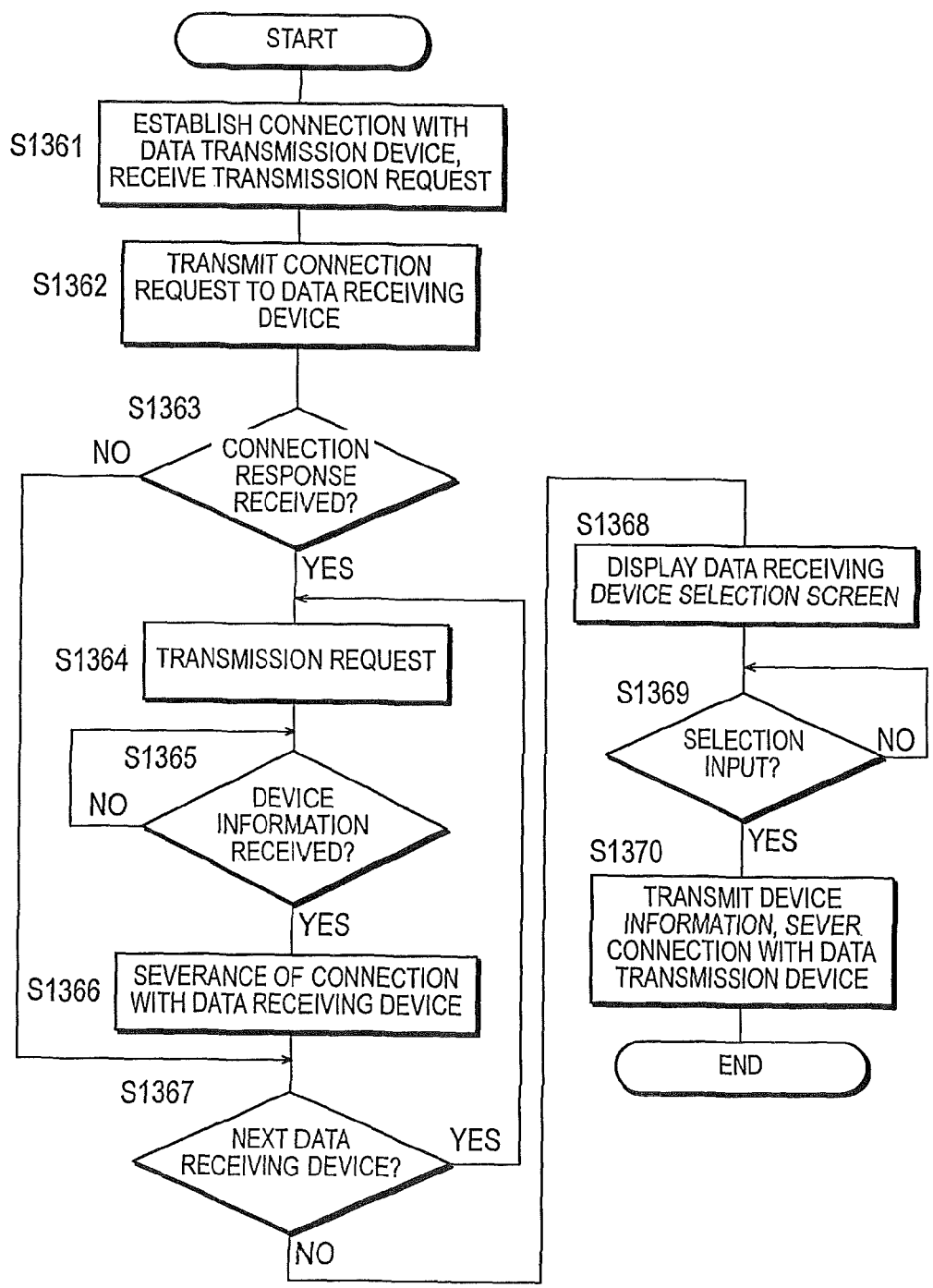
FIG. 52 is a flowchart of assistance in explaining the operating procedure of a portable terminal according to Embodiment II-11.

The operating procedure of the portable terminal will be described in detail referring to FIG. 52. The flowchart shown in FIG. 52 is, for example, stored in the ROM of the portable terminal as the control program and is executed by the CPU of the portable terminal.

First, by executing the steps S1361 through S1367, the device information (see FIG. 46A through FIG. 46C) is received from the data receiving device.

Next, the data receiving device selection screen (FIG. 51), for example, is generated based on the device information, and is displayed (step S1368).

After that, a judgment is made whether there is any selection input made by the user (step S1369). If it is judged, for example, that data receiving device 130B is selected, the device information shown in FIG. 46A is transmitted to the data transmission device, and then the connection with the data transmission device will be severed (step S1370).

Thus, the user can select manually at the portable terminal one of the data receiving devices as the destination device.

Embodiment III-1 will be described.

Embodiment III-1 is different from Embodiment II-1 in that a fourth device information is transmitted to the data receiving device using the portable terminal from the data transmission device and the data receiving device establishes a connection with the data transmission device based on the fourth device information.

The fourth device information is the device information of the data transmission device required for establishing a connection with the data transmission device via the computer network, and contains, for example, an identification code such as the IP address, a communication protocol, a storage information consisting of identification number of a file to be transmitted.

Figure 53:
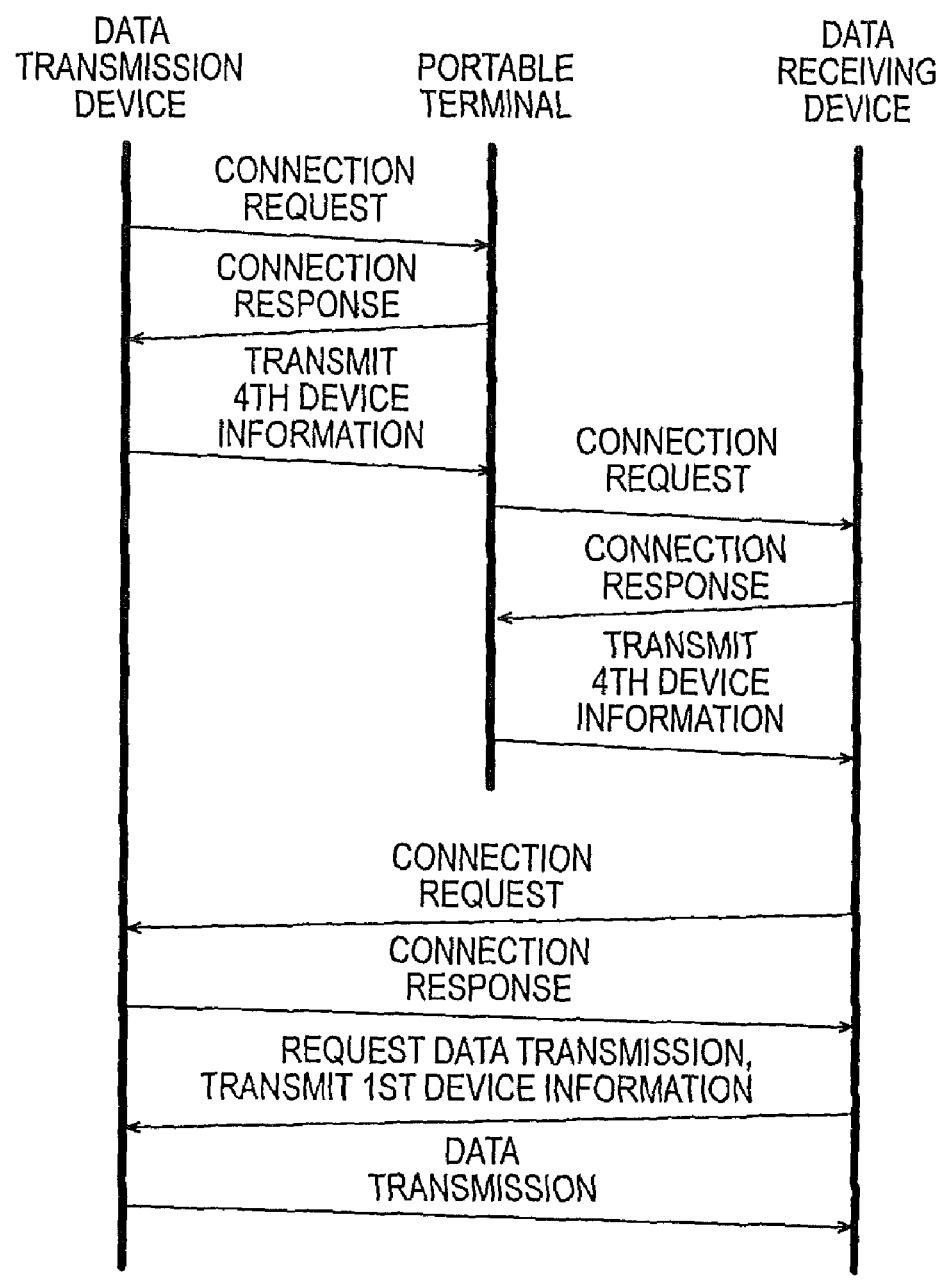
FIG. 53 is a sequence chart of assistance in explaining the communication procedure of a data transmit-receive system according to Embodiment III-1.

The communication procedure of the data transmit-receive system will be described referring to the sequence chart shown in FIG. 53.

First, the data transmission device transmits a connection request to the portable terminal. The portable terminal transmits a connection response to the data transmission device. Thus, a connection is established between the data transmission device and the portable terminal.

The data transmission device transmits the fourth device information to the portable terminal, and then severs the connection with the portable terminal. Upon receiving the fourth device information of the data transmission device, the portable terminal transmits a connection request to the data receiving device located nearby.

Upon receiving the connection request, the data receiving device transmits a connection response to the portable terminal. Thus, the connection between the portable terminal and the data receiving device is established.

The portable terminal transmits the fourth device information to the data receiving device, and then severs the connection with the data receiving device.

Next, the data receiving device transmits a connection request to the data transmission device based on the fourth device information. Upon receiving the connection request, the data transmission device transmits a connection response to the data receiving device.

Thus, the connection between the data receiving device and the data transmission device is established. The data receiving device transmits the data transmission request and the first device information (own device information) to the data transmission device.

Upon receiving the data transmission request and the first device information, the data transmission device transmits the requested data to the data receiving device based on the first device information, and then severs the connection with the data receiving device.

Figure 54:
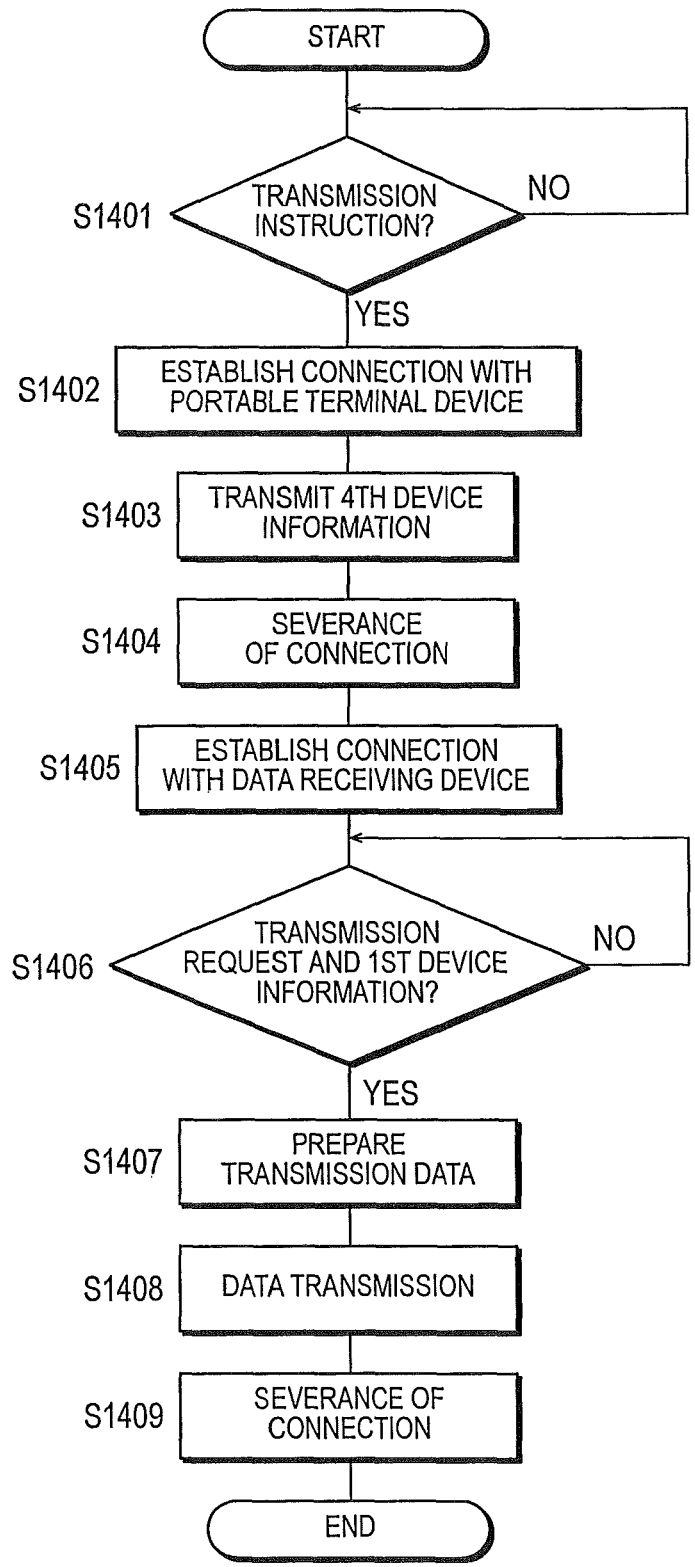
FIG. 54 is a flowchart of assistance in explaining the operating procedure of a data transmission device according to Embodiment III-1.

The operating procedure of the data transmission device is described in detail referring to FIG. 54. The flow char of FIG. 54 is, for example, stored in the ROM of the data transmission device, for example, as the control program, and is executed by the CPU of the data transmission device.

First, a judgment is made whether there is any transmission instruction input by the user using the operating unit (step S1401). If it is judged that there is a transmission instruction input, a connection with the portable terminal is established (step S1402).

The fourth device information of the data transmission device is transmitted to the portable terminal (step S1403), and the connection with the portable terminal is severed (step S1404).

Next, a connection with the data receiving device is established based on the fourth device information (step S1405). A judgment is made as to whether the data transmission request and the first device information are received (step S1406).

If it is judged that the reception is completed, transmission data is prepared using the specification information contained in the first device information (step S1407) and transmitted to the data receiving device based on the connection information contained in the first device information (step S1408), and the connection with the data receiving device is severed (step S1409).

Figure 55:
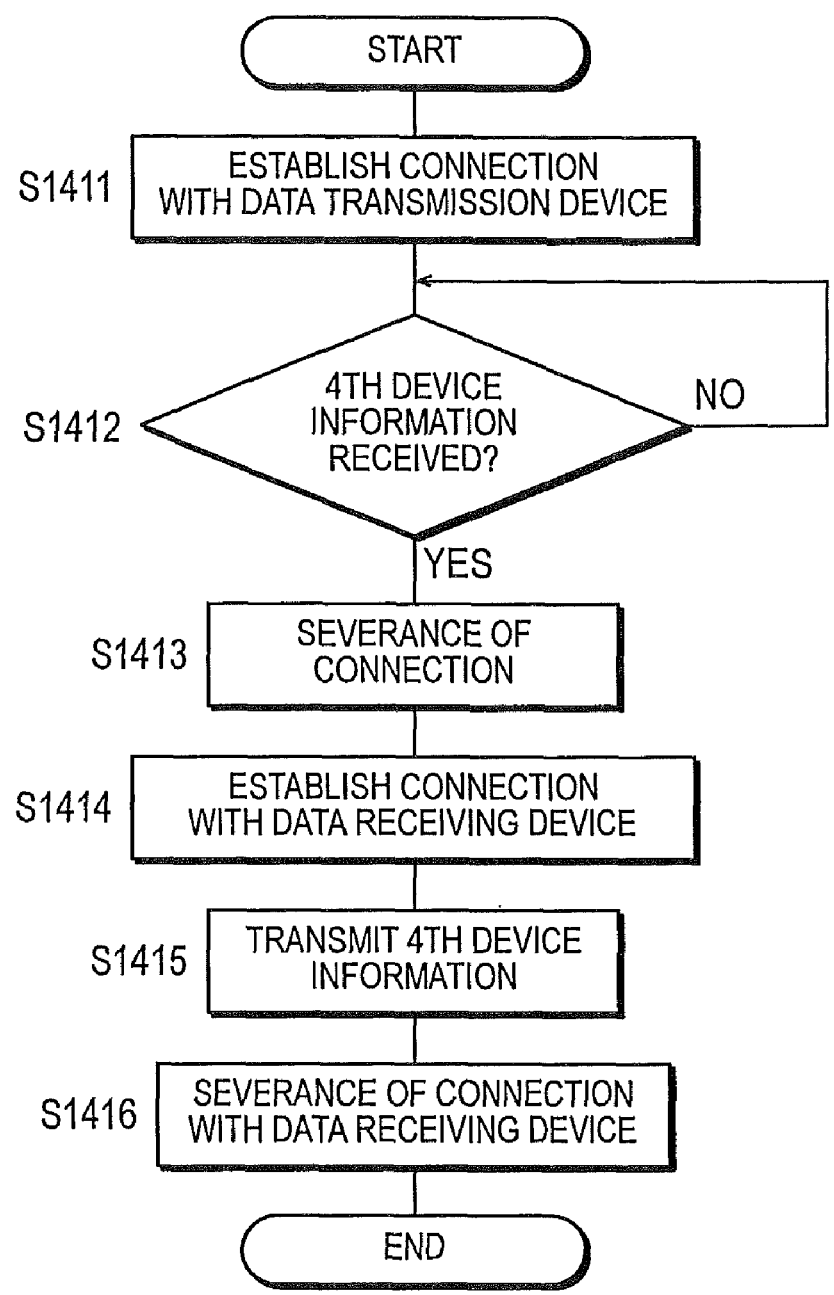
FIG. 55 is a flowchart of assistance in explaining the operating procedure of a portable terminal according to Embodiment III-1.

The operating procedure of the portable terminal is described in detail referring to FIG. 55. The flow chart of FIG. 55 is stored in the ROM of the portable terminal, for example, as the control program, and is executed by the CPU of the portable terminal.

First, a connection with the data transmission device is established (step S1411), and a judgment is made as to whether the fourth device information is received (step S1412). If it is judged that the fourth device information is received, the connection with the data transmission device is severed (step S1413).

Next, a connection with the data receiving device is established (step S1414), the fourth device information is transmitted to the data receiving device (step S1415), and the connection with the data receiving device is severed (step S1416).

Figure 56:
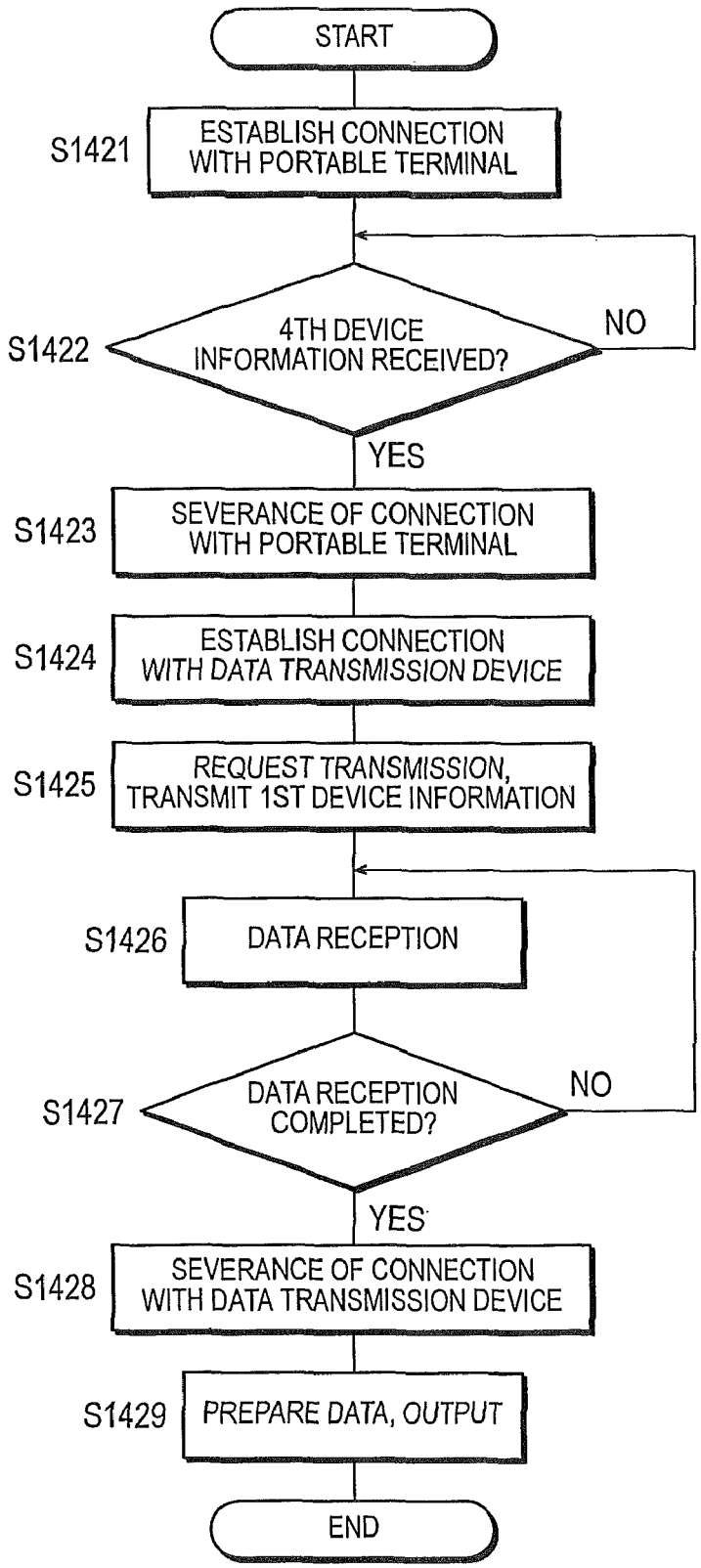
FIG. 56 is a flowchart of assistance in explaining the operating procedure of a data receiving device according to Embodiment III-1.

The operating procedure of the data receiving device will be described in detail referring to FIG. 56. The flow chart of FIG. 56 is stored in the ROM of the data receiving device, for example, as the control program, and is executed by the CPU of the data receiving device.

First, a connection with the portable terminal is established (step S1421), a judgment as to whether the fourth device information is received (step S1422). If it is judged that the fourth device information is received, the connection with the portable terminal is severed (step S1423).

Next, a connection with the data transmission device is established using the fourth device information (step S1424), while the data transmission request and the first device information (own device information) is transmitted (step S1425).

Thereafter the data from the data transmission device is received (step S1426). Next, a judgment is made as to whether the data transmission is completed (step S1427). If it is judged that the data transmission is completed, a connection with the data transmission device will be severed (step S1428).

Then, the output data is prepared using the received data, and the obtained data is outputted (step S1429).

Thus, the data volume of the device information is small compared to the data being transmitted in the data transmit-receive system according to Embodiment III-1, and it causes little burden on the portable terminal for transmission/reception of the device information.

On the other hand, the data transmission from the data transmission device to the data receiving device can be executed through the computer network without being restricted by the function of the portable terminal.

Embodiment III-2 will be described.

Embodiment III-2 is different from Embodiment III-1 in that it has a means of causing the data transmission to hold using the third device information (refer to Embodiment II-8).

More specifically, in causing the data transmission to hold, the portable terminal severs the connection with the data transmission device after obtaining the third device information while establishing a connection with the data transmission device based on the third device information when starting the data transmission.

Since the operating procedure for the data receiving device is identical to Embodiment III-1, its description is omitted here.

Figure 57:
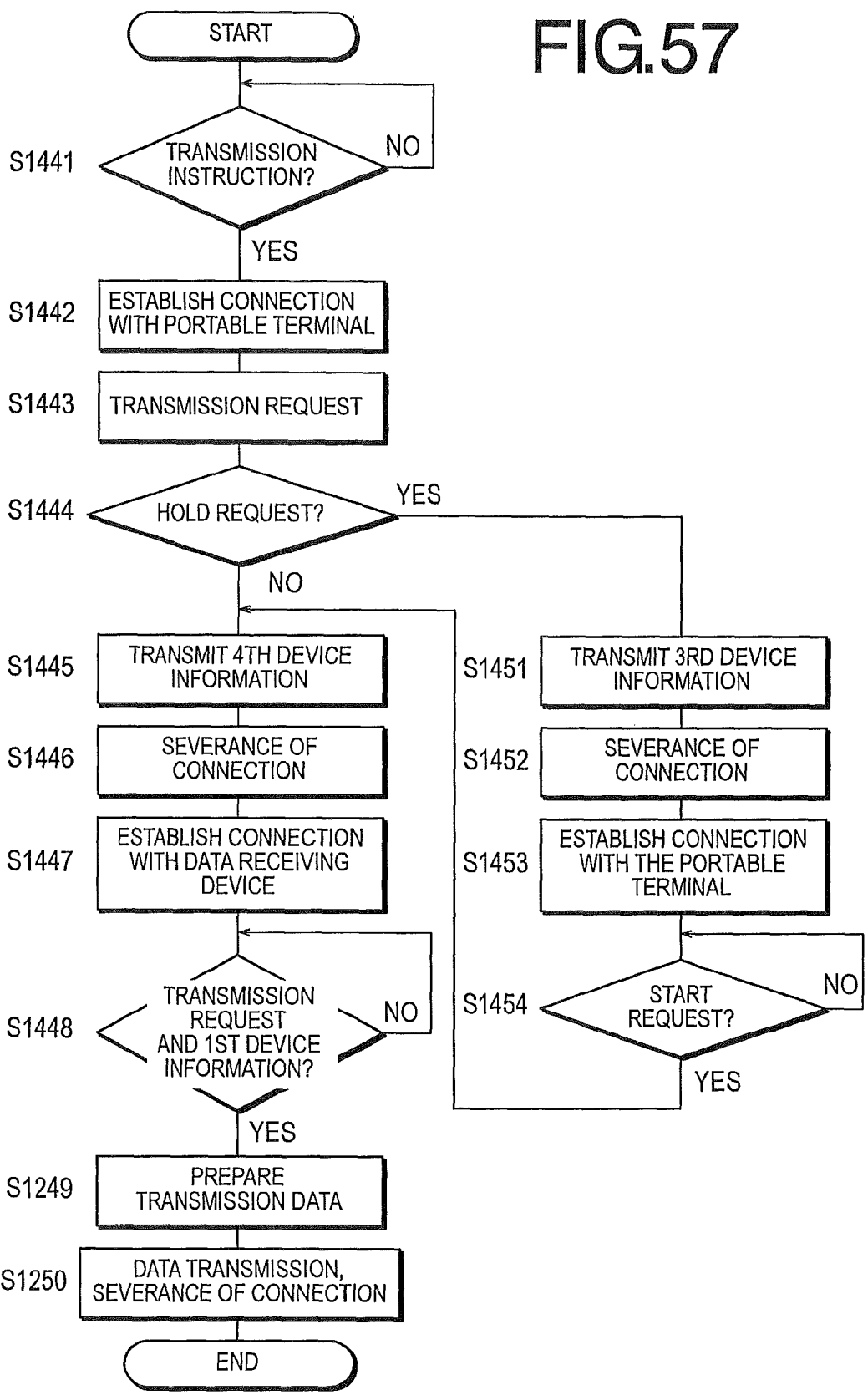
FIG. 57 is a flowchart of assistance in explaining the operating procedure of a data transmission device according to Embodiment III-2.

The operating procedure of the data transmission device will be described in detail referring to FIG. 57. The flowchart shown in FIG. 57 is, for example, stored in the ROM of the data transmission device as the control program and is executed by the CPU of the data transmission device.

First, the steps S1441 through S1443 are executed for transmitting a transmission request to the portable terminal.

Next, a judgment is made as to whether a hold request is received (step S1444). If it is judged that the hold request has not been received, the steps S1445 through S1450 are executed, and the data is transmitted from the data transmission device to the data receiving device.

If it is judged that the hold request is received, the third device information is transmitted to the portable terminal (step S1451), and the connection with the portable terminal will be severed (step S1452).

Thereafter a connection with the portable terminal is established using the third device information (step S1453). Next, a judgment is made as to whether a start request exists (step S1454).

If it is judged that a start request is received, the process returns to the step S1445, and the steps S1445 through S1450 are executed for transmitting the data from the data transmission device to the data receiving device.

Figure 58:
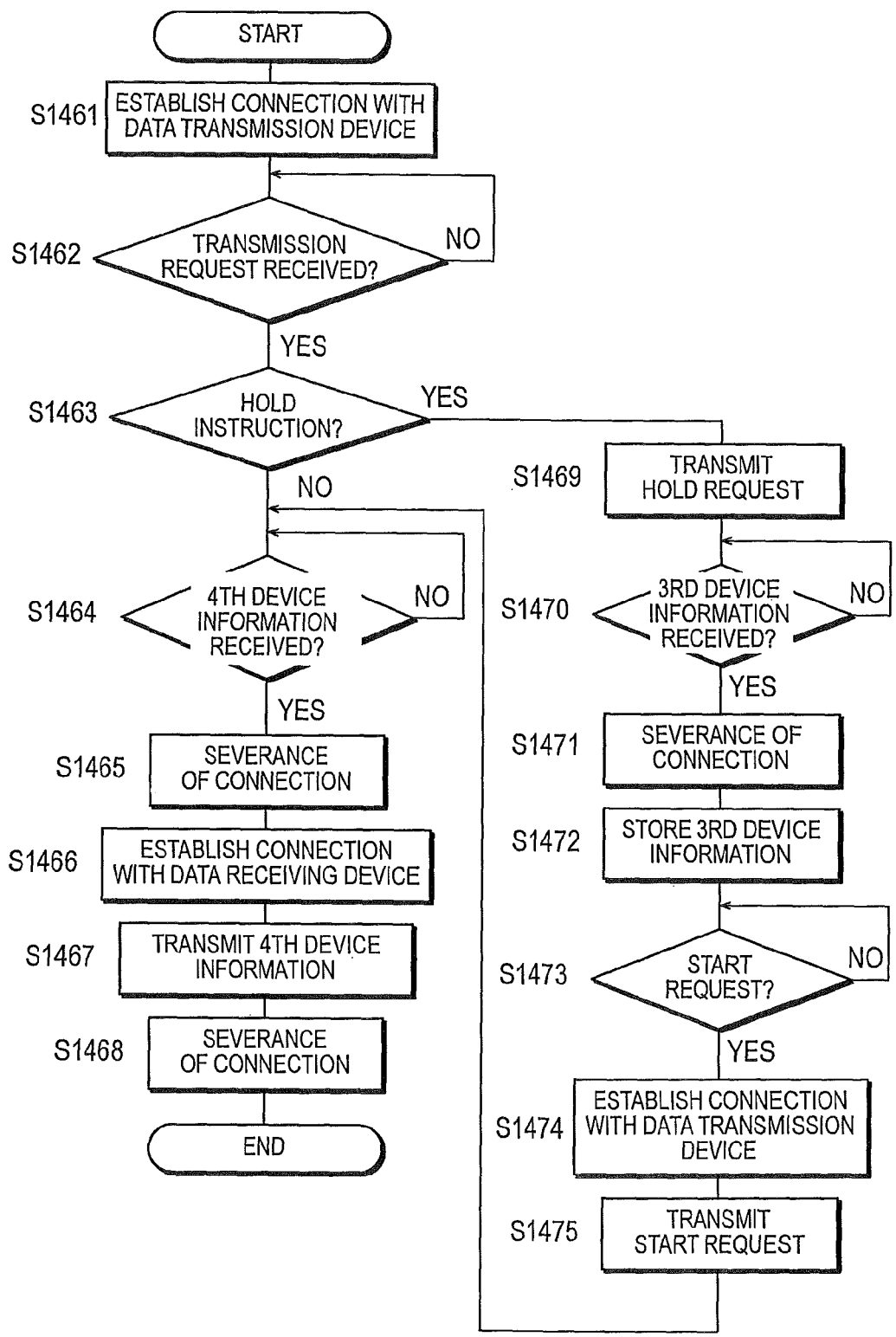
FIG. 58 is a flowchart of assistance in explaining the operating procedure of a portable terminal according to Embodiment III-2.

The operating procedure of the portable terminal will be described in detail referring to FIG. 58. The flowchart shown in FIG. 58 is, for example, stored in the ROM of the portable terminal as the control program and is executed by the CPU of the portable terminal.

First, a connection with the data transmission device (step S1461), a judgment is made as to whether a transmission request exists (step S1462).

If it is judged that the transmission request is received, a transmission hold selection screen (refer to FIG. 42) is displayed on the LCD of the operating unit of the portable terminal, and then, a judgment is made as to whether a hold instruction input exists (step S1463). If it is judged that no hold instruction input exits, the steps S1464 through S1468 are executed, and the fourth device information is transmitted to the data receiving device.

If it is judged that the hold instruction is inputted, a hold request is transmitted to the data transmission device (step S1469).

Next, a judgment is made as to whether the third device information is received (step S1470). If it is judged that it is received, the connection with the data transmission device will be severed (step S1471). The received third device information is stored in the RAM (step S1472).

Thereafter, a transmission start selection screen (refer to FIG. 43) is displayed on the LCD of the operating unit of the portable terminal, and a judgment is made as to whether a start instruction input exists (step S1473). If it is judged that the start instruction is inputted, a connection with the data transmission device is established using the third device information stored in the RAM (step S1474).

Next, a start request is transmitted to the data transmission device (step S1475). The process returns to the step S1464, and the steps S1464 through S1468 are executed for transmitting the fourth device information to the data receiving device.

Thus, by using the third device information whose data volume is small, it is possible to hold the data transmission without having any restrictions from the function of the portable terminal.

Embodiment IV-1 will be described.

Figure 59:
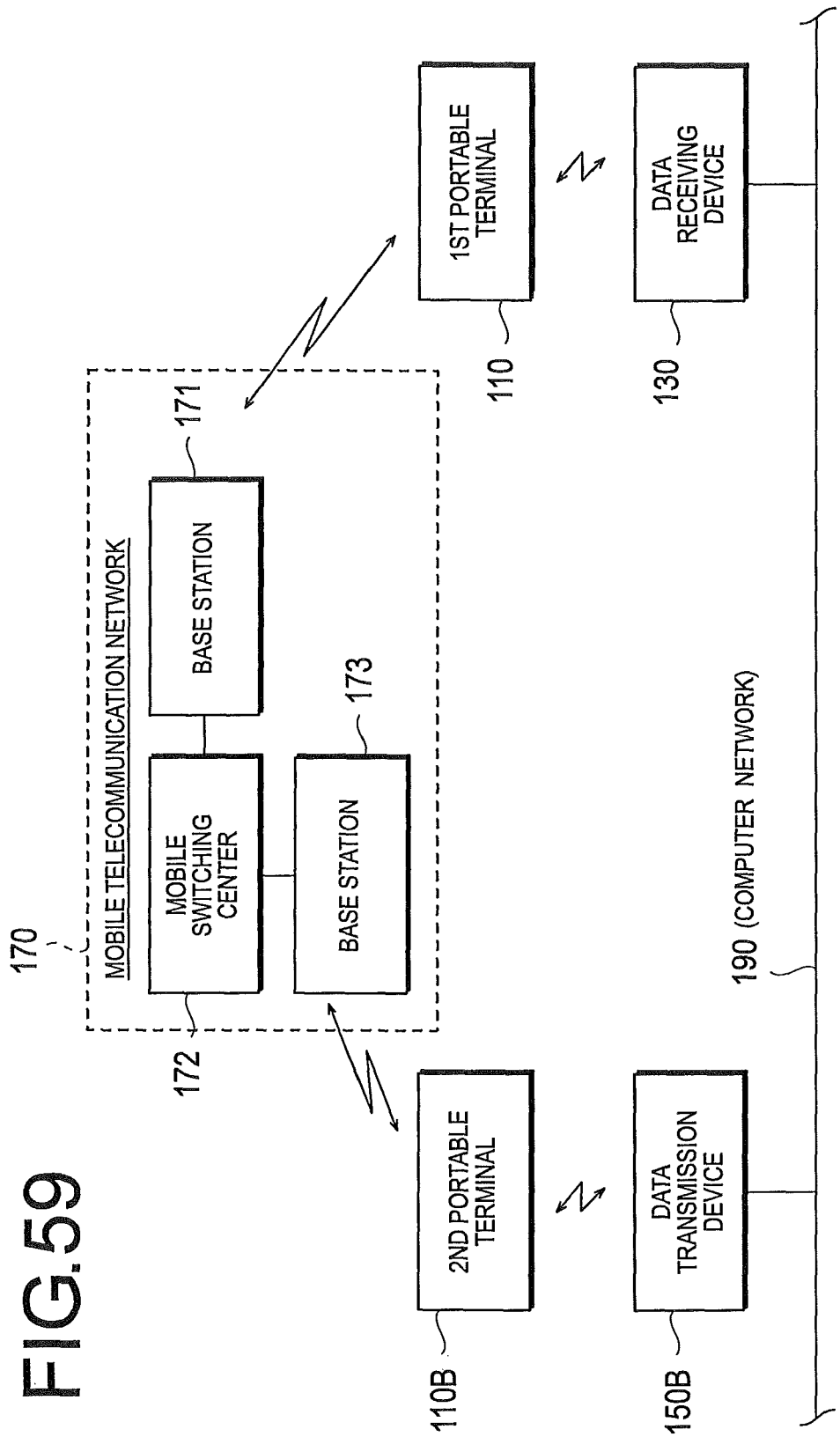
FIG. 59 is a schematic diagram of a data transmit-receive system according to Embodiment IV-1.

Embodiment IV-1 is different from Embodiment II-1 in that the device information of the data receiving device 130 is transmitted to the data transmission device 150B using a plurality of portable terminals 110, 110B as shown in FIG. 59.

The portable terminal (the second portable terminal) 110B is similarly constituted as the portable terminal (the first portable terminal) 110 and has a communication means for communicating via the mobile telecommunication network 170 and a local communication means for communicating in short distances.

The data transmission device 150B is different from the data transmission device 150 related to Embodiment II-1 in that it has a local communication means for communicating with the second portable terminal in short distances.

The operating procedure of the data receiving device is identical to that of Embodiment II-1, its description is omitted.

Figure 60:
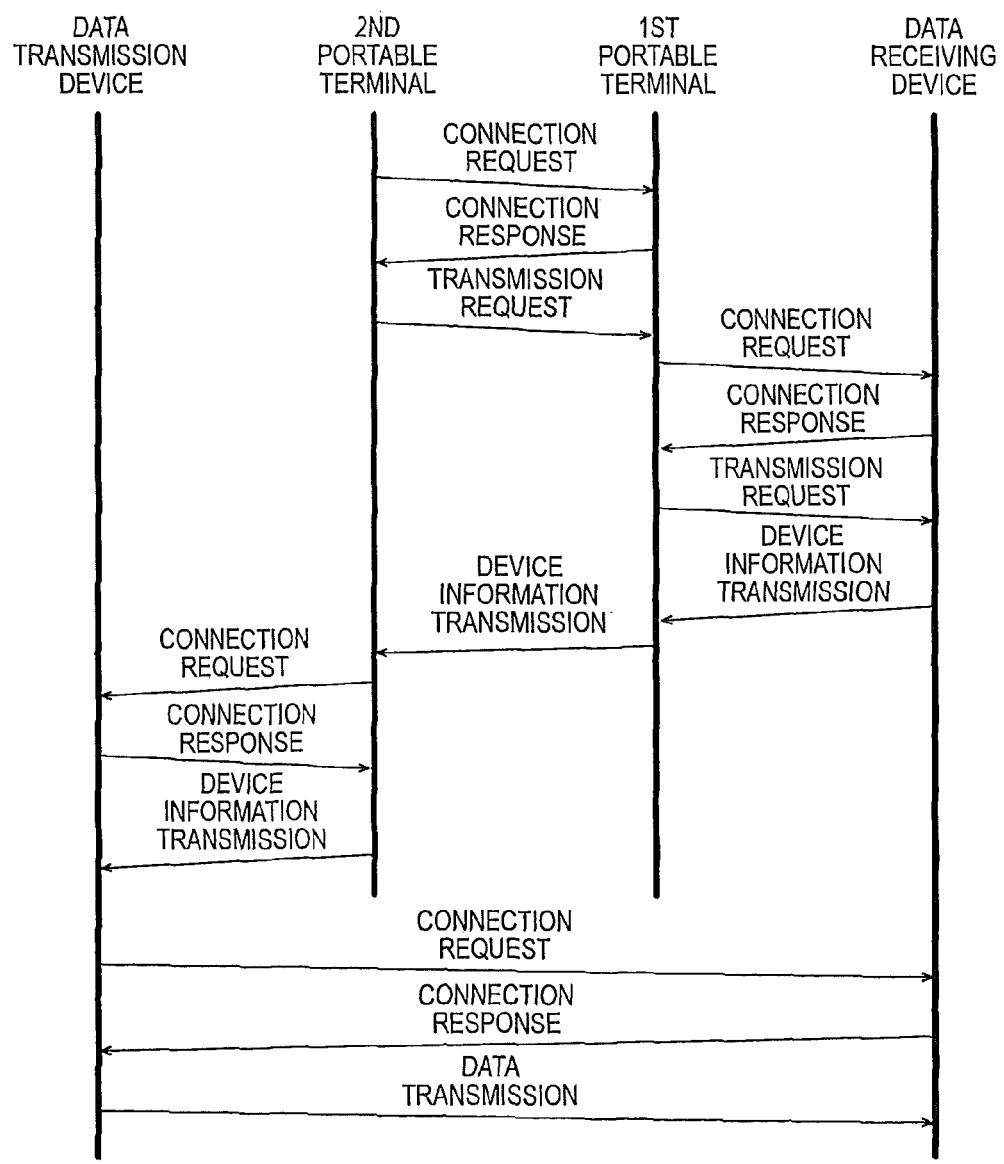
FIG. 60 is a sequence chart of assistance in explaining the communication procedure of the data transmit-receive system according to Embodiment IV-1.

The communication procedure of the data transmit-receive system will be described in detail referring to the sequence chart shown in FIG. 60.

First, as a transmission instruction is inputted, the second portable terminal 110B transmits a connection request to the first portable terminal 110 via the mobile telecommunication network 170. The first portable terminal 110 transmits a connection response to the second portable terminal 110B after receiving the connection request.

Thus, the connection between the second portable terminal 110B and the first portable terminal 110 is established. The second portable terminal 110B transmits the device information transmission request to the first portable terminal 110.

Upon receiving the device information transmission request, the first portable terminal 110 transmits a connection request to the data receiving device 130 located nearby. Upon receiving the connection request, the data receiving device 130 transmits the connection response to the first portable terminal 110.

Thus, the connection between the first portable terminal 110 and the data receiving device 130 is established. The first portable terminal 110 transmits a device information transmission request to the data receiving device 130.

Next, the data receiving device 130 transmits the device information to the first portable terminal 110, and then severs the connection with the first portable terminal 110.

On the other hand, the first portable terminal 110 transmits the received device information to the second portable terminal 110B via the mobile telecommunication network 170, and then severs the connection with the second portable terminal 110B.

Upon receiving the device information, the second portable terminal 110B transmits a connection request to the data transmission device 150B located nearby. Upon receiving the connection request, the data transmission device 150B transmits the connection response to the second portable terminal 110B.

Thus, the connection between the second portable terminal 110B and the data transmission device 150B is established. The second portable terminal 110B transmits the device information to the data transmission device 150B.

Next, the data transmission device 150B transmits a connection request to the data receiving device 130 via the computer network 190 based on the device information. Upon receiving the connection request, the data receiving device 130 transmits a connection response to the data transmission device 150B via the computer network 190.

Thus, the connection between the data transmission device 150B and the data receiving device 130 is established. The data transmission device 150B transmits the data to the data receiving device 130, and then severs the connection with the data receiving device 130.

Figure 61:
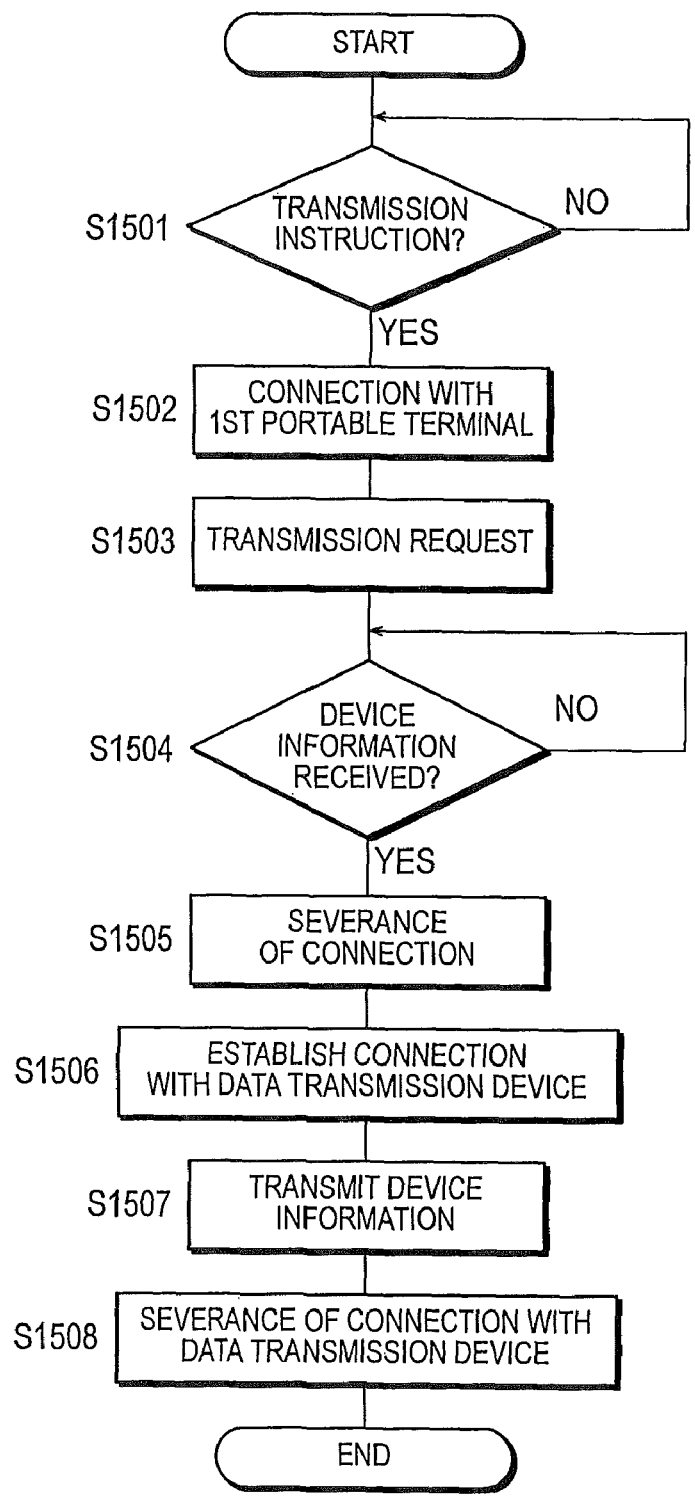
FIG. 61 is a flowchart of assistance in explaining the operating procedure of a second portable terminal according to Embodiment IV-1.

The operating procedure of the second portable terminal 110B will be described in detail referring to FIG. 61. The flowchart shown in FIG. 61 is, for example, stored in the ROM of the second portable terminal 110B as the control program and is executed by the CPU of the second portable terminal 110B.

First, a judgment is made as to whether a transmission instruction is inputted by the user (step S1501). If it is judged that the transmission instruction input exists, a connection with the first portable terminal 110 is established via the mobile telecommunication network 170 (step S1502), a device information transmission request is transmitted to the first portable terminal 110 (step S1503).

Next, a judgment is made whether the device information is received from the first portable terminal 110 via the mobile telecommunication network 170 (step S1504). If it is judged that the device information is received, the connection with the first portable terminal 110 will be severed (step S1505).

The connection is then established with the data transmission device 150B located nearby (step S1506). The device information is transmitted to the data transmission device 150B (step S1507), and the connection with the data transmission device 150B is severed (step S1508).

Figure 62:
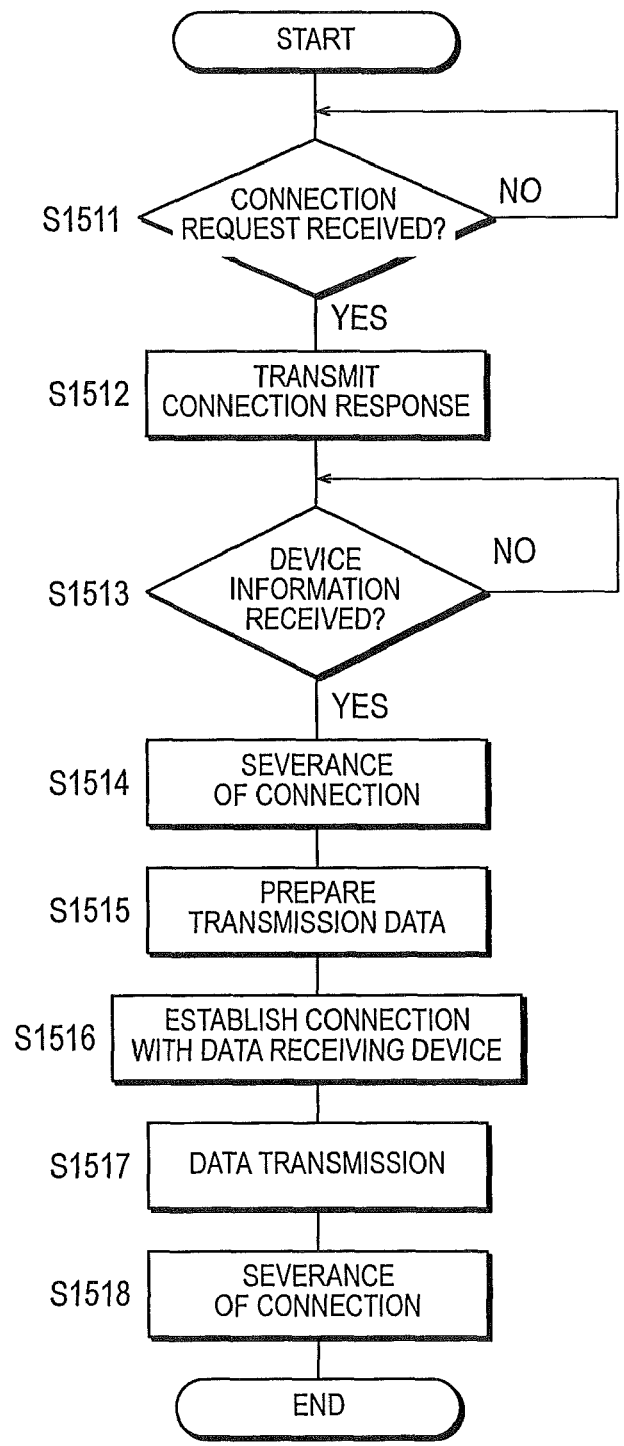
FIG. 62 is a flowchart of assistance in explaining the operating procedure of a data transmission device according to Embodiment IV-1.

The operating procedure of the data transmission device 150B will be described in detail referring to FIG. 62. The flowchart shown in FIG. 62 is, for example, stored in the ROM of the data transmission device 150B as the control program and is executed by the CPU of the data transmission device 150B.

First, a judgment is made as to whether there is any connection request from the second portable terminal 110B exists (step S1511). If it is judged that a connection request is received, a connection response is transmitted to the second portable terminal 110B (step S1512). Thus, the connection between the data transmission device 150B and the second portable terminal 110B is established.

Next, a judgment is made as to whether the device information is received (step S1513). If it is judged that the device information is received, the connection with the second portable terminal 110B is severed (step S1514).

Then, the steps S1515 through S1518 are executed for transmitting the prepared data to the data receiving device 130.

Figure 63:
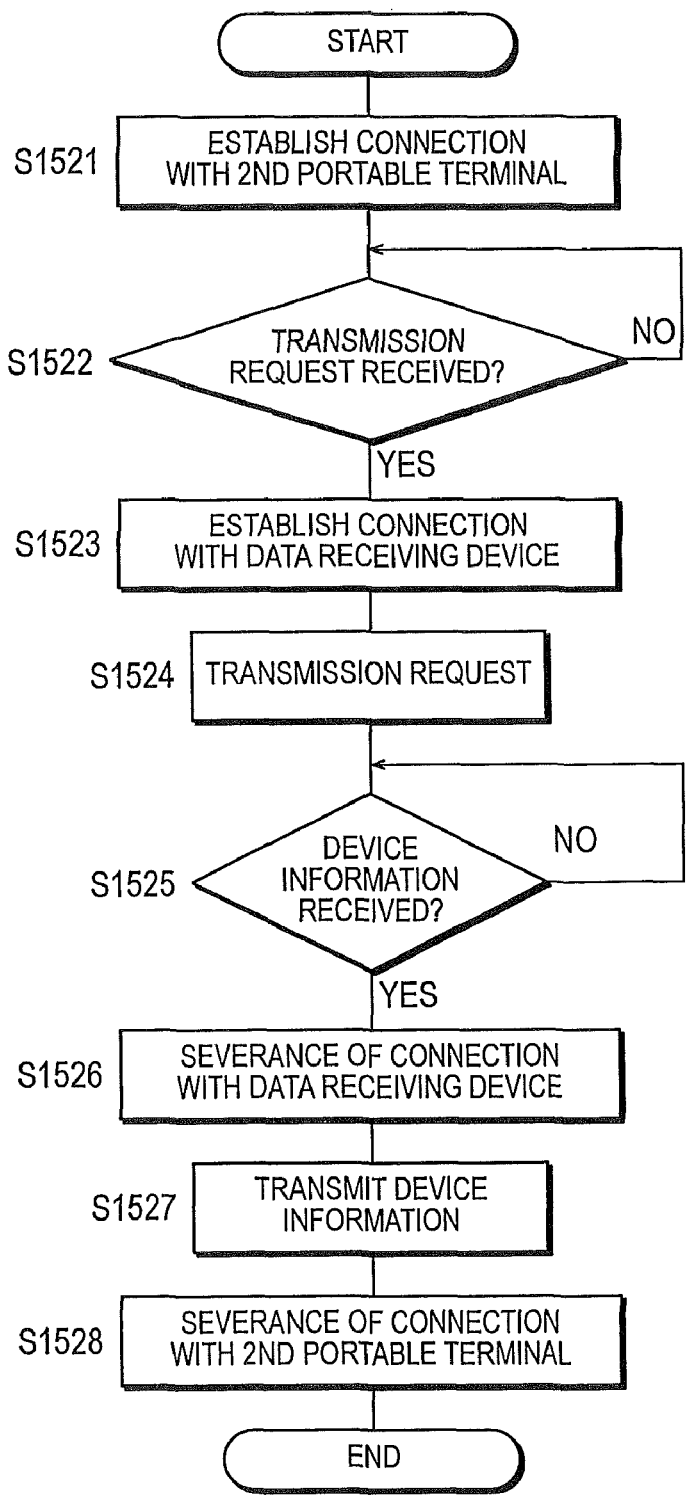
FIG. 63 is a flowchart of assistance in explaining the operating procedure of a first portable terminal according to Embodiment IV-1.

The operating procedure of the first portable terminal 110 will be described in detail referring to FIG. 63. The flowchart shown in FIG. 63 is, for example, stored in the ROM 112 as the control program and is executed by the CPU 111.

First, the connection with the second portable terminal 110B is established via the mobile telecommunication network 170 (step S1521). A judgment is made as to whether any device information transmission request is received (step S1522).

If it is judged that the transmission request is received, the connection with the data receiving device 130 located nearby is established (step S1523), and a device information transmission request is transmitted to data receiving device 130 (step S1524).

Then, a judgment is made as to whether any device information has been received from the data receiving device 130 (step S1525). If it is judged that the device information is received, the connection with the data receiving device 130 will be severed (step S1526).

Next, the device information is transmitted to the second portable terminal 110B via the mobile telecommunication network 170 (step S1527), and the connection with the second portable terminal 110B is severed (step S1528).

Thus, in Embodiment IV-1, a more flexible system can be constituted as a plurality of portable terminals is used.

Embodiment IV-2 will be described.

Figure 64:
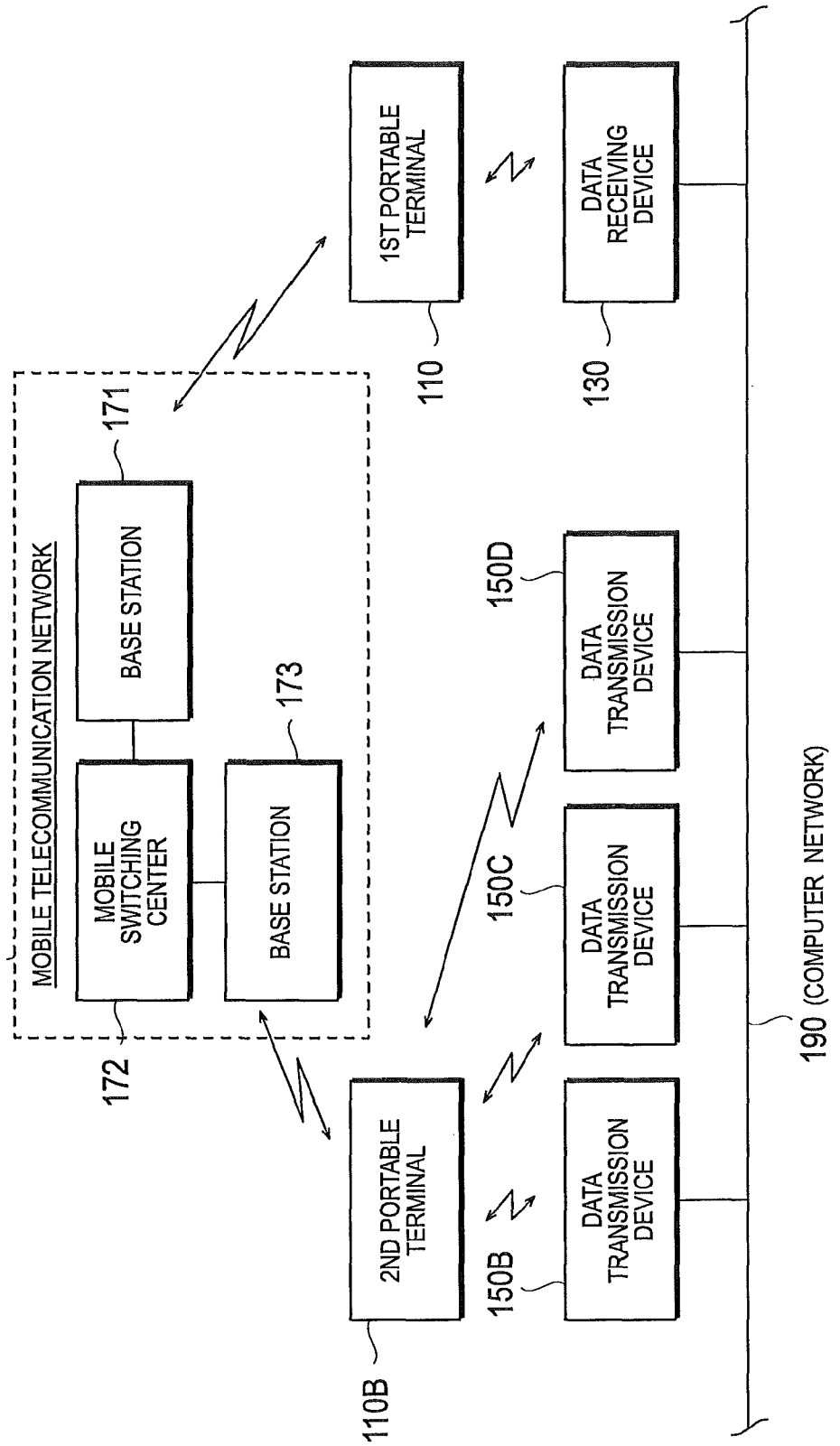
FIG. 64 is a schematic diagram of a data transmit-receive system according to Embodiment IV-2.

Embodiment IV-2 is different from Embodiment IV-1 in that, as shown in FIG. 64, the data transmit-receive system includes a plurality of data transmission devices 150B, 150C and 150D and that the second portable terminal 110B has a means of selecting one of the data transmission devices 150B, 150C and 150D as a source device using a fifth device information and a sixth device information.

The data transmission devices 150C and 150D has a local communication means for communicating with the second portable terminal 110B in short distances as the data transmission device 150B.

The fifth device information contains the connection information that can be used on the data transmission devices 150B, 150C and 150D and the specification information of the output means of the data transmission device 150B, 150C and 150D, and corresponds to the first device information.

The sixth device information is the identification data required for the second portable terminal 110B to establish connections with the data transmission devices 150B, 150C and 150D, respectively.

Since the operating procedures of the first portable terminal 110 and the data receiving device 130 are similar to those of Embodiment IV-1, their descriptions are omitted here.

The communication procedure of the data transmit-receive system will be described here referring to the sequence chart shown in FIG. 65.

First, similar to Embodiment IV-1, the second portable terminal 110B receives the first device information of the data receiving device 130 via the first portable terminal 110.

Next, the second portable terminal 110B transmits connection requests to the data transmission devices 150B, 150C and 150D. Each of the data transmission devices 150B, 150C and 150D transmits a connection response as well as the fifth device information and the sixth device information to the second portable terminal 110B, and severs the connection with the second portable terminal 110B.

The second portable terminal 110B compares the first device information and the fifth device information and selects one of the data transmission devices 150B, 150C and 150D as a source device. Thereafter, the second portable terminal 110B establishes the connection with the source device based on the sixth device information of the source device, and transmits the first device information to the source device.

Next, the source device transmits the data to the data receiving device 130 based on the first device information similar to Embodiment IV-1.

The operating procedure of the second portable terminal 110B will be described in detail referring to FIG. 66. The flowchart shown in FIG. 66 is, for example, stored in the ROM of the second portable terminal 110B as the control program and is executed by the CPU of the second portable terminal 110B.

First, the steps S1601 through S1604 are executed for receiving the first device information from the first portable terminal 110.

Next, connection requests are transmitted to the data transmission devices 150B, 150C and 150D (step S1605), and a judgment is made as to whether any connection response is received (step S1606). If it is judged that a connection response is received, a transmission request for the fifth device information and the sixth device information is transmitted (step S1607).

Then, a judgment is made whether the fifth device information and the sixth device information are received (step S1608). If it is judged that the fifth device information and the sixth device information are received, the fifth device information and sixth device information will be stored into the RAM (step S1609), and the connection will be severed (step S1610).

When the storage of the fifth device information and the sixth device information of the data transmission devices 150B, 150C and 150D is completed by repeating the steps S1606 through S1610, the first device information and the fifth device information are compared, and one of the data transmission devices 150B, 150C and 150D is automatically selected as the source device (step S1611).

Next, the data transmission device instruction screen is displayed on the LCD of the second portable terminal (step S1612).

For example, if the data transmission devices 150B, 150C and 150D have the fifth device information shown in FIGS. 67A through 67C respectively, and the data receiving device 130 has the first device information shown in FIG. 67D, the data transmission device 150B has the fifth device information that corresponds to the first device information of the data receiving device 130, the data transmission device 150B will be automatically selected and, for example, the data transmission device instruction screen shown in FIG. 68 will be displayed.

Next, the connection with the selected source device is established based on the sixth device information of the source device (step S1613), and the first device information is transmitted (step S1614). Then, the connection is severed (step S1615).

Figure 69:
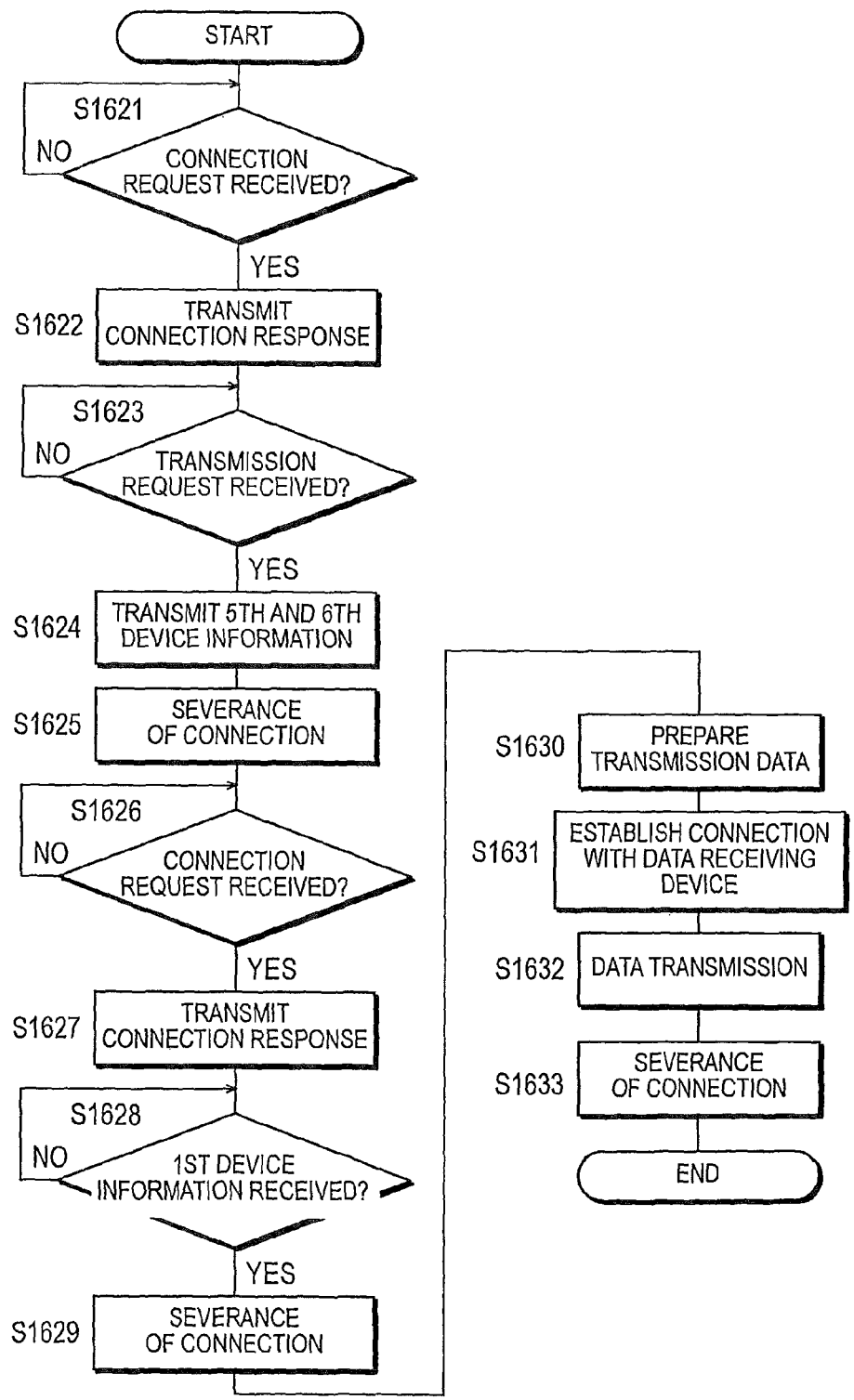
FIG. 69 is a flowchart of assistance in explaining the operating procedure of a data transmission device according to Embodiment IV-2.

The operating procedures of the data transmission devices 150B, 150C and 150D will be described in detail referring to FIG. 69. The flowchart shown in FIG. 69 is stored in the ROMs of the data transmission devices 150B, 150C and

150D, for example, as the control program and is executed by the CPUs of the data transmission devices 150B, 150C and 150D.

First, a judgment is made as to whether a connection request is received from the second portable terminal 110B (step S1621). If it is judged that the connection request is received, a connection response is transmitted to the second portable terminal 110B (step S1622). Thus, the connection between the data transmission device 150B and the second portable terminal 110B is established.

Next, a judgment is made as to whether a transmission request is received (step S1623). If it is judged that the transmission request is received, the fifth device information and the sixth device information are transmitted to the second portable terminal 110B (step S1624), and the connection with the second portable terminal 110B will be severed (step S1625).

Thereafter, a judgment is made as to whether a connection request to be transmitted from the second portable terminal 110B based on the sixth device information exists (step S1626).

Next, the first device information is obtained from the second portable terminal 110B by executing the steps S1627 through S1629, and the data prepared is transmitted to the data receiving device 130 by executing the steps S1630 through S1633.

Thus, the data volume of the fifth device information and the sixth device information is small, and it causes little burden on the portable terminal for transmission/reception of the device information. Therefore, one of the data transmission devices can be automatically selected as the source device at the second portable terminal without being restricted by the function of the portable terminal.

Embodiment IV-3 will be described.

Embodiment IV-3 is different from Embodiment IV-2 in that the second portable terminal provides a means for the user to select the source device manually. Since the operating procedures of the first portable terminal, the data transmission device and the data receiving device are identical to those of Embodiment IV-2, their descriptions are omitted.

Figure 70:
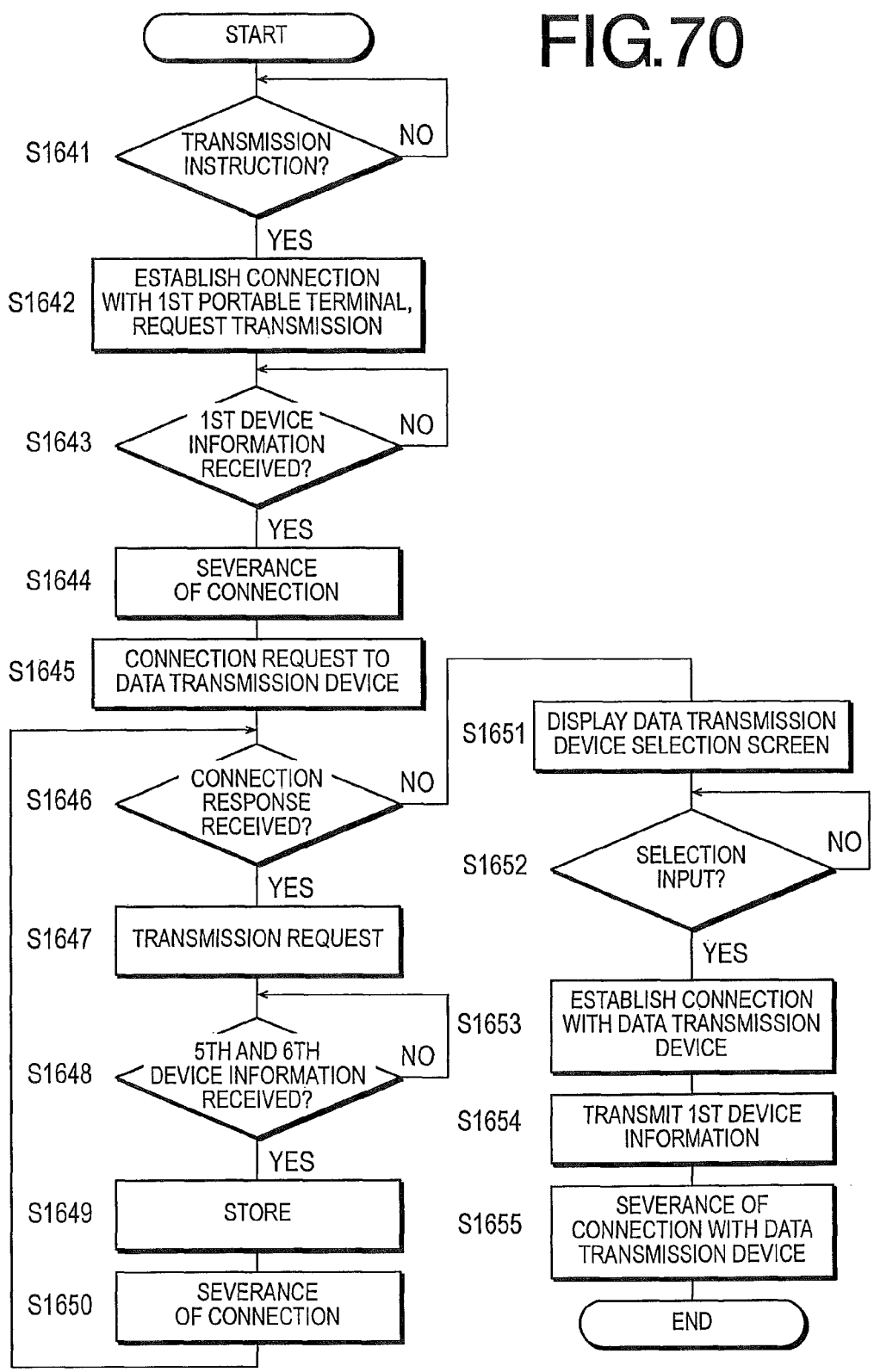
FIG. 70 is a flowchart of assistance in explaining the operating procedure of a second portable terminal according to Embodiment IV-3.

The operating procedure of the second portable terminal 110B will be described in detail referring to FIG. 70. The flowchart shown in FIG. 70 is, for example, stored in the ROM of the second portable terminal 110B as the control program and is executed by the CPU of the second portable terminal 110B.

First, the steps S1641 through S1650 are executed for receiving the first device information, the fifth device information and the sixth device information.

Next, the data transmission device selection screen shown in FIG. 71 is, for example, generated and displayed on the LCD of the second portable terminal based on the fifth device information (step S1651).

If an unsuitable data transmission device is found as a result of the comparison of the first device information and the fifth device information, the unsuitable data transmission device will not be displayed on the data transmission device selection screen.

Next, a judgment is made as to whether the user's selection input exists (step S1652). If it is judged that the selection is completed, a connection with the selected source device is established based on the sixth device information of the selected source device (step S1653), and the first device information is transmitted (step S1654). Then the connection is severed (step S1655).

Thus, in Embodiment IV-3, one of the data transmission devices can be selected manually at the second portable terminal as the source device.

Embodiment IV-4 will be described.

Figure 72:
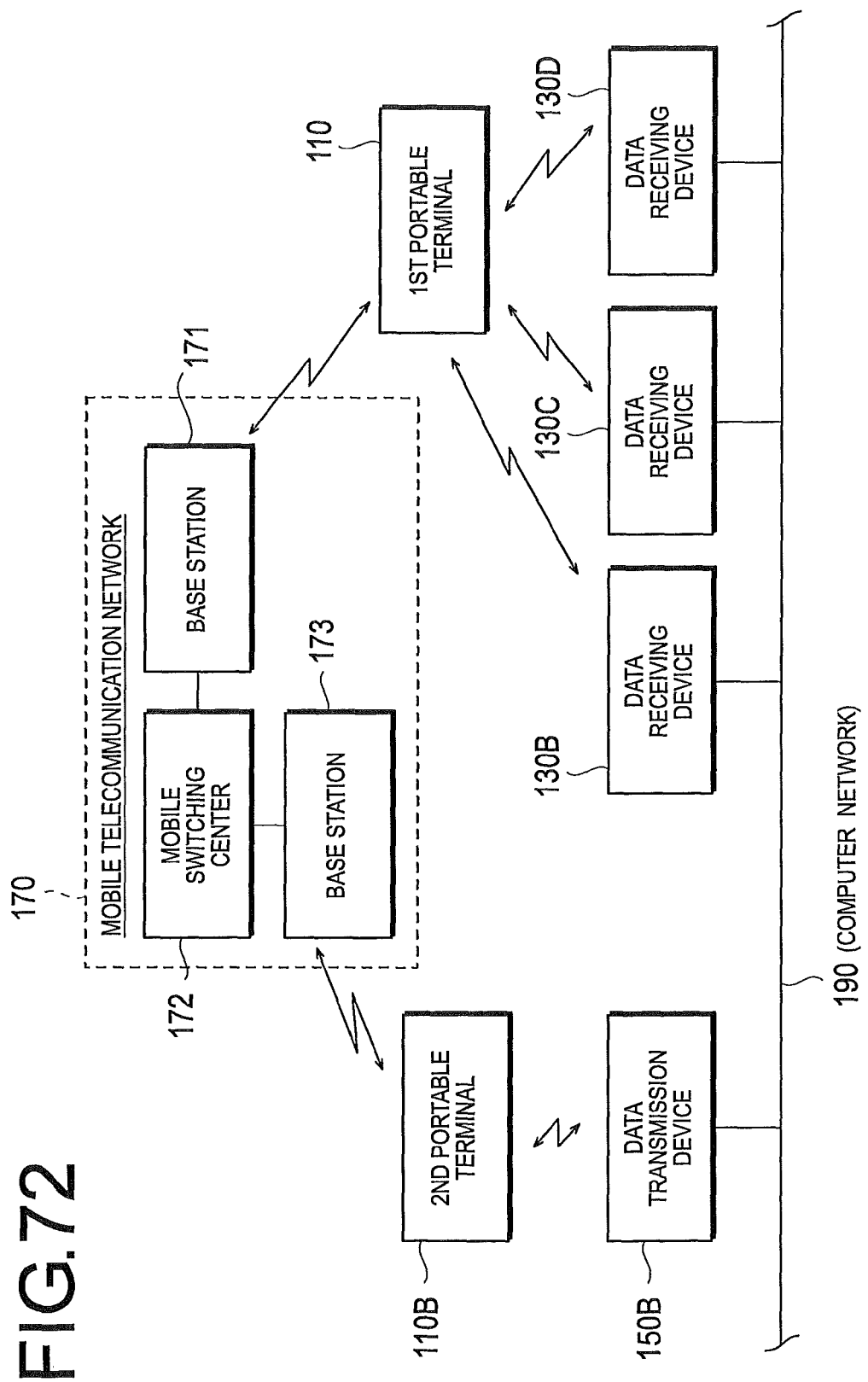
FIG. 72 is a schematic diagram of a data transmit-receive system according to Embodiment IV-4.

Embodiment IV-4 is different from Embodiment IV-1 in that, as shown in FIG. 72, the data transmit-receive system includes a plurality of data receiving devices 130B, 130C and 130D and that the data transmission device 150B has a means of automatically selecting one of the data receiving devices 130B, 130C and 130D as a destination device.

Since the operating procedure of the second portable terminal 110B is identical to that of Embodiment IV-1 and the operating procedures of the first portable terminal 110 and the data receiving devices 130B, 130C and 130D are identical to those of Embodiment II-9, their descriptions are omitted here.

Figure 73:
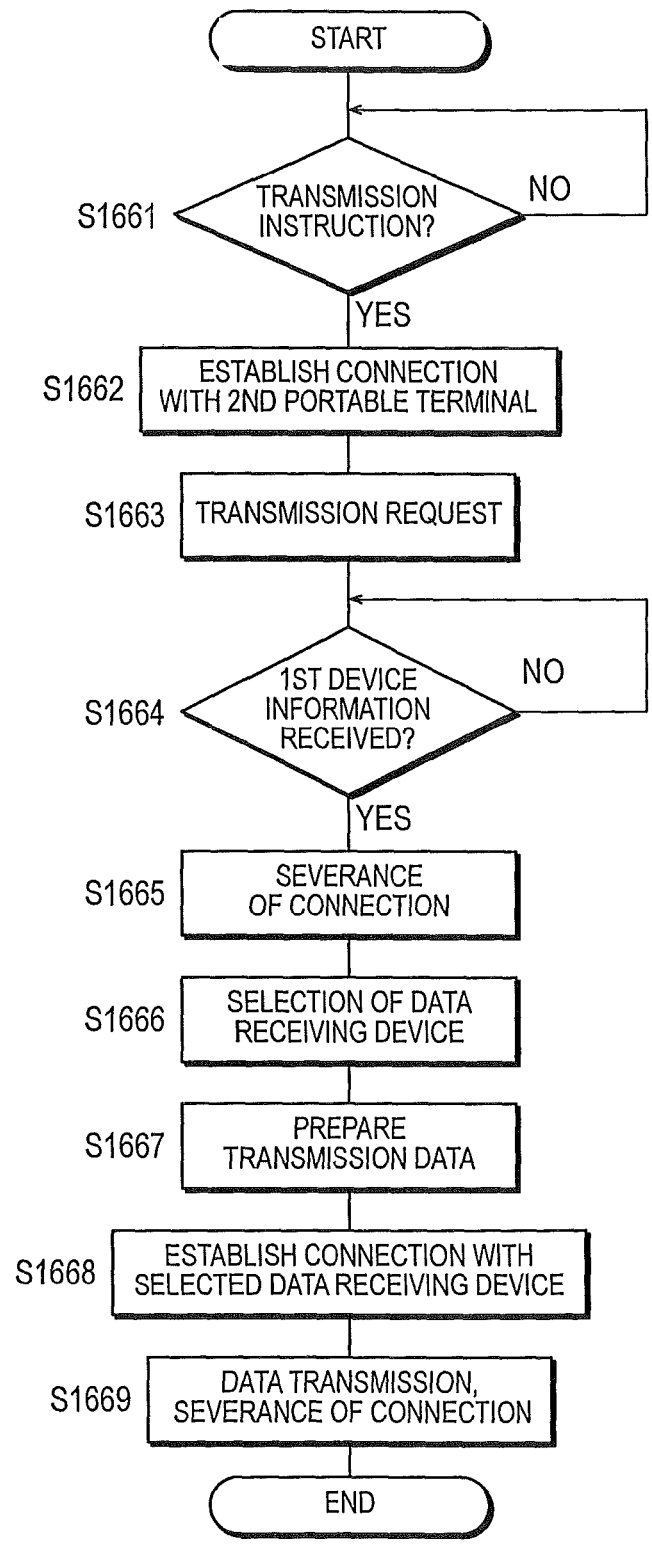
FIG. 73 is a flowchart of assistance in explaining the operating procedure of a data transmission device according to Embodiment IV-4.

The operating procedure of the data transmission device 150B will be described in detail referring to FIG. 73. The flowchart shown in FIG. 73 is, for example, stored in the ROM of the data transmission device 150B as the control program and is executed by the CPU of the data transmission device 150B.

First, the steps S1661 through S1665 are executed to receive the first device information (refer to FIG. 47) generated by combining the first device information of the data receiving devices 130B, 130C and 130D (refer to FIG. 46A through FIG. 46C).

Next, the data of the data receiving devices 130B, 130C and 130D contained in the first device information are compared and a proper destination device is selected (step S1666).

Then, transmission data is prepared using the specification information of the destination device (step S1667), and a connection is established based on the connection information of the destination device (step S1668).

Next, the prepared data is transmitted and the connection with the destination device will be severed (step S1669).

Thus, in Embodiment IV-4, the data transmission device automatically selects one of the data receiving devices as the destination device without being restricted by the function of the portable terminal in the same way as in Embodiment II-9.

Embodiment IV-5 will be described.

Embodiment IV-5 is different from Embodiment IV-4 in that the second portable terminal provides a means for the user to select the destination device manually.

The operating procedures of the data transmission device 150B is identical to that of Embodiment IV-1 and the operating procedures of the first portable terminal 110 and the data receiving devices 130B, 130c and 130D are identical to that of Embodiment IV-4, so that their descriptions are omitted.

Figure 74:
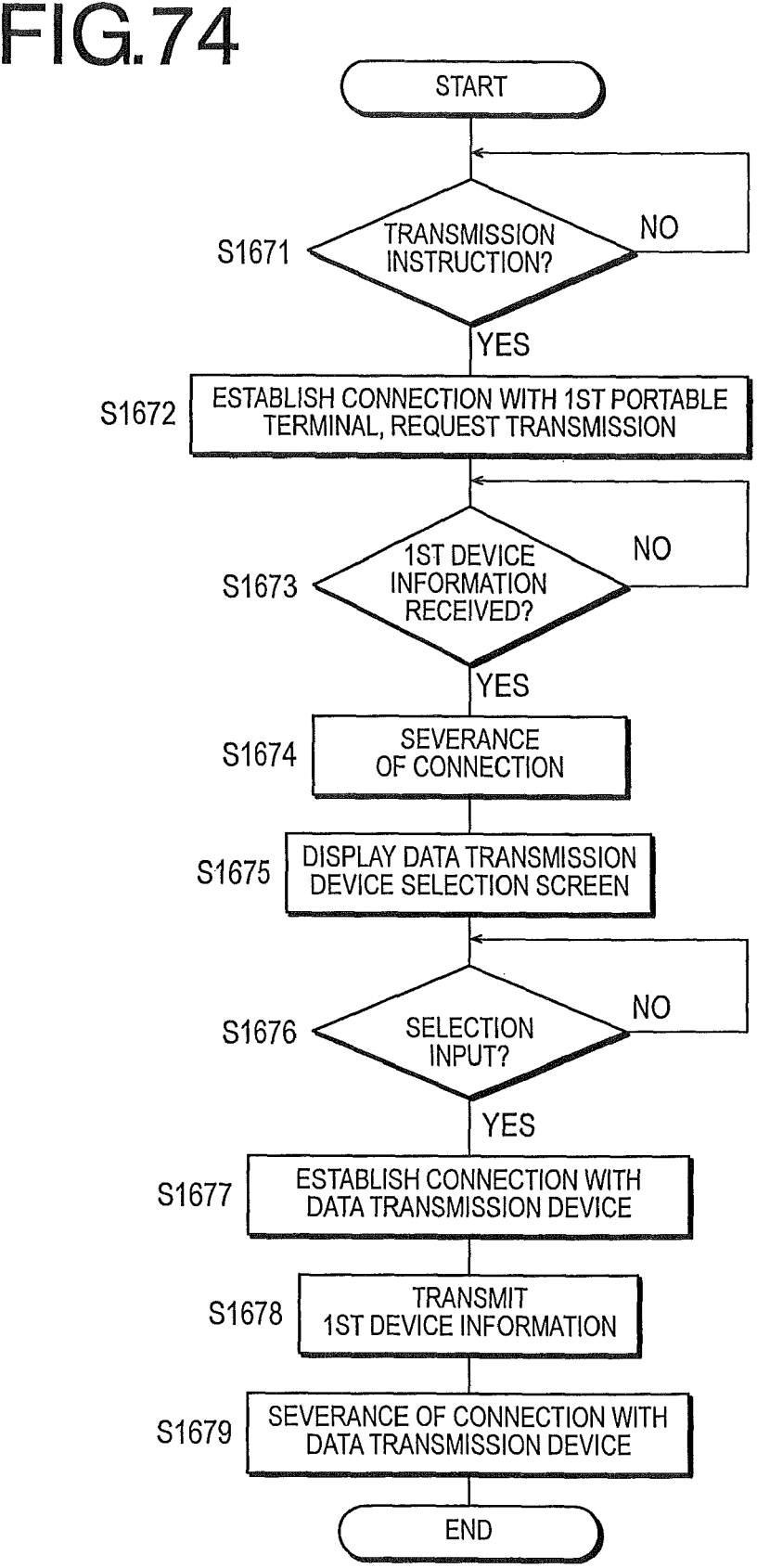
FIG. 74 is a flowchart of assistance in explaining the operating procedure of a second portable terminal according to Embodiment IV-5.

The operating procedure of the second portable terminal will be described in detail referring to FIG. 74. The flowchart shown in FIG. 74 is, for example, stored in the ROM of the second portable terminal as the control program and is executed by the CPU of the second portable terminal.

First, the steps S1671 through S1674 are executed to receive the first device information (refer to FIG. 47) generated by combining the first device information of the data receiving devices 130B, 130C and 130D (refer to FIG. 46A through FIG. 46C).

Next, the data receiving device selection screen (refer to FIG. 51) is generated based on the first device information and displayed (step S1675).

Then, a judgment is made whether the user's selection input exists (step S1676). If it is judged that the selection is completed, a connection with the data transmission device is established (step S1677).

Next, the first device information of the selected destination device is transmitted (step S1678). Then, the connection with the data transmission device is severed (step S1679).

Thus, in Embodiment IV-5, one of the data receiving devices can be selected manually at the second portable terminal as the destination device.

Embodiment V-1 will be described.

Figure 75:
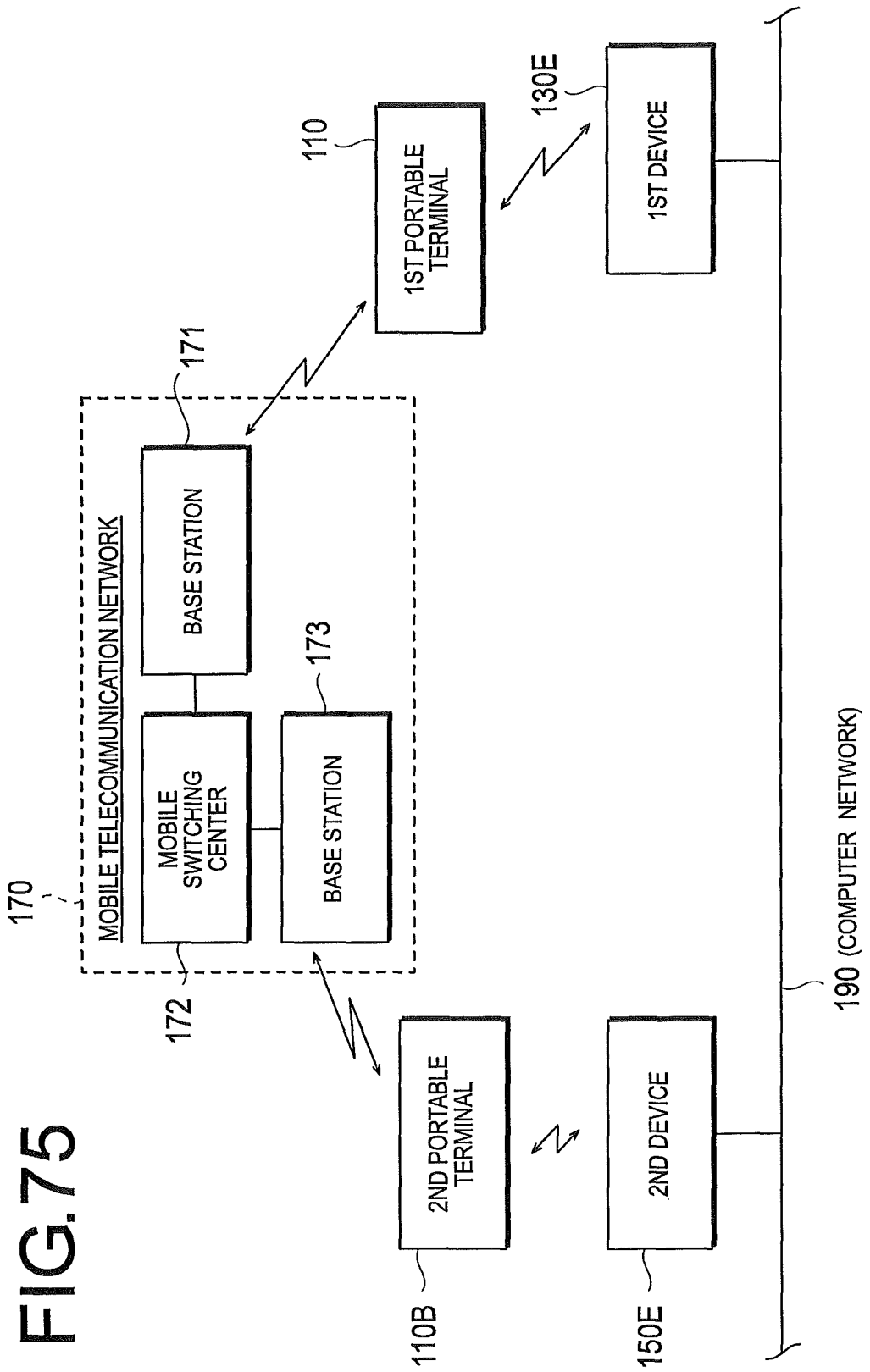
FIG. 75 is a schematic diagram of a data transmit-receive system according to Embodiment V-1.

The data transmit-receive system shown in FIG. 75 is different from that of Embodiment IV-1 in that the data transmitted via the computer network 190 is encoded voice data and that the first device 130E and the second device 150E have codec means for coding/decoding the voice data.

In other words, the first portable terminal 110 and the second portable terminal 110B execute voice communication via the computer network 190 in the data transmit-receive system according to Embodiment V-1.

More specifically, the first device 130E performs encoding of voice data transmitted from the first portable terminal 110 via the local communication means in order to transmit it to the second device 150E via the computer network 190, as well as decoding of encoded data received from the second device 150E via the computer network 190 into voice data in order to transmit it to the first portable terminal 110 using the local communication means.

On the other hand, the second device 150E performs encoding of voice data transmitted from the second portable terminal 110B via the local communication means in order to transmit it to the first device 130E via the computer network 190, as well as decoding of encoded data received from the first device 130E via the computer network 190 into voice data in order to transmit it to the second portable terminal 110B using the local communication means.

Figure 76:
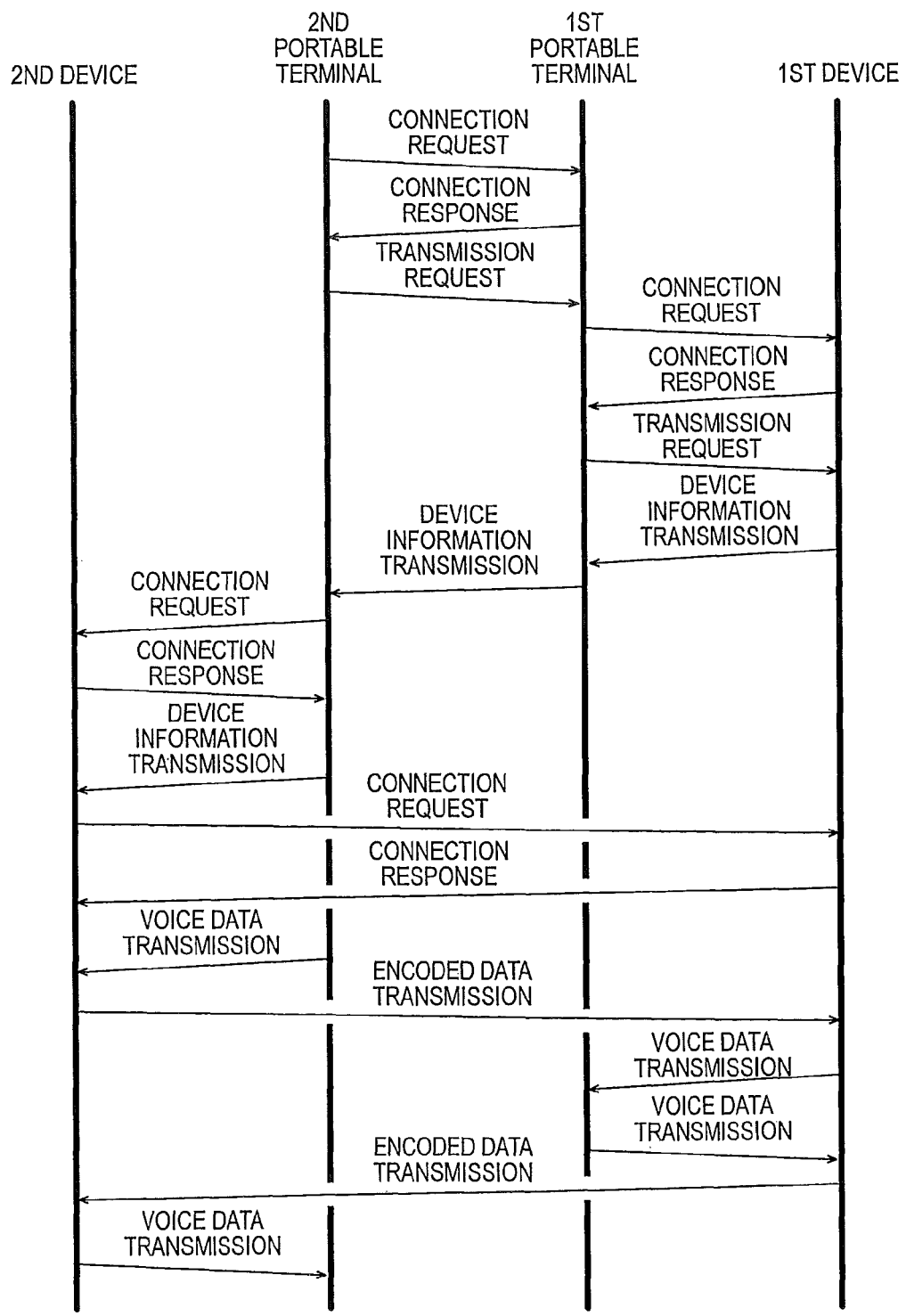
FIG. 76 is a sequence chart of assistance in explaining the communication procedure of the data transmit-receive system according to Embodiment V-1.

The communication procedure of the data transmit-receive system will be described referring to the sequence chart of FIG. 76.

First, when the second portable terminal 110B receives a transmission instruction, the connection is established between the first device 130E and the second device 150E via the computer network 190 similar to Embodiment IV-1. Then, the first device 130E and the second device 150E transmit connection establishment notices to the first portable terminal 110 and the second portable terminal 110B, respectively.

Next, upon receiving the connection establishment notice from the second device 150E, the second portable terminal 110B transmits the voice data inputted by the user to the second device 150E. The second device 150E encodes voice data from the second portable terminal 110B and transmits it to the first device 130E via the computer network 190.

The first device 130E decodes encoded data from the second device 150E into voice data and transmits it to the first portable terminal 110, which is reproduced at the first portable terminal 110.

On the other hand, the first portable terminal 110 transmits the voice data inputted by the user to the first device 130E. The first device 130E encodes voice data from the first portable terminal 110 and transmits it to the second device 150E via the computer network 190.

The second device 150E decodes encoded data from the first device 130E into voice data and transmits it to the second portable terminal 110B, which is reproduced at the second portable terminal 110B.

Figure 77:
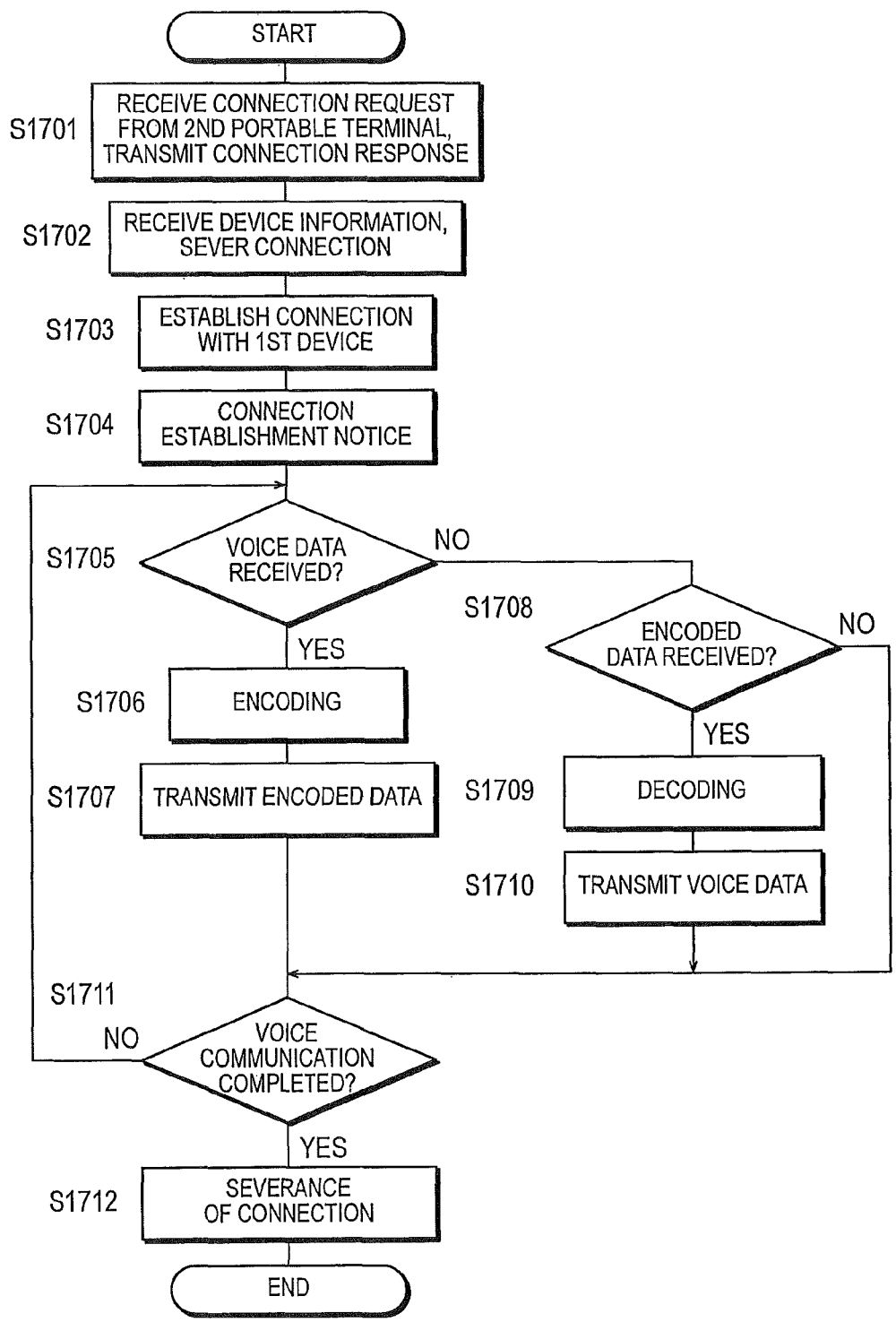
FIG. 77 is a flowchart of assistance in explaining the operating procedure of a second device according to Embodiment V-1.

The operating procedure of the second device 150E will be described in detail referring to FIG. 77. The flowchart shown in FIG. 77 is, for example, stored in the ROM of the second device 150E as the control program and is executed by the CPU of the second device 150E.

First, the steps S1701 and S1702 are executed for receiving the first device information of the first device 130E from the second portable terminal 110B. The device information of the first device 130E contains only the connection information as shown in FIG. 78.

Next, when the connection with the first device 130E is established based on the connection information (step S1703), a connection establishment notice is transmitted to the second portable terminal 110B (step S1704). Thereafter, a judgment is made as to whether voice data is received from the second portable terminal 110B (step S1705).

If it is judged that voice data is received, the voice data is encoded (step S1706) and transmitted to the first device 130E (step S1707), while the process advances to the step S1711.

On the other hand, if it is judged that voice data is not received, a judgment is further made as to whether encoded data is received from the first device 130E (step S1708). If it is judged that encoded data is received, the encoded data is decoded (step S1709) and is transmitted to the second portable terminal 110B as voice data (step S1710), while the process advances to the step S1711.

In addition, the steps S1709 and S1710 are skipped if it is judged that the encoded data is not received.

At the step S1711, a judgment is made as to whether the voice communication is completed. If it is judged that the voice communication is not completed, the process returns to the step S1705. On the other hand, if it is judged that the voice communication is completed, the connection with the first device 130E will be severed (step S1712).

Figure 79:
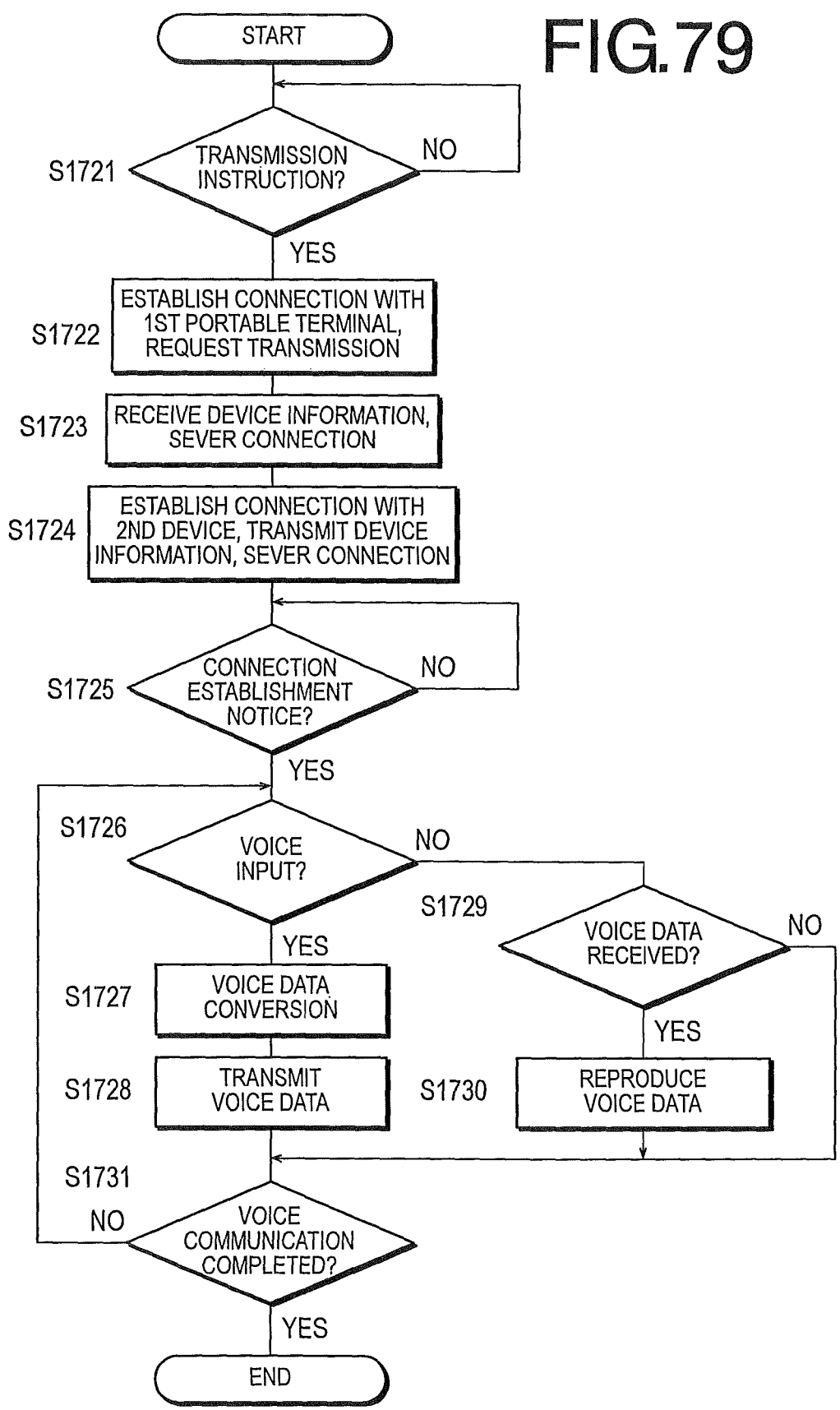
FIG. 79 is a flowchart of assistance in explaining the operating procedure of a second portable terminal according to Embodiment V-1.

The operating procedure of the second portable terminal 110B will be described in detail referring to FIG. 79. The flowchart shown in FIG. 79 is, for example, stored in the ROM of the second portable terminal 110B as the control program and is executed by the CPU of the second portable terminal 110B.

First, the steps S1721 through S1724 are executed for transmitting the device information of the first device 130E obtained from the first portable terminal 110 to the second device 150E.

Next, a judgment is made as to whether the connection establishment notice from the second device 150E is received (step S1725). When the receipt of the connection establishment notice is confirmed, a judgment is made as to whether voice data is received from the microphone of the voice input/output unit (step S1726).

If it is judged that voice is inputted, the voice is converted into voice data (step S1727) and transmitted to the second device 150E (step S1728), while the process advances to the step S1731.

On the other hand, if it is judged that voice is not inputted, a judgment is further made as to whether voice data is received from the second device 150E (step S1729). If it is judged that the voice data is received, the voice data is reproduced by the speaker of the voice input/output unit (step S1730), while the process advances to the step S1731.

In addition, the step S1730 is skipped if it is judged that the voice data is not received.

At the step S1731, a judgment is made as to whether the voice communication is completed. If it is judged that the voice communication is not completed, the process returns to the step S1726. On the other hand, if it is judged that the communication is completed, the process is terminated.

Figure 80:
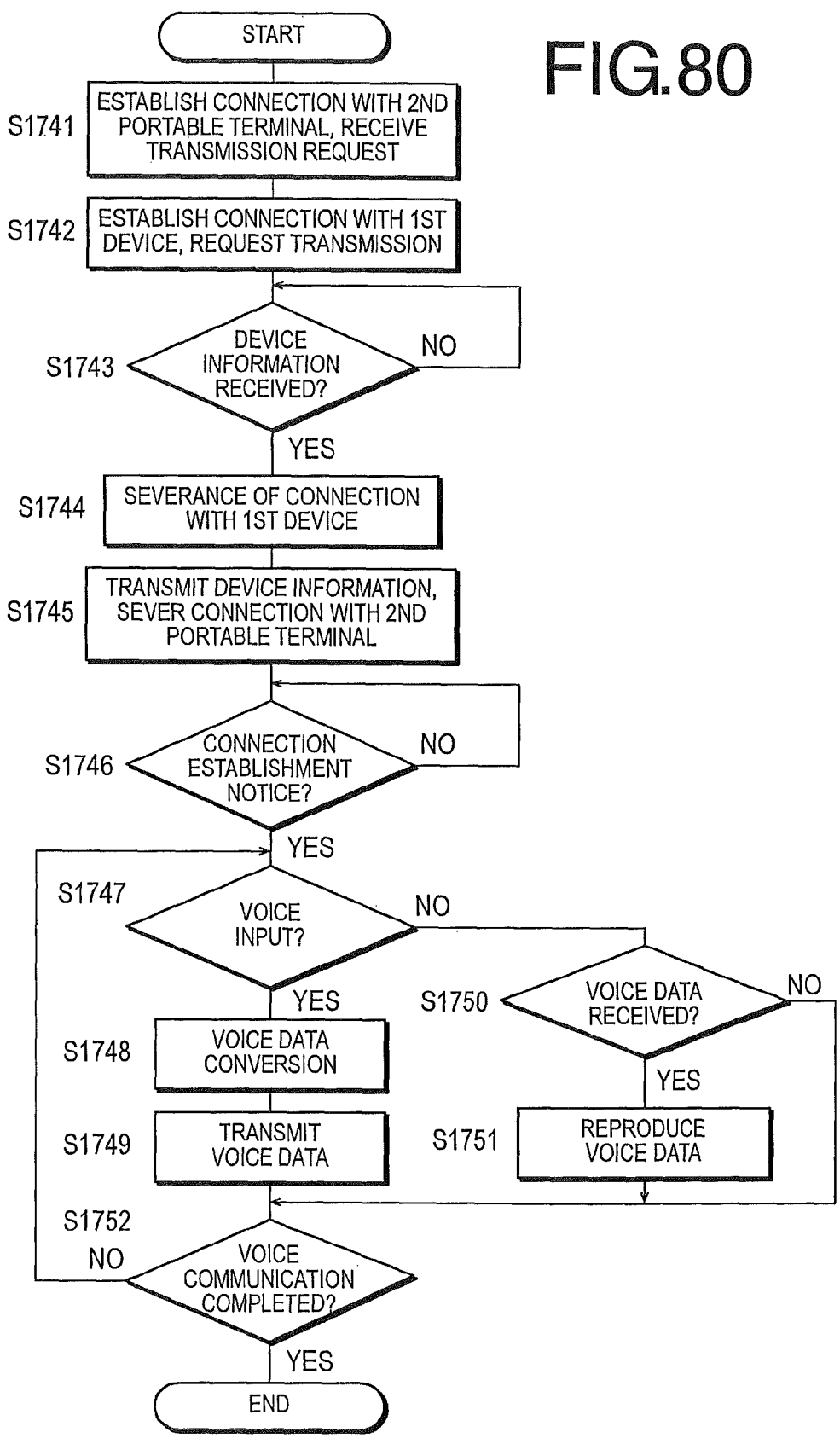
FIG. 80 is a flowchart of assistance in explaining the operating procedure of a first portable terminal according to Embodiment V-1.

The operating procedure of the first portable terminal 110 will be described in detail referring to FIG. 80. The flowchart shown in FIG. 80 is, for example, stored in the ROM 112 as the control program and is executed by the CPU 111.

First, steps S1741 through S1745 are executed for transmitting the device information of the first device 130E to the second portable terminal 110B.

Next, a judgment is made as to whether the connection establishment notice from the first device 130E is received (step S1746). When the receipt of the connection establishment notice is confirmed, a judgment is made as to whether voice data is inputted from the microphone of the voice input/output unit (step S1747).

If it is judged that voice is inputted, the voice is converted into voice data (step S1748) and transmitted to the first device 130E (step S1749), while the process advances to the step S1752.

If it is judged that voice is not inputted, a judgment is further made as to whether voice data is received from the first device 130E (step S1750). If it is judged that the voice data is received, the voice data is reproduced by the speaker of the voice input/output unit (step S1751), while the process advances to the step S1752.

In addition, the step S1751 is skipped if it is judged that the voice data is not received.

At the step S1752, a judgment is made as to whether the voice communication is completed. If it is judged that the voice communication is not completed, the process returns to the step S1747. On the other hand, if it is judged that the voice communication is completed, the process is terminated.

Figure 81:
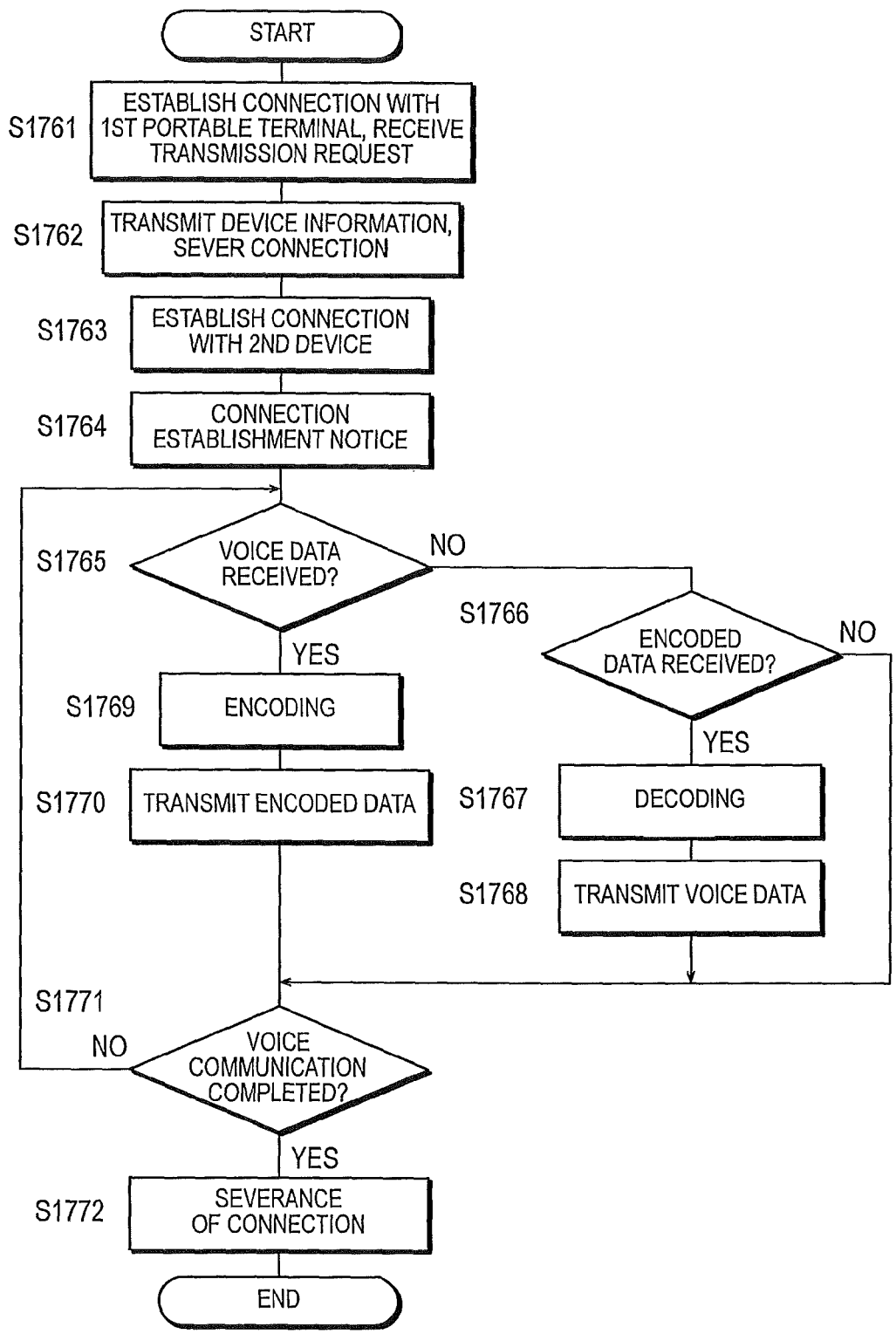
FIG. 81 is a flowchart of assistance in explaining the operating procedure of a first device according to Embodiment V-1.

The operating procedure of the first device 130E will be described in detail referring to FIG. 81. The flowchart shown in FIG. 81 is, for example, stored in the ROM of the first device 130E as the control program and is executed by the CPU of the first device 130E.

First, steps S1761 through S1763 are executed for establishing the connection with the second device 150E. Next, a connection establishment notice is transmitted to the first portable terminal 110 (step S1764). Then, a judgment is made as to whether voice data is received from the first portable terminal 110 (step S1765).

If it is judged that voice data is received, the voice data is encoded (step S1769) and transmitted to the second device 150E (step S1770), while the process advances to the step S1771.

On the other hand, if it is judged that voice data is not received, a judgment is made as to whether encoded data is received from the second device 150E (step S1766). If it is judged that the encoded data is received, the encoded data is decoded (step S1767) and transmitted to the first portable terminal 110 as voice data (step S1768), while the process advances to the step S1771.

In addition, the steps S1767 and S1768 are skipped if it is judged that the encoded data is not received.

At the step S1771, a judgment is made as to whether the voice communication is completed. If it is judged that the voice communication is not completed, the process returns to the step S1765. On the other hand, if it is judged that the voice communication is completed, the process is terminated (S1772).

Thus, the data volume of the device information is small compared to the transmitted data, i.e., the encoded voice data, and it causes little burden on the portable terminal for transmission/reception of the device information in Embodiment V-1. Furthermore, the transmission/reception of the encoded voice data can be executed without being restricted by the function of the portable terminal, as it is executed via the computer network 190.

It is obvious that this invention is not limited to the particular embodiments shown and described above but may be variously changed and modified without departing from the technical concept of this invention.

For example, although a constitution using a wireless type interface as a local interface was described in the above, it is also possible to apply a wired communication type interface such as the one using cables in Embodiment I-1.

Furthermore, although a constitution was described in the above where the device information stored in the printer 20 is deleted when the portable terminal 40 leaves the range communicable with the printer 20, it is also possible to adopt a constitution of deleting the device information after printing the desired image data on paper in Embodiment I-1, similar to Embodiment I-2.

Moreover, although it was described in the above that the image data transmitted via the network 30 is to be stored in the storage unit of the scanner, which functions as data storage device as well, in Embodiment I-1 and Embodiment I-2, the invention is not limited by such a constitution.

It is also possible to have a constitution where a reading device that obtains image data by reading the document image and a data storage device that stores image data are provided separately. For example, the reading device can be a scanner without a storage unit such as a hard disk, and the data storage device is, for example, a file server.

The scanner, as a reading device, can include a local interface or a memory card slot. In this case, while storing the image data obtained by reading into the file server, the scanner can output the device information of the file server to the portable terminal or the memory card.

Although a scanner was exemplified as the data storage device and a printer as the printing device in the above descriptions of Embodiment I-1 and Embodiment I-2, the invention is not limited to such constitutions.

It is also possible to use, for example, a multifunction digital copying machine, which is sometimes called MFP (multifunction peripheral), a facsimile, a personal computer, a workstation, etc., as the data storage device. A digital copying machine, a facsimile, etc., can be used as the printing device.

The invention can be applied to a printing system in which the image data is transmitted from a computer via the network to a printer to be printed on paper.

Although a constitution was described in the above descriptions for Embodiment I-1 and Embodiment I-2, where a connection is established via a network by transmitting the device information of a scanner having a function as the data storage device to a printer via a portable terminal or a portable storage medium, it is also possible to establish a connection by transmitting the printer's device information to a scanner or a computer via a portable terminal, etc.

Moreover, although a printing system was described in the above for Embodiment I-1 and Embodiment I-2, where the image data is transmitted from the data storage device via a network to the printing device, the invention is not limited to such a printing system.

The invention can be applied to a network device connecting system for realizing the establishment of connection between two devices to exchange data between two devices constituted to be able to communicate via a network.

Therefore, if the connection information such as IP addresses are not known between two network devices, the invention makes it possible to establish the connection between the network devices by means of a portable terminal or a portable storage medium in which the device information is stored.

This makes it possible also to exchange various signals such as data or instructions in either direction between one network device located near the user and the other network device far from the user.

In the abovementioned network device connecting system, arbitrary devices such as scanners, digital copying machines, facsimiles, computers, workstations, printers, etc., can be combined, regardless on the transmission side or on the reception side, as the devices connected via the network.

Furthermore, connecting devices such as modems, terminal adapters, bridges, and routers, can be included as the network device.

The data to be transmitted over the network is not limited to image data but rather includes arbitrary data such as document data, voice data, and software. For example, it can be applied to a case where device drivers such as a printer driver are to be installed on a computer, which is away from a device such as a printer, via a network.

The printing system, various control or arithmetic process units in the network device connecting systems, the printing methods, and network device connecting system according to Embodiment I-1 and Embodiment I-2 are applicable to dedicated hardware circuits, or computers where the programs are installed.

The program that is to be installed in a computer can be provided by a computer readable storage medium, for example, flexible disk, CD-ROM, etc. In this case, the program stored on the computer readable storage medium is normally transferred to hard disks to be stored. The program can be provided as an application software separately or can be provided as installed on a computer in advance.

Embodiment II-3 through Embodiment II-7 can be applied in various combinations. It is also possible to apply Embodiment II-10 or Embodiment II-11 to Embodiment IV-2 in order to make the destination device manually selectable at a data transmission device or at a portable terminal.

What is claimed is:

1. A data transmission device to be used in a system including said data transmission device and a data receiving device which are connected to a data network, and at least one portable terminal, said data transmission device comprising:
   a first transmission unit for transmitting to said portable terminal without recourse to said data network a signal for obtaining device information from said data receiving device, the data receiving device information containing connection information for establishing a connection between said data transmission device and said data receiving device;
   a receiving unit for receiving the data receiving device information from said portable terminal without recourse to said data network; and
   a second transmission unit for transmitting to said data receiving device a signal for starting communication based on the device information using said data network, wherein said data transmission device is a physical device.

2. A data transmission device as claimed in claim 1, wherein the second transmission unit transmits data to said data receiving device via said data network after establishing a connection with said data receiving device.

3. A data transmission device as claimed in claim 1, in which said first transmission unit and said receiving unit transmit and receive data with said portable terminal via a mobile telecommunication network.

4. A data transmission device as claimed in claim 1, in which said connection information contains an identification code for identifying said data receiving device on said data network.

5. A data transmission device as claimed in claim 4, in which said identification code is an IP address.

6. A data transmission device to be used in a system including said data transmission device and a data receiving device which are connected to a data network, and at least one portable terminal, said data transmission device comprising:
   a processor;
   a first transmission unit for transmitting to said portable terminal without recourse to said data network a signal for obtaining device information from said data receiving device, the data receiving device information containing connection information for establishing a connection between said data transmission device and said data receiving device;
   a receiving unit for receiving the data receiving device information from said portable terminal without recourse to said data network; and
   a second transmission unit for transmitting to said data receiving device a signal for starting communication based on the device information using said data network.

7. A data transmission device as claimed in claim 6, wherein the second transmission unit transmits data to said data receiving device via said data network after establishing a connection with said data receiving device.

8. A data transmission device as claimed in claim 6, in which said first transmission unit and said receiving unit transmit and receive data with said portable terminal via a mobile telecommunication network.

9. A data transmission device as claimed in claim 6, in which said connection information contains an identification code for identifying said data receiving device on said data network.

10. A data transmission device as claimed in claim 9, in which said identification code is an IP address.

* * * * *